US012737392B2

(12) United States Patent
Stanley et al.

(10) Patent No.: US 12,737,392 B2
(45) Date of Patent: Sep. 15, 2026

(54) GENERATING MACHINE LEARNING MODEL PROMPTS FOR ANALYZING COLLECTIONS OF UNSTRUCTURED DATA

(71) Applicant: Anomalo, Inc., Palo Alto, CA (US)

(72) Inventors: Jeremy Stanley, Croton on Hudson, NY (US); Viktoriya Andonova, Lisbon (PT); Chukwuemeka Ezekwe, Stone Mountain, GA (US); Daniel Walcoff, San Anselmo, CA (US); Kristian Ferjas Cailer, Arlington, VA (US); Timothy John Marshall, Austin, TX (US); Kristen Marie Hauser, Lakewood, OH (US); Elliot Shmukler, Burlingame, CA (US)

(73) Assignee: Anomalo, Inc., Palo Alto, CA (US)

( * ) Notice: Subject to any disclaimer, the term of this patent is extended or adjusted under 35 U.S.C. 154(b) by 0 days.

(21) Appl. No.: 19/234,920

(22) Filed: Jun. 11, 2025

(65) Prior Publication Data

US 2025/0378090 A1 Dec. 11, 2025

Related U.S. Application Data

(60) Provisional application No. 63/801,419, filed on May 7, 2025, provisional application No. 63/671,957, filed (Continued)

(51) Int. Cl.

*G06F 16/332* (2025.01)
*G06F 16/35* (2025.01)
*G06F 40/226* (2020.01)

(52) U.S. Cl.

CPC ........... *G06F 16/332* (2019.01); *G06F 16/35* (2019.01); *G06F 40/226* (2020.01)

(58) Field of Classification Search

CPC ....... G06F 16/332; G06F 16/35; G06F 40/226
See application file for complete search history.

(56) References Cited

U.S. PATENT DOCUMENTS

| | | | | |
|---|---|---|---|---|
| 10,268,711 | B1 * | 4/2019 | Chappell | G06F 16/215 |
| 11,675,823 | B2 * | 6/2023 | Kanagovi | G06F 16/3346 707/739 |

(Continued)

FOREIGN PATENT DOCUMENTS

| | | |
|---|---|---|
| WO | 2025259773 | 12/2025 |
| WO | 2025259776 | 12/2025 |

OTHER PUBLICATIONS

"Anomalo's Unstructured Data Monitoring: Private Beta", Anomalo, Product Launch: Anomalo Unstructured Data Monitoring is GA!, https://www.anomalo.com/blog/announcing-anomalos-unstructured-data-monitoring-capability-in-private-beta-preview/, Jul. 17, 2024 (accessed Jun. 6, 2025), 12 pages, (Year: 2025).*

(Continued)

*Primary Examiner* — Matthew J Ellis
(74) *Attorney, Agent, or Firm* — Henry Patent Law Firm PLLC

(57) ABSTRACT

In a general aspect, data quality monitoring and reporting are described. In some implementations, a system receives input identifying: a set of characteristic attributes to extract from unstructured data in a plurality of documents, and a set of issue attributes to identify in the unstructured data in the plurality of documents. The system instantiates characteristic attribute classes for the set of characteristic attributes and instantiates issue attribute classes for the set of issue attributes. The system constructs a prompt that includes instructions for a machine learning (ML) model to analyze the unstructured data in the plurality of documents, wherein constructing the prompt includes combining prompt strings for instantiated characteristic attribute classes and instanti- (Continued)

ated issue attribute classes. The system provides the prompt to the ML model and causes the ML model to analyze the unstructured data in the plurality of documents according to the prompt.

30 Claims, 39 Drawing Sheets

Related U.S. Application Data on Jul. 16, 2024, provisional application No. 63/658,612, filed on Jun. 11, 2024.

(56) References Cited

U.S. PATENT DOCUMENTS

| | | | | |
|---|---|---|---|---|
| 11,709,854 | B2 | 7/2023 | Saraswat et al. | |
| 11,847,408 | B2 | 12/2023 | Religa et al. | |
| 12,056,443 | B1 | 8/2024 | Jaiswal et al. | |
| 12,073,930 | B1 * | 8/2024 | Alperin | G06N 20/10 |
| 2015/0149461 | A1 | 5/2015 | Aguilar | |
| 2018/0365588 | A1 | 12/2018 | Gu et al. | |
| 2020/0380417 | A1 | 12/2020 | Briancon | |
| 2021/0081819 | A1 | 3/2021 | Polleri et al. | |
| 2021/0157856 | A1 * | 5/2021 | Tsuzuku | G06F 16/355 |
| 2022/0114490 | A1 * | 4/2022 | Das | G06N 3/088 |
| 2023/0078263 | A1 | 3/2023 | Seledkin | |
| 2023/0082729 | A1 | 3/2023 | Religa | |
| 2024/0128420 | A1 | 4/2024 | Pai | |
| 2024/0160900 | A1 | 5/2024 | Smith | |
| 2024/0281472 | A1 | 8/2024 | Larhette et al. | |
| 2024/0338395 | A1 | 10/2024 | Zhong | |
| 2025/0053835 | A1 * | 2/2025 | Stephan | G06N 5/04 |

OTHER PUBLICATIONS

Bizer et al. "Linked Data—The Story So Far", https://eprints.soton.ac.uk/271285/1/bizer-heath-berners-lee-ijswis-linked-data.pdf, 2023.*
U.S. Appl. No. 18/899,161, filed Sep. 27, 2024, first named inventor Jeremy Stanley, 106 pages.
"Anomalo's Unstructured Data Monitoring: Private Beta", Anomalo, Product Launch: Anomalo Unstructured Data Monitoring is GA!, https://www.anomalo.com/blog/announcing-anomalos-unstructured-data-monitoring-capability-in-private-beta-preview/, Jul. 17, 2024 (accessed Jun. 6, 2025), 12 pages.
"Unstructured Data Monitoring AI-ready quality and insights for every document in your enterprise", Anomalo, Product Launch: Anomalo Unstructured Data Monitoring is GA!, https://www.anomalo.com/product-overview/unstructured-data-monitoring/, 2025 (accessed Jun. 6, 2025), 17 pages.
Andonova, Vicky, "The Future is Unstructured: Introducing Unstructured Data Monitoring for the Gen AI Era", Anomalo, Product Launch: Anomalo Unstructured Data Monitoring is GA!, https://www.anomalo.com/blog/unstructured-data-monitoring-for-the-gen-ai-era/, May 29, 2025 (accessed Jun. 6, 2025), 14 pages.
Karon, Jonathan, "The Future Is Unstructured: How Anomalo + Snowflake Cortex Make Unstructured Data Ready for AI", Anomalo, Product Launch: Anomalo Unstructured Data Monitoring is GA!, https://www.anomalo.com/blog/how-anomalo-snowflake-cortex-make-unstructured-data-ready-for-ai/, Jun. 2, 2025 (accessed Jun. 6, 2025), 10 pages.
USPTO, Non-Final Office Action issued in U.S. Appl. No. 19/234,880 on Aug. 12, 2025, 23 pages.
ISA, International Search Report and Written Opinion issued in Application No. PCT/US2025/033181 on Oct. 10, 2025, 10 pages.
ISA, International Search Report and Written Opinion issued in Application No. PCT/US2025/033186 on Oct. 10, 2025, 10 pages.
Saeed, et al., "Querying Large Language Models with SQL", arXiv:2304.00472v1, Apr. 2, 2023, 7 pages.
USPTO, Non-Final Office Action issued in U.S. Appl. No. 19/234,880 on Feb. 5, 2026, 35 pages.

* cited by examiner

400

```
#
# Metadata attributes
#
@metadata_attribute_registry
class Title(MetadataAttribute):
    name  "title"
    pretty_name  "Title"
    prompt  "title in English that is no more than 50 characters"
    include_in_rca  False
    is_internal  True
    required  True

@metadata_attribute_registry
class ShortDescription(MetadataAttribute):
    name  "short_description"
    pretty_name  "Short description"
    prompt  "short description in English"
    include_in_rca  False
    is_internal  True
    required  True

@metadata_attribute_registry
class Summary(MetadataAttribute):
    name  "summary"
    pretty_name  "Summary"
    prompt  "long summary in English"
    include_in_rca  False
    is_internal  True
    required  True
```

```
@issue_attribute_registry
class AbusiveLanguage(IssueAttribute):
    name  "has_abusive_language"
    pretty_name  "Abusive language"
    prompt  (
        "contains abusive language that would be deemed offensive in a work context"
    )
    has_capturable_entities  True
    default_penalty  -8
    default_sensitive  True


@issue_attribute_registry
class NegativeSentiment(IssueAttribute):
    name  "has_negative_sentiment"
    pretty_name  "Negative sentiment"
    prompt  "contains negative sentiment language"
    default_penalty  -1


@issue_attribute_registry
class ProprietaryInformation(IssueAttribute):
    name  "has_proprietary_information"
    pretty_name  "Proprietary information"
    prompt  "contains content an enterprise would classify as proprietary and would not want disclosed to a third party"
    default_penalty  -3


@issue_attribute_registry
class IsPoorlyWritten(IssueAttribute):
    name  "is_poorly_written"
    pretty_name  "Poorly written"
    prompt  "is poorly written or difficult to understand"
    default_penalty  -3
```

*FIG. 4B*

GENERATING MACHINE LEARNING MODEL PROMPTS FOR ANALYZING COLLECTIONS OF UNSTRUCTURED DATA

CROSS-REFERENCE TO RELATED APPLICATIONS

This application claims priority to U.S. Provisional Patent Application No. 63/658,612, filed Jun. 11, 2024, entitled "Techniques for Unstructured Data Quality Monitoring", U.S. Provisional Patent Application No. 63/671,957, filed Jul. 16, 2024, entitled "Techniques for Unstructured Data Quality Monitoring", and U.S. Provisional Patent Application No. 63/801,419, filed May 7, 2025, entitled "Techniques for Unstructured Data Quality Monitoring", which are incorporated herein by reference in their entirety.

BACKGROUND

This application relates to techniques for and related to analyzing collections of unstructured data.

DESCRIPTION OF DRAWINGS

FIGS. 4A-4B illustrate example attribute class definitions.

DETAILED DESCRIPTION

Figure 1:
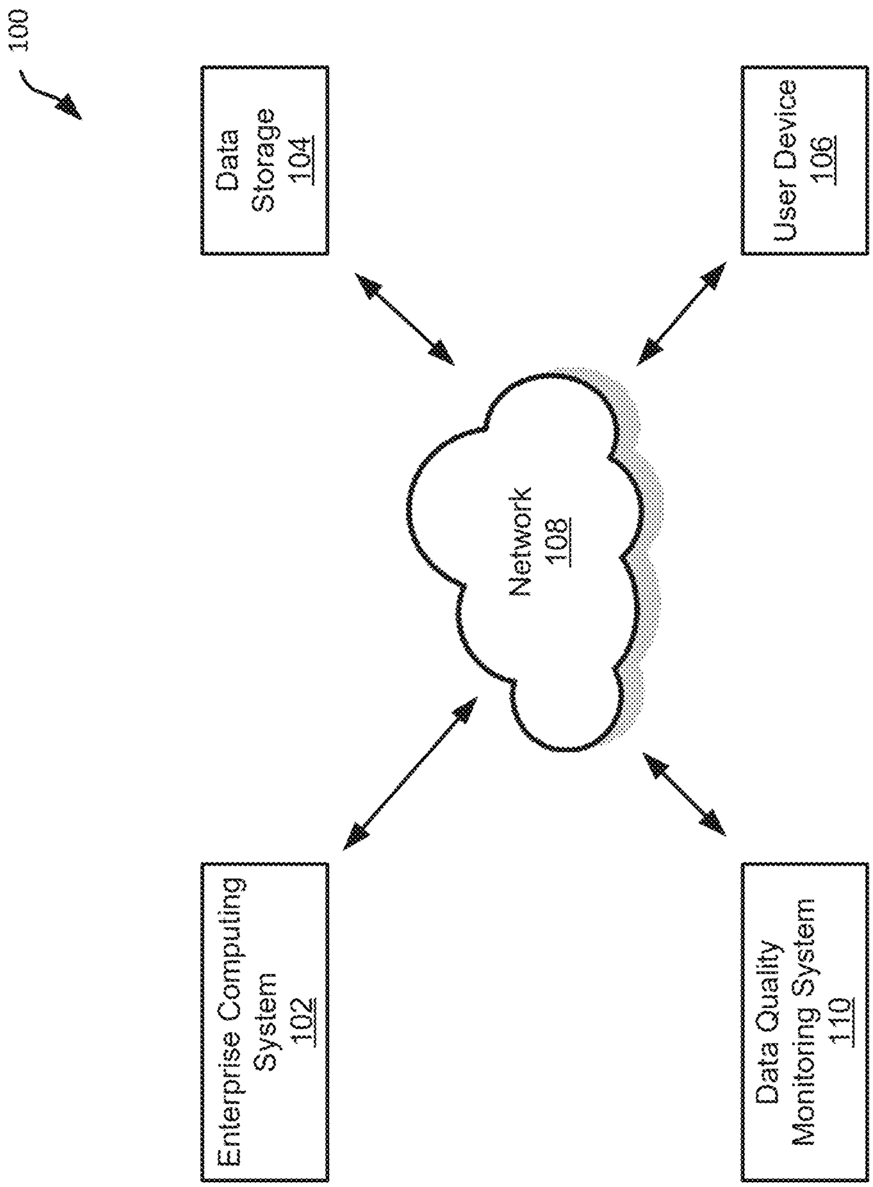
FIG. 1 is a block diagram showing aspects of an example computing environment that includes a data quality monitoring system.

FIG. 1 is a block diagram showing aspects of an example computing environment 100 that includes a data quality monitoring system 110. The example computing environment 100 shown in FIG. 1 includes enterprise computing system 102, data storage 104, user device 106, and network 108. The enterprise computing system 102, data storage 104, or user device 106 can include sources or identifiers of data (e.g., one or more applications, tables, and/or databases) that can be monitored, for example, by the data quality monitoring system 110. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, one or more enterprise computing system 102 in an organization's computing infrastructure manages (e.g., produces, receives, and/or ingests) volumes of data that contain valuable or useful information. An enterprise computing system 102 can store such data (e.g., at enterprise computing system 102 and/or at data storage 104) so that it becomes available as a data source to data quality monitoring system 110. The data may include data generated by the organization itself, data received from external entities, or a combination. By way of example, the data can include customer data, transaction data, network packet data, sensor data, application program data, observability data, and other types of data. Observability data can include, for example, system logs, error logs, stack traces, system performance data, or any other data that provides information about computing infrastructure and applications (e.g., performance data and diagnostic information). The data quality monitoring system 110 can monitor the data managed by the enterprise computing system 102. For example, the data can be monitored to extract insights about data (e.g., characteristic attributes), determine issues present in the data (e.g., presence of issue attributes), diagnose missing data, diagnose erroneous data, diagnose anomalous data or trends, diagnose performance problems, monitor user interactions, and to derive other insights about the computing environment 100. Generally, the data managed by the enterprise computing system 102 does not have to use a common format or structure, and the data quality monitoring system 110 can generate structured output data having a specified form, format, or type. The output generated by the data quality monitoring system can be delivered to enterprise computing system 102, data storage 104, user device 106, or any combination thereof.

The enterprise computing system 102, data storage 104, user device 106, and data quality monitoring system 110 are each implemented by one or more computer systems that have computational resources (e.g., hardware, software, and/or firmware) that are used to communicate with each other and to perform other operations. For example, each computer system may be implemented as an example computer system (e.g., computer system 2500 of FIG. 25), or components thereof, for performing operations as described or illustrated with respect to FIGS. 1-24. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The enterprise computing system 102, data storage 104, user device 106, and data quality monitoring system 110 (and possibly other computer systems or devices) communicate with each other over the network 108. The example network 108 can include all or part of a data communication network or another type of communication link. For example, the network 108 can include one or more wired or wireless connections, one or more wired or wireless networks, or other communication channels. In some implementations, the network 108 includes one or more instances of: a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

Enterprise computing system 102 can include multiple user devices, servers, sensors, routers, firewalls, switches, virtual machines, containers, or a combination of these and other types of computer devices or computing infrastructure components. Enterprise computing system 102 can receive, ingest, detect, monitor, create, or otherwise produce data during operations it performs. This data can be provided to other devices and systems through the network 108. In some implementations, the data is streamed to (or otherwise made available to) the data quality monitoring system 110 as input data (e.g., input to one or more data quality monitoring processes).

In some implementations, the enterprise computing system 102 can include (or otherwise manage or provide access to) data sources such as one or more sources of events (e.g., such as Kafka, Segment, Amazon Kinesis, etc.), one or more databases (e.g., Oracle, PostgreSQL, Microsoft SQL Server, etc.), one or more software-as-a-service applications (e.g., Stripe, Salesforce, Facebook Ads, etc.), and/or data feeds (e.g., SFTP, Excel, APIs, etc.). In some implementations, computing system 102 includes (and/or coordinates with) data transformation and orchestration services and/or software (e.g., Matillion, Fivetran, Apache Airflow, DBT, Apache Spark, SQL, etc.). In some implementations, computing system 102 includes (and/or coordinates with) cloud data warehouse or data lake services and/or software (e.g., Amazon Redshift, Snowflake, Google Big Query, Presto, Databricks, etc.). In some implementations, the enterprise computing system 102 can also include applications that act as data sources.

In some implementations, an application (e.g., acting as a data source) includes a collection of computer instructions that constitute a computer program. The computer instructions can be compiled or interpreted. An application can be contained in a single module or can be statically or dynamically linked with other libraries. The libraries can be provided by the operating system and/or the application provider.

The data storage 104 can include multiple user devices, servers, databases, hosted services, other types of data storage systems, and/or a combination of these. Generally, the data storage 104 can operate as a data source or a data destination (or both). In some implementations, the data storage 104 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. Data from the enterprise computing system 102, as well as data analytics and other output from the data quality monitoring system 110, can be communicated to the data storage 104 through the network 108. In some implementations, data storage 104 is accessed by data quality monitoring system 110 (e.g., to monitor data quality) directly and/or via enterprise computing system 102.

The data quality monitoring system 110 may be used to monitor, track, diagnose, triage, and/or generate insights related to data or data quality and/or generate alerts by processing data from enterprise computing system 102 and/or data storage 104. The data quality monitoring system 110 can receive a data stream from the enterprise computing system 102 and identify the data stream as input data to be processed by the data quality monitoring system 110. The data quality monitoring system 110 generates output data by applying data quality monitoring processes (e.g., unstructured data analysis tasks) to the input data and communicates the output data to an output destination. In some implementations, an output destination is one or more of enterprise computing system 102, data storage 104, and/or user device 106. In some implementations, an output destination is data quality monitoring system 110 itself (e.g., stored until accessed by a request from an enterprise or user device).

In some implementations, data quality monitoring system 110 performs data observability monitoring. Data observability monitoring can include monitoring metadata about data managed by enterprise computing system 102. For example, one or more processes for data observability monitoring can be performed on data to determine if particular data still exists, if there have been any adverse changes to the schema of the particular data, if the particular data has been updated recently, and/or if the volume of data in the particular data is consistent with expectations. A process for data observability monitoring can be performed without querying the data itself, but rather by querying metadata. For example, for a table the metadata needed for observability monitoring can include statistics such as: last updated time, number of rows (or size in bytes), column name, and/or column type. In some implementations, the metadata is captured at regular intervals so that a change over time of the metadata can be monitored and/or reported.

In some implementations, data quality monitoring system 110 performs data quality monitoring. Data quality monitoring can include monitoring data content for anomalies that can affect the quality of the data. For example, data quality monitoring can monitor value in a data table over time for anomalies. For example, data quality monitoring can monitor for issues in structured data, unstructured data, or data that includes some combination of structured and unstructured data. For instance, data quality monitoring can include analyzing unstructured data within one or more documents to determine whether one or more issues are present in the data. For instance, data quality monitoring can include analyzing unstructured data within one or more documents to determine characteristic attributes of the data. The issues or characteristic attributes, or some combination, can indicate data quality issues (e.g., within a document or within a collection).

In some implementations, data quality monitoring system 110 generates alerts (reports) indicating data quality issues. For example, the alert can be directed to and output by a user device to notify a user (e.g., a data engineer of the enterprise) that a data quality issue has been detected. In some implementations, data quality monitoring system 110 generates an alert if a data quality issue exceeds an alert threshold. The alert threshold can be dynamic and based on historical data. A dynamic threshold can be used in order to avoid or minimize generating too many alerts (e.g., false positives, leading to the likelihood that alerts will be ignored by a user) or too few alerts (e.g., false negatives, leading to significant anomalies that a user is not made aware of).

In some implementations, data quality monitoring operations of data quality monitoring system 110 are automated using one or more machine learning approaches. Examples of machine learning approaches include unsupervised or supervised machine learning. Typically, data quality monitoring system 110 will use unsupervised machine learning instead of supervised machine learning (e.g., which relies on data labeled by humans). In unsupervised learning, the model does not require human labels and operates on the data, with all of that data's inherent patterns and relationships. The model learns from the data itself and interprets new inputs based on everything it has seen so far. Given that data can differ greatly from table to table or company to company, it can be difficult to collect enough labeled data to use supervised machine learning for data quality monitoring. Thus, unsupervised learning can be a better fit for monitoring data quality if sufficient labeled data is not available or practicable. An unsupervised machine learning model that works well can begin monitoring a dataset without extensive initial setup and continue to learn and adapt as the data changes.

The user device 106, the data quality monitoring system 110, or both, can provide a user interface for the data quality monitoring system 110. Aspects of the user interface can be rendered on a display (e.g., of enterprise computing system 102 or user device 106) (e.g., the display 2550 in FIG. 25) or otherwise presented to a user. The user interface may be generated by a data quality monitoring application that interacts with (or is a component of) the data quality monitoring system 110. The data quality monitoring application can be deployed as software that includes application programming interfaces (APIs), graphical user interfaces (GUIs), and other modules.

In some implementations, a data quality monitoring application can be deployed as a file, executable code, or another type of machine-readable instructions executed on the enterprise computer system 102, data storage 104, and/or user device 106. The data quality monitoring application, when executed, may render GUIs for display to a user (e.g., on a touchscreen, a monitor, or other graphical interface device), and the user can interact with the data quality monitoring application through the GUIs. Certain functionality of the data quality monitoring application may be performed on the user device 106 (and/or enterprise computer system 102) or may invoke the APIs, which can access functionality of the data quality monitoring system 110. The data quality monitoring application may be rendered and/or executed within another application (e.g., as a plugin or a web application in a web browser), as a standalone application, or otherwise. In some implementations, a data quality monitoring application may be deployed as an installed application on a workstation, as an "app" on a tablet or smartphone, as a cloud-based application that accesses functionality running on one or more remote servers, or otherwise.

In some implementations, the data quality monitoring system 110 is a standalone computer system that includes only a single computer node. For instance, the data quality monitoring system 110 can be deployed on the user device 106, enterprise computer system 102, or another computer device in the computing environment 100. For example, the data quality monitoring system 110 can be implemented on a laptop or workstation.

In some implementations, the data quality monitoring system 110 is deployed on a distributed computer system that includes multiple computer nodes (e.g., enterprise computer system 102). For instance, the data quality monitoring system 110 can be deployed on a server cluster, on a cloud-based "serverless" computer system, or another type of distributed computer system. One or more computer nodes of the distributed computer system may communicate with the user device 106, for example, through a data quality monitoring application that provides a user interface as described above. In some implementations, the one or more computer nodes are distinct computer devices in the computing environment 100. In some implementations, the one or more computer nodes can communicate with each other using TCP/IP protocols or other types of network communication protocols transmitted over a network (e.g., the network 108 shown in FIG. 1) or another type of data connection.

In some implementations, the data quality monitoring system 110 is implemented by software installed on private enterprise servers, a private enterprise computing device, or other types of enterprise computing infrastructure (e.g., one or more computer systems owned and operated by corporate entities, government agencies, other types of enterprises) (e.g., enterprise computer system 102). In such implementations, some or all of the enterprise computing system 102, data storage 104, and the user device 106 can be or include the enterprise's own computer resources, and the network 108 can be or include a private data connection (e.g., an enterprise network or VPN). In some implementations, the data quality monitoring system 110 and the user device 106 (and potentially other elements of the computer environment 100) operate behind a common firewall or other network security system.

In some implementations, the data quality monitoring system 110 is implemented by software running on a cloud-based computing system that provides a cloud hosting service. For example, the data quality monitoring system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the enterprise computing system 102, data storage 104, and the user device 106 can interact with the cloud-based computing system through APIs, and the network 108 can be or include a public data connection (e.g., the Internet). In some implementations, the data quality monitoring system 110 and the user device 106 (and potentially other elements of the computer environment 100) operate behind different firewalls, and communication between them can be encrypted or otherwise secured by appropriate protocols (e.g., using public key infrastructure or otherwise).

Figure 2:
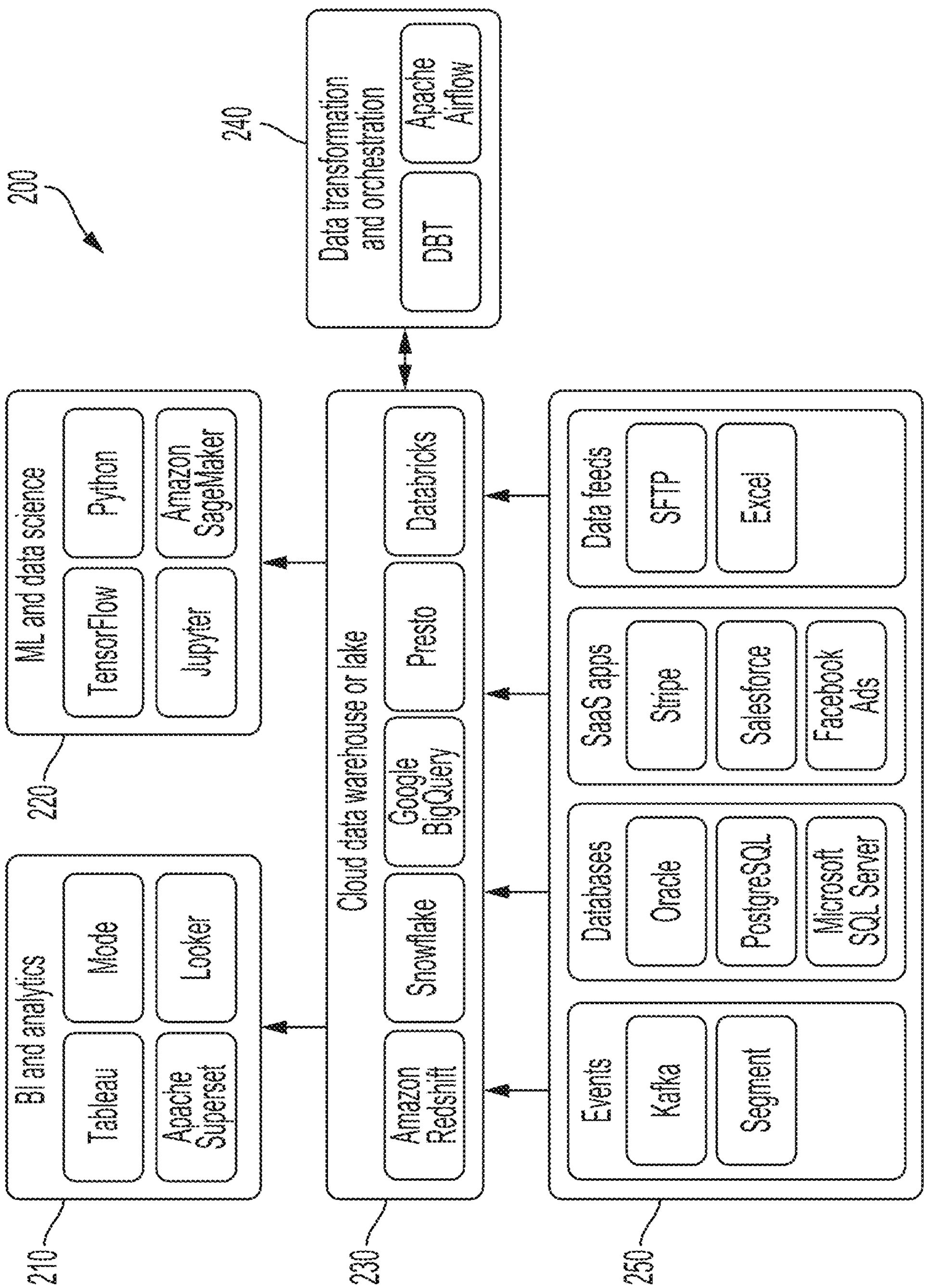
FIG. 2 is a block diagram showing an example data stack.

FIG. 2 illustrates an example modern data stack. A modern data stack is a major investment. This investment is undermined when tools for data quality are left out (as in FIG. 2). Diagram 200 of FIG. 2 illustrates the following components: BI (business intelligence) and analytics component 210 (e.g., services such as Tableau, Mode, Apache Superset, or Looker), ML (machine learning) and data science component 220 (e.g., services such as TensorFlow, Python, Jupyter, or Amazon SageMaker), cloud data warehouse or lake component 230 (e.g., services such as Amazon Redshift, Snowflake, Google BigQuery, Presto, or Databricks), data transformation and orchestration component 240 (e.g., services such as dbt or Apache Airflow), and source data component 250 (e.g., including sources of data generated by a user, an organization, or a producer or consumer of data). In some implementations, source data component 250 includes events data (e.g., services such as Kafka or Segment), databases (e.g., services such as Oracle, PostgreSQL, or Microsoft SQL Server), Saas (software-as-a-service) applications (e.g., services such as Stripe, Salesforce, or Facebook Ads), and data feeds (e.g., via secure file transfer protocol (SFTP) or Excel).

Figure 3:
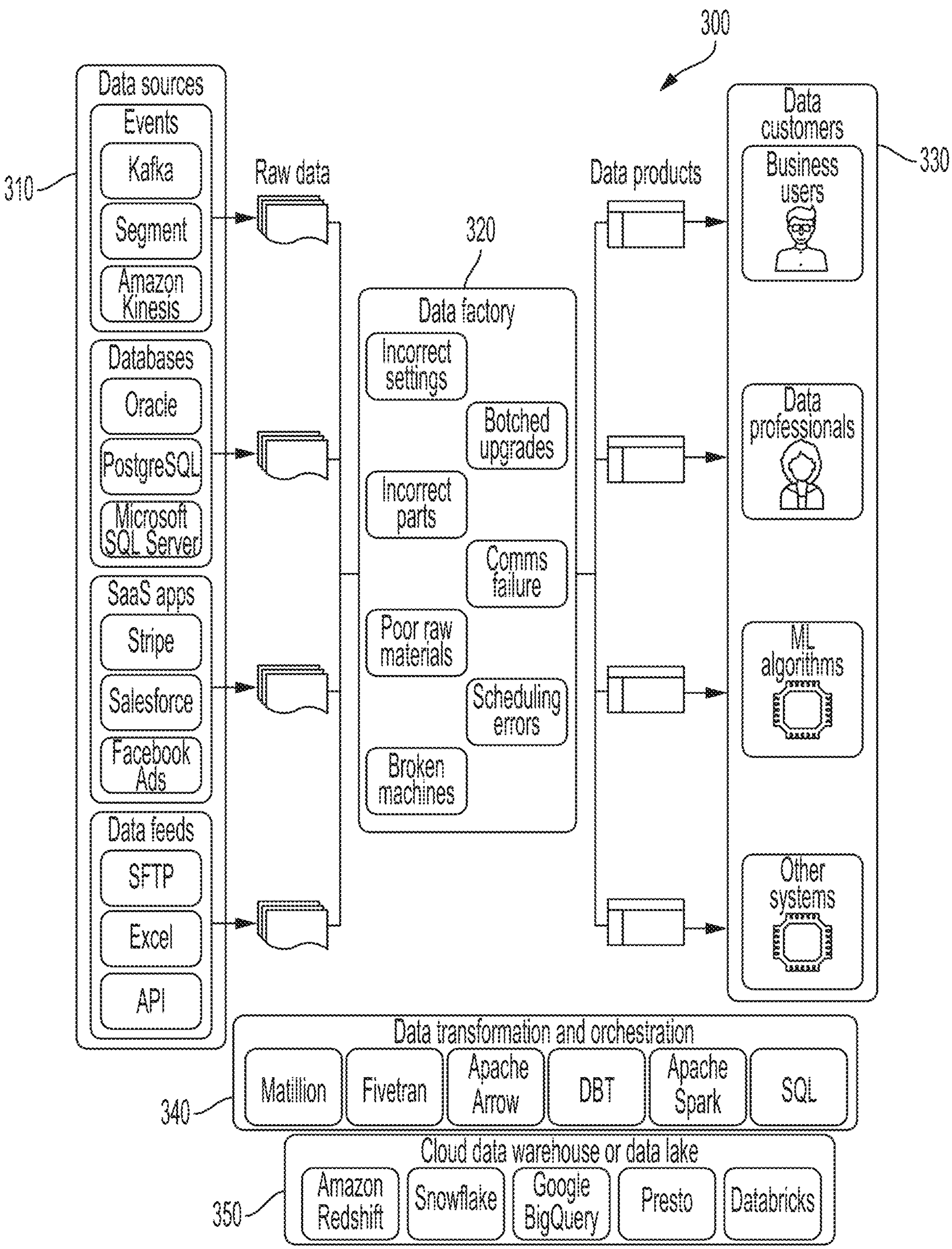
FIG. 3 is a block diagram showing an example data factory.

FIG. 3 illustrates an example data factory. Traditionally, the warehouse has been the metaphor of choice for how data systems operate inside a company, emphasizing the storage and transportation of goods. But with the rise of the modern data stack, and the new ways companies are working with data, that metaphor is no longer complete. Instead, companies today are operating what more closely resembles a data factory: a complex environment that serves to transform raw materials into useful products. Diagram 300 of FIG. 3 illustrates the following components: data sources component 310 (e.g., similar to data source component 250 of FIG. 2), data factory 320, data customers 330 (e.g., consumers of the output of the data factory), data transformation and orchestration component 340 (e.g., similar to data transformation and orchestration component 240 of FIG. 2), and cloud data warehouse or data lake component 350 (e.g., similar to cloud data warehouse or lake component 230 of FIG. 2). In the example of FIG. 3, data factory 320 represents events, occurrences, or operations (e.g., driven by users, ingested data, or data transformation and orchestration components) that affect data.

Instead of steel, rubber, and electronics, a data factory can ingest streaming datasets, replicas of databases, API extracts from SaaS apps, and raw files from data feeds. The factory is built on a foundation, but instead of cement, the foundation here is the cloud data warehouses and data lakes. For example, the machines that are operated on the factory floor, in this case, are extract, transform, and load (ETL) tools (e.g., like Matillion and Fivetran), orchestration platforms (e.g., like Apache Airflow), and transformations (e.g., happening in dbt, Apache Spark, and SQL). The folks on the floor operating the machines are the data engineers and analytics engineers of the modern data team. And the products produced, instead of consumer or industrial goods, are curated data products that power the decisions made by business users and data professionals, the training and prediction of ML algorithms, and the direct feeds that pipe into other data systems.

FIG. 3 illustrates the data factory and what can go wrong on the factory floor. For example, such problems can include one or more of: broken machines (e.g., data processing or orchestration tools can break down entirely, stopping or degrading the flow of data), scheduling errors (e.g., data processing jobs can run out of order or with the wrong cadence, causing missing data, incorrect computations, or duplicate data), poor raw materials (e.g., raw data fed into the factory can be of poor quality due to upstream issues, and the adverse effects can propagate throughout the rest of the warehouse), e.g., incorrect parts (e.g., errors can be introduced into the SQL, Spark, or other code that is processing and manipulating the data, causing invalid joins, transformations, or aggregations), incorrect settings (e.g., engineers can make mistakes in the configuration of complex data processing jobs, which can lead to a wide variety of issues), botched upgrades (e.g., attempts to upgrade code, application versions, or entire subsystems can introduce subtle but pervasive differences in how data is encoded or transformed), communication failures (e.g., well-intentioned changes to add new features or functionality can be communicated poorly to other affected teams, leading to inconsistencies in data processing logic that create quality issues).

Issues inside the data factory are often the most common sources of data quality incidents, as they directly affect the flow and contents of the data (and can be very difficult to test outside of a production data environment).

There are several reasons data quality monitoring can be needed and several ways to think about approaching data quality monitoring. With the ever-increasing importance of high-quality data, and the fact that data quality problems are more prolific than ever, it is important to consider how one should think about such an initiative. For example, one approach is to consider it as a one-time fix—getting your data into shape over a period of months or quarters, and letting things run smoothly from there. This kind of approach often makes sense for software, but much less so for data. For example, code is the same today as it is tomorrow, barring a deliberate update. You can test it in a controlled quality assurance (QA) environment and also run unit tests that isolate just one part of the system. Once your tests pass, you are essentially done. Data, on the other hand, is chaotic and constantly changing. It is dependent on external factors you do not necessarily control, such as how users interact with your product in real time, so you may only be able to test it holistically in production. As an example, such tests should be able to filter out all the noise-and there is typically a lot of noise-from the true data quality signal. While software bugs are often quickly detected and fixed through automated testing and user feedback, the vast majority of data quality issues may never be caught if teams lack the right continuous monitoring tools for data. Rather, problems may happen silently and go unnoticed.

Making matters worse, the cost of fixing a data quality issue can increase dramatically the more time has passed since the issue occurred for one or more reasons: the number of potential changes that could have caused the issue goes up linearly with the length of time over which are being evaluated; the amount of context the team has on why a change was made, or what the implications of that change could be, goes down with the time since the change; the cost to "fix" the issue (including backfilling the data) goes up with the amount of time since the issue was first introduced; and issues that persist for long periods of time end up becoming "normal behavior" to other downstream systems, so fixing them may cause new incidents.

When an incident is introduced and then fixed later, it really has two different types of impact. These are referred to as data scars and data shocks.

After an incident happens, unless the data is painstakingly repaired (which is often impossible or expensive to do), it will leave a scar in the data (data scar). A scar is a period of time for a given set of data where a subset of records are invalid or anomalous and cannot be trusted by any systems operating on those records in the future.

Data scars can impact ML models, as those models will have to adapt to learn different relationships in the data during the period of the scar. This can weaken their performance and limit their ability to learn from all the data captured during the scar. It can also dampen the model's belief in the importance of the features affected by the scar—the model may underweight these inputs, wrongly believing they're less prevalent in the dataset. Even if the scar is repaired, data leakage may be introduced into downstream ML applications by inadvertently including some current state information in the repair. This can lead to the model performing very well in offline evaluations (since it has access to "time-traveled" information from the future) but acting erratically in production (where it no longer has this information).

Data scars can also greatly impact any future analytics or data science work done on this dataset. They may lead to more complex data pipelines that are harder to write and maintain, as data users have to add a lot of exception handling to avoid biases introduced by the scar. These exceptions may need to be noted and addressed in any reporting or visualizations that include data from the time of the scar, increasing cognitive overhead on anyone trying to interpret the data or make decisions from it. Or, scars may need to be removed entirely from the dataset, leading to "data amnesia" from that period, which can affect trend analysis or time-based comparisons (e.g., what was the year-over-year result for this statistic?).

In addition to the scarring effect, there are also effects in production that occur both when the data quality issue was introduced and when the data issue is fixed. This is referred to as a data quality shock or data shock, and it can also affect AI/ML and decision making. When the data quality issue first occurs, any ML models that use features derived from the data will suddenly be presented with data that is entirely different from what they were trained on. This can cause them to be "shocked" by the new data, and they will produce predictions that are often wildly inaccurate for any observations affected by the data quality incident. This shock can last until the models are retrained using new data, which often happens automatically in a continuous deployment model. Then, once the data quality is fixed, that actually introduces yet another shock to the model (unless the data is repaired historically, which often isn't possible). The shock from the fix can often be as bad as the initial shock from the introduction of the data quality issue.

For analytics/reporting use cases, these shocks often manifest as metrics or analyses that have sudden unexpected changes. When these are observed, they are often mistaken for real-world changes (the whole purpose of these reports is to reflect what's happening in reality), so operations are changed or other decisions are made to respond to the data quality issue as though it were real. Again, the same thing can happen in reverse when the fix is released.

Generally, the longer the data quality issue goes unfixed, the deeper the scar, and the greater the shock from fixing it. The implication of allowing scars and shocks to continue accumulating is that slowly, over time, the objective quality of the data erodes. And as hard as it is to backfill data, it's even harder to backfill trust in the data.

Attention is now directed to automated data quality monitoring. Generally, data quality is something that needs to be monitored constantly and maintained diligently by fixing problems as soon as they arise. Effective data quality monitoring is no easy task—especially at the scale of thousands of tables and billions of records, which is common for a large enterprise. Generally, it does not work to have humans manually inspect your data nor to use legacy solutions like writing tests for data and tracking key metrics. For example, such approaches may be used for the most important tables of data, but implementing it for an entire data warehouse simply generally is not feasible.

Data quality monitoring can be automated, for example, with unsupervised ML. This is a new technique that can have many benefits. For example, it can require hardly any manual setup and can scale easily across a data warehouse. For example, with the right implementation, it can automatically learn the appropriate thresholds for whether a data change is big enough to signal a quality issue. For example, it can detect a broad range of problems, including unknown unknowns that no one has ever thought to write a test for.

Using ML comes with its own challenges. Building the model is a complicated task on its own, but an operator should also ensure it works on a wide variety of real-world data without over- or under-alerting. Additionally, an operator may want to build out notifications that help its team effectively triage issues, and integrations with a data toolkit that bring data quality front and center for their organization. Finally, the operator may need to have a plan in place to deploy and manage the monitoring platform in the long term.

In addition to data quality issues that can arise in a data stack, the data stack can include significant volumes of unstructured data. Monitoring (e.g., analyzing) unstructured data can involve different challenges than structured data. ML models can be leveraged to assist in monitoring the unstructured data, for example, to process such data for different purposes such as to discover subsets of data, filter data, extract insights, determine correlations, create a cleaned dataset, or generate reports.

FIGS. 5-21 illustrate examples of data quality monitoring interfaces. In some implementations, one or more of these interfaces can be used to discover and leverage unstructured data across an enterprise; bring high-quality data to generative artificial intelligence (GenAI) models; scale despite complexity, volume, and velocity; enable data teams to detect, alert, and resolve complex data quality challenges; and provide comprehensive tool with rules-based, metrics-oriented, supervised, and/or unsupervised monitoring on structured, semi-structured, and/or unstructured data. Aspects of unstructured data monitoring can result in reduced support costs and better efficiency, for example, due to improvements in a data processing pipeline and the resulting quality of output.

GenAI is transforming the enterprise and data quality is emerging as the greatest challenge to realizing GenAI's potential. Monitoring unstructured data empowers enterprise data teams to leverage high quality data for their GenAI applications and avoid low quality data from propagating.

Automating monitoring data quality on structured data in data warehouses and data lakes has been done. Given how GenAI is able to ingest an increasing volume and velocity of raw unstructured data, automated data quality monitoring on unstructured data is becoming important. GenAI is transforming the enterprise and data quality is emerging as the greatest challenge to realizing GenAI's potential. Techniques described herein for monitoring unstructured data can empower enterprises to discover, curate, leverage, and ingest high quality data for their GenAI applications and avoid low quality data from propagating (e.g., into GenAI uses, which can be critically sensitive to such data). Unlike some solutions, the techniques described herein can enable data teams to easily detect, alert, and resolve complex data quality issues across the enterprise. These techniques can also automatically detect and understand the root-cause of data issues.

By some estimates, ninety percent of enterprise data is unstructured. Unstructured data may not comply with traditional standard formats which makes it extremely challenging to organize, store, search, retrieve and analyze. Unstructured data itself is also problematic as it often contains inconsistencies, errors and duplicated content. Even more problematic is that unstructured data can contain sensitive confidential information including company intellectual property, personal identifiable information (PII) and abusive language. These combined challenges may lead to privacy, security and performance risks, especially as this data gets incorporated into Generative AI models and applications.

Organizations are implementing Generative AI and ingesting unstructured text for the purposes of model training, fine tuning and Retrieval Augmented Generation (RAG) at a volume and velocity previously unseen. As a result, organizations need to be able to identify and resolve quality issues with such data before it gets incorporated into Generative AI models and impacts their performance.

Using one or more of the techniques described herein, unstructured text documents can be curated and evaluated for data quality around various document and document collection attributes including, for example, document length, duplicates, topics, tone, language, abusive language, PII, and sentiment. For example, users can be provided the ability to quickly evaluate the quality of a document collection, characterize the content of the collection, and identify issues in individual documents, dramatically reducing the time needed to curate, profile, and leverage high-value unstructured text data.

In some implementations, for any unstructured document collection, the techniques described herein leverage GenAI methods and unsupervised machine-learning techniques to detect quality issues, dig deep, and empower data teams to resolve issues quickly. For example, this can provide comprehensive insight by profiling the distribution, identifying unexpected changes, and enabling data teams to uncover the quality of the unstructured document collection. In some implementations, unsupervised monitoring is used to enable data teams to continuously monitor their evolving data sources, detect unexpected changes, and data degradations.

Generative AI will be transformative for the enterprise. But for all its power, it's sometimes unruly, prone to hallucinations, insults, and simply wrong conclusions.

Much of the effort to address unwanted behavior of GenAI has been at the time of use, employing techniques like prompt engineering and filtering to nudge large language models (LLMs) toward better outcomes. While those efforts are vital, we look earlier in the process for further improvement. Businesses will get better outcomes from AI by ensuring higher-quality preprocessing data. Data quality can make or break enterprise Gen AI. Data quality monitoring using AI can be used to improve GenAI by allowing for better training and fine-tuning with monitored unstructured data.

Researchers and companies worldwide are working on ways to get AI to be less wrong, offensive, and sloppy. One approach relies on the idea that AI can't expose a secret, or make a conclusion based on the wrong premise, if it wasn't exposed to that secret or premise in the first place. Enterprise AI offers an extra layer of complication beyond the hallucinations and misfires of an off-the-shelf LLM. Regardless of whether an enterprise user is training a model from scratch, or using a technique such as RAG to fine-tune a pre-built one, the enterprise is ultimately responsible for the training data. AI is a product of what it's been taught. While it's tempting to make use of data that has been kept for a long period because it might have been useful someday, there is risk in simply dumping years of tweets, purchase histories, customer service conversations, and feedback surveys into a preprocessing queue for GenAI.

According to an AWS/MIT-sponsored survey quoted in the Harvard Business Review, among CDOs and other data leaders, "46% identified 'data quality' as the greatest challenge to realizing genAI's potential in their organizations." Another piece from MIT posits that "a majority of data (80% to 90%, according to multiple analyst estimates) is unstructured information like text, video, audio, web server logs, social media, and more." It's hard enough to make sure large databases full of relatively orderly numbers and text strings are current, complete, and accurate. Making sense of much bigger collections of heterogeneous, chaotic, multimedia data is the new frontier in data quality.

Traditional data observability approaches are useful for an overview, like making sure that the right amount of data came at the expected time. But with today's enterprises ingesting and processing enormous amounts of data from highly varied sources, and using it to make decisions without human intervention, it takes looking into the data itself to grow confident in its integrity.

For example, an AI-powered approach called unsupervised machine learning can, over the course of a few weeks, get to know how your data normally looks, so it can detect and let you know when things suddenly deviate from expectations. It can do this all very securely, too, either as a SOC 2-certified SaaS, or directly within a VPC. This can be applied to the enormous universe of unstructured data.

Attention is now turned to a detailed discussion of techniques related to unstructured data monitoring. Aspects of unstructured data monitoring can include analysis, reporting, and remedial actions (e.g., automatically fixing issues in data).

In some implementations, an unstructured data monitoring process evaluates the quality of unstructured data in multiple dimensions. For example, both of these approaches use AI to understand the nature and patterns of the data itself.

In some implementations, a monitoring dimension relates to ensuring the integrity of the data itself. For instance, if fine-tuning (of an AI model) refreshes continually or on a cadence, it'd be good to know when new learning material isn't showing up on time. Other important errors to suppress include duplicate content, content that doesn't match the metadata, and corrupted files.

In some implementations, a monitoring dimension relates to detecting what data shouldn't be used for training or fine-tuning. For example, data that shouldn't be used can include bias-laden freeform text and/or personally identifiable information. If the enterprise can keep the AI model from seeing it, it's not going to influence or even show up in the output. This dimension can be difficult to properly monitor when it comes to unstructured data, for example, due to the lack of an expected or consistent structure of the data being monitored.

Unstructured data monitoring is potentially a transformative technology for enterprises. To make Gen AI projects successful, enterprise internal data is brought to the model (e.g., an off-the-shelf model may not "just work" for enterprise use cases). The success of an enterprise's Gen AI effort can be proportional to the quality of the data brought to the model. Quality can be measured at the document level, for example text going into or coming out of Gen AI models. Unstructured data monitoring can bring high-quality data to Gen AI models (no matter how you implement them or the particular use case or application).

In some implementations, a check of a collection of documents is performed by calling the unstructured data monitoring process (also referred to as an "unstructured data analysis check", "unstructured data analysis task", or "unstructured data analysis") (e.g., a function, application, routine). In some implementations, the unstructured data monitoring process is a structured query language (SQL) function. In some implementations, the unstructured data monitoring process is a Python function. In some implementations, calling the unstructured data monitoring process includes specifying a location and/or identity of the collection of documents (e.g., and any additional data needed to access the collection) to be checked. For example, a collection of documents that includes unstructured data for analysis can be identified by the process, the collection including call transcripts, customer reviews, internal company documentation, customer support tickets, and internal messages. In some implementations, the unstructured data includes one or more of the following: text data, audio data, or visual data.

In some implementations, the unstructured data monitoring process performs a check of the collection of documents after a structured monitoring process performs a check of the collection of documents. For example, a checking process can include first analyzing the structured content of a collection and then analyzing the unstructured content. In some implementations, the output of the processes can be used to create graphical user interfaces and/or data visualizations (e.g., as described herein). Although referred to as structured and unstructured processes in this example, both structured and unstructured checks can be performed by the same process or processes.

In some implementations, the unstructured data monitoring process retrieves an entire document (e.g., from a data storage location) to check it. In some implementations, the unstructured data monitoring process does not retrieve an entire document (e.g., from a data storage location) to check it. For example, the unstructured data monitoring process in SQL can avoid retrieving an entire document to check it, whereas a different (e.g., Python) version would need to retrieve the entire document to check it.

In some implementations, the unstructured data monitoring process utilizes (e.g., creates and/or relies on creation of) a specified data class to extract statistics about unstructured data (e.g., documents that are checked by the function). For example, a "Document" class can be programmed into the function that causes the unstructured data monitoring process to generate particular data about a document being checked. For example, the unstructured data monitoring process can use (or add) a new Document class that takes in text and computes various statistics based on it. In some implementations, the Document class takes in any arbitrary text (e.g., in the form of a document or file) and produces the following statistics (e.g., using functions coded in Python):

document_length.
num_words
avg_word_length
num_lines
word_repetition_ratio
short_line_ratio In some implementations, the unstructured data monitoring process adds tone, sentiment, language, and a short summary (e.g., for each document in a collection) to a check when calling one or more ML models (e.g., LLM models). For example, the unstructured data monitoring process uses the following to call an ML model:

```
df.apply(
  lambda row: ai_lib.unstructured.llm.analyze_document (
    row["id"], row["document"]
  ),
  axis=1,
```

In some implementations, the unstructured data monitoring process calls (e.g., implements, applies, utilizes, and/or otherwise uses) (or is performed by) one or more ML models (e.g., algorithms or models) (e.g., large language model (LLM)) (e.g., AI model) to analyze the targeted collection of documents. In some implementations, the one or more ML models determines and/or generates document-level data (e.g., characteristic attributes and issue attributes about individual documents, such as those described below). In some implementations, the one or more ML models determines and/or generates collection-level data (e.g., characteristic attributes about the collection, such as those described below).

In some implementations, monitoring data quality includes (or is defined as) identifying an unexpected change that has an effect on the data. For example, the data is not aligned with what the user/data team thinks it means and therefore is an issue that needs an "alert" and to be "resolved". For example, unexpected changes can be to structured or unstructured data over time.

In some implementations, an unstructured data monitoring process performs profiling on a sample of documents (also referred to as checking or analyzing). In some implementations, the unstructured data monitoring process performs profiling on one or more document collections.

In some implementations, an unstructured data monitoring process supports checking text stored within any relational database or data warehouse. In some implementations, the unstructured data monitoring process supports documents stored in cloud storage. For example, the unstructured data monitoring process supports text stored in a table within any relational database or data warehouse.

In some implementations, an unstructured data monitoring process supports checking unstructured text stored in tables that are evaluated for data quality around various document collection characteristics like document length, language, abusive language, personal identifiable information (PII), and sentiment. For example, a user can use the results of the unstructured data monitoring process to quickly evaluate the quality of a document collection and identify issues from individual documents, reducing the time needed to identify high-value documents.

In some implementations, an unstructured data monitoring process performs continuous monitoring of unstructured data. In some implementations, unstructured data monitoring includes multiple levels of monitoring: document level, collection of documents, and time series of documents.

In some implementations, single document level monitoring monitors (e.g., checks and reports on) one or more of the following attributes: length, PII (e.g., where in the document occurs), sensitive or confidential information (e.g., company intellectual property), hate speech, sentiment, quality score, type/categories (e.g., log, chat interaction, article, prose, algorithm watermark, conversation, web page, JSON, code), topic, percentage of language in document, human reading level (grades), how well formatted, internally consistent, completed or truncated, exceeding a size limit, inconsistent with metadata, and/or similarity to other documents.

In some implementations, collection of documents monitoring monitors one or more of the following attributes: duplication, distance to one another (e.g., outlier, clusters), distribution of document-level, label consistency, and/or interpretability (e.g., sample drill down to individual rows).

In some implementations, monitoring is performed on a time series of documents, including monitoring arrival and inter-arrival, sudden appearance of new issues, spikes, distance from previous day's collection, and/or anything in collection level.

In some implementations, unstructured data is ambiguous as it does not have a predefined structure. In some implementations, forms of unstructured data include video, text, audio, and/or images. In some implementations, algorithms are needed to "decode" unstructured data into values that practitioners, data teams, or other processes (e.g., automated processes) can monitor. In some implementations, audio is converted to text for monitoring.

In some implementations, an unstructured data monitoring process enables data teams to detect, alert, and resolve quality issues before data is ingested by an AI model (e.g., GenAI model). For example, the unstructured data monitoring process monitors source material used to build a GenAI application. In some implementations, the unstructured data monitoring process monitors the inputs and outputs of GenAI applications and if there are distributional changes that could indicate anomalous behavior or usage of the model.

In some implementations, the unstructured data monitoring process includes providing a prompt to an ML model and causing the ML model to analyze a collection of documents according to the prompt. For example, the unstructured data monitoring process can retrieve or generate a natural language prompt, which is provided by the process to an ML model. In some implementations, the prompt includes instructions for analyzing the unstructured data in a plurality of documents that include unstructured data. For example, the instructions can indicate what analysis to perform, details on how analysis should be performed, and the content and form of the expected output. In some implementations, the prompt's instructions include instructions to extract a set of characteristic attributes defined in the prompt. In some implementations, the prompt's instructions include instructions to identify a set of issue attributes defined in the prompt.

In some implementations, a data quality monitoring system receives user input specifying one or more ML models to use for performing analysis. In some implementations, an ML model is an off-the-shelf model. For example, the input can specify an available ML model such as, for example, GPT-4 by OpenAI, Claude Sonnet by Anthropic, and Gemini by Google. In some implementations, the ML model is not off-the-shelf (e.g., a is a privately-developed and maintained model within the user's organization).

In some implementations, the unstructured data monitoring process determines a set of characteristic attributes for a collection of documents. For example, characteristic attributes can be freeform text, categorical values, or integer values. In some implementations, a set of characteristic attributes can include one or more of the following characteristic attributes: a topic of a target set of documents, a sentiment of a target set of documents, a summary of a target set of documents, a tone of a target set of documents, a language of a target set of documents, a quality grade of a target set of documents, or a category of a target set of documents. In some implementations, a characteristic attribute is extracted for individual documents, for multiple documents, or both. For example, summaries can be generated for each document in a collection, and also a single summary can be generated that summarizes the collection as a whole. Thus, a target set of documents for a characteristic attribute can be one or more documents.

Because data can be unstructured and freeform, characteristic attributes extracted (e.g., generated) for each document can be different. In some implementations, the ML model analyzes clusters of documents together when determining characteristic attributes. For example, topics can be generated based on groups of documents or groups of topics (e.g., the ML model generates meta-topics or high-level topics that are based on the topics of each document). For example, high-level topics for a particular collection can include: business operations, data management and quality, technical development, project management, product and software development, and work-life balance. In some implementations, the high-level topics are displayed in a visualization (e.g., bar chart).

In some implementations, the unstructured data monitoring process determines a set of issue attributes for a collection of documents. In some implementations, a set of issue attributes can include one or more of the following issue attributes: presence of personally identifiable information (PII) in a document, presence of abusive language in a document, presence of sensitive information in a document, or presence of duplicate documents.

In some implementations, an issue attribute is predefined (e.g., exists within the data monitoring platform and is selected by a user). In some implementations, an issue attribute is user-customized (e.g., an existing issue attribute that can be modified by user input). In some implementations, an issue attribute is user-defined (e.g., created based on user input). In some implementations, customized or defined issue attributes are stored in a database table. In some implementations, customizing an issue attribute causes the definition of the issue attribute to be changed for multiple document collections (e.g., across all multiple document collections). In some implementations, customizing an issue attribute causes the definition of the issue attribute to be changed for fewer than all document collections. For example, the customization can override a system-wide default definition for the issue attribute and apply only to a specific set of analysis tasks or document collections. For example, customization can include providing different penalties than the default setting for an issue attribute.

In some implementations, an unstructured data monitoring process includes requesting that an ML model assign a grade (also referred to as a "score") to each document in the collection. For example, grades can be letter grades (e.g., A, B, C, D, and so on), number grades, or any other suitable representation of a grade. In some implementations, requesting the grade includes providing criteria (e.g., a set of one or more criteria) for assigning a grade. In some implementations, the criteria and/or a set of weights (or values) associated with one or more components of the criteria is customizable (e.g., specified in a prompt when calling the ML model). For example, a user can control how grading works (e.g., if PII is important to them but abusive language is not) by increasing and/or decreasing the relative weight each component has on the grade (also referred to as a "quality grade"), and/or entirely disabling the contribution that some components have on the grade or grades.

In some implementations, the unstructured data monitoring process includes determining (e.g., by a data quality monitoring system or an ML model) a grade (score) based on one or more of the following: one or more characteristic attributes extracted from the respective document, or presence of one or more issue attributes identified in the respective document. For example, attribute class data (and, optionally, the prompt) can specify scoring criteria that includes values for each issue attribute, such that the data quality monitoring system (or, optionally, an ML model) adjusts a document's score based on such value (e.g., decreases or increases the score by the value, depending on the specified scoring philosophy) when the issue attribute indicates the presence of the issue. For example, if a document is found to include PII, which is associated with a value that reduces score by 8 points, the document's score is reduced by 8 points. In some implementations, the score is adjusted once if the issue is present one or more times (e.g., multiple occurrences of PII within a document results in a total reduction of 8 points for that issue). In some implementations, the score is adjusted once for each instance of an issue attribute being present (e.g., multiple occurrences of PII within a document results in a reduction of 8 points for each instance of PII in the document). In some implementations, each document begins with a baseline score and the presence of one or more issues (and their associated values) adjusts the baseline score to determine the document score. For example, each document can begin with a baseline score of 10, which is reduced based on present issues. For example, for a given document, if an issue is present that is associated with a reduction by 8 points, then the given document's score will be 2.

In some implementations, the scoring criteria includes a criteria related to internal consistency within the document (e.g., the criteria relying on whether the document contradicts itself or not). In some implementations, the scoring criteria includes a criteria related to the writing level within the document (e.g., complex, advanced, or professional on one end of the spectrum versus elementary or basic on the other end of the spectrum). For example, the criteria related to writing level can affect the score based on one or more of the following criteria:

What fraction of the words are spelling mistakes?

What fraction of sentences have grammatical errors?

If this was written by a professional, what would their title most likely be? (doctor, lawyer, engineer, programmer, scientist, etc.)

If this was about a function in a business, which function would it be about? (finance, legal, people, operations, sales, marketing, etc.)

Does this content appear to be biased?

Is this written in a more persuasive, conversational, factual, or prose style?

Is this document about the past, the present, or the future?

In some implementations, an unstructured data monitoring process includes requesting that an ML model return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model.

For example, characteristic attributes can be represented in different ways, and thus reported in results having different formats. Some characteristic attributes can include one or more assigned categories. For instance, the prompt may request that an ML model assign a document to one or more of a set of categories (e.g., specified in the prompt), such as "Call Transcript", "Customer Review", "Invoice", and "Internal Documentation". Another example can include the ML model assigning one or more topics (of a finite set of topics) to each respective document.

In some implementations, a characteristic attribute is predefined (e.g., exists within the data monitoring platform and is selected by a user). In some implementations, a characteristic attribute is user-customized (e.g., an existing characteristic attribute that can be modified by user input). In some implementations, a characteristic attribute is user-defined (e.g., created based on user input). In some implementations, customized or defined characteristic attributes are stored in a database table. In some implementations, customizing a characteristic attribute causes the definition of the character attribute to be changed for multiple document collections (e.g., across all multiple document collections). In some implementations, customizing a characteristic attribute causes the definition of the character attribute to be changed for fewer than all document collections. For example, the customization can override a system-wide default definition for the character attribute and apply only to a specific set of analysis tasks or document collections.

Some characteristic attributes can include one or more integers representing a value associated with a respective document. For example, a characteristic attribute can be "Number of Words" and correspond to a result that is an integer representing the number of words in the document (e.g., as determined by the ML model during analysis).

Some characteristic attributes can include a string. For example, one of the characteristic attributes extracted by an ML model can be a summary of a respective document. In such example, the summary itself can be freeform text describing the content of the document in plain language and, therefore, be included in results as a string. Examples of document and collection summaries are provided elsewhere herein.

In some implementations, an unstructured data monitoring process includes requesting that an ML model return results for each issue attribute in the set of issue attributes, the results for each issue attribute including, for each document in the analyzed set of documents, one or more of the following: a Boolean value representing presence of the issue attribute in a respective document and determined by the ML model, or a representation of unstructured content from the respective document that caused the issue attribute to be identified as present by the ML model. For example, the Boolean value representing presence of the issue attribute for PII can have a value corresponding to "True" if PII is present in a document or can have a value corresponding to "False" if PII is not present in the document. Each document in the analyzed collection can include a Boolean value for the PII issue, as well as separate Boolean values for other issue attributes that were part of the analysis (e.g., presence of abusive language, is incomplete, or others). The results can include portions of content that caused the issue attribute to be identified as present (e.g., when the Boolean value is "True"). This portion of content can also be referred to as an "issue entity" or "entity". For instance, if a document includes the person's name "Jane Doe", then a name PII issue can be found present ("True") and be associated with a corresponding issue entity field in the results that includes the text string "Jane Doe".

In some implementations, the ML model returns a distribution of duplicate and non-duplicate data (e.g., a number of duplicate documents, a number of non-duplicate documents, an identification of which documents are duplicates, an identification of which documents are not duplicates, or any combination thereof). Identifying duplicate data can be important when performing the check on unstructured data because, for example, duplicate documents used as input to train an AI model can bias the resulting model. In some implementations, duplicate documents are removed from the collection (e.g., or otherwise excluded from AI training) after being identified.

In some implementations, the ML model returns a distribution of documents with abusive language (e.g., a number of documents with abusive language, a number of documents without abusive language, an identification of which documents include abusive language, an identification of which documents do not include abusive language, or any combination thereof). Identifying documents with abusive language can be important when performing the check on unstructured data because, for example, documents with abusive language that are used as input to train an AI model can result in the model learning and repeating such language. In some implementations, documents with abusive language are removed from the collection (e.g., or otherwise excluded from AI training) after being identified.

In some implementations, the ML model returns a distribution of sentiment (e.g., positive, neutral, negative) (e.g., a number of positive sentiment documents, a number of neutral sentiment documents, and a number of negative sentiment documents). Identifying sentiment data can be important when performing the check on unstructured data because, for example, documents embodying certain sentiments used as input to train an AI model can bias the resulting model. In some implementations, documents embodying certain types of sentiment are removed from the collection (e.g., or otherwise excluded from AI training) after being identified.

In some implementations, the ML model returns a distribution of document tone (e.g., professional, formal, informal, casual, technical) (e.g., a number of documents with professional tone, a number of documents with formal tone, a number of documents with informal tone, a number of documents with casual tone, a number of documents with technical tone). Identifying tone data can be important when performing the check on unstructured data because, for example, documents embodying certain types of tone used as input to train an AI model can bias the resulting model. In some implementations, documents embodying certain types of tone are removed from the collection (e.g., or otherwise excluded from AI training) after being identified.

In some implementations, the ML model returns a distribution of language (e.g., a number of documents in the English language and a number of documents in non-English language). Identifying the language data can be important when performing the check on unstructured data because, for example, documents in different or unintended languages that are used as input to train an AI model can bias the resulting model. In some implementations, documents in certain languages are removed from the collection (e.g., or otherwise excluded from AI training) after being identified.

In some implementations, the ML model returns one or more of the items of data described with respect to FIGS. 5-21. For example, such data can correspond to a document collection (e.g., describes collection-level statistics or context) or correspond to a particular document of the document collection (e.g., describes document-level statistics or context).

Figure 21:
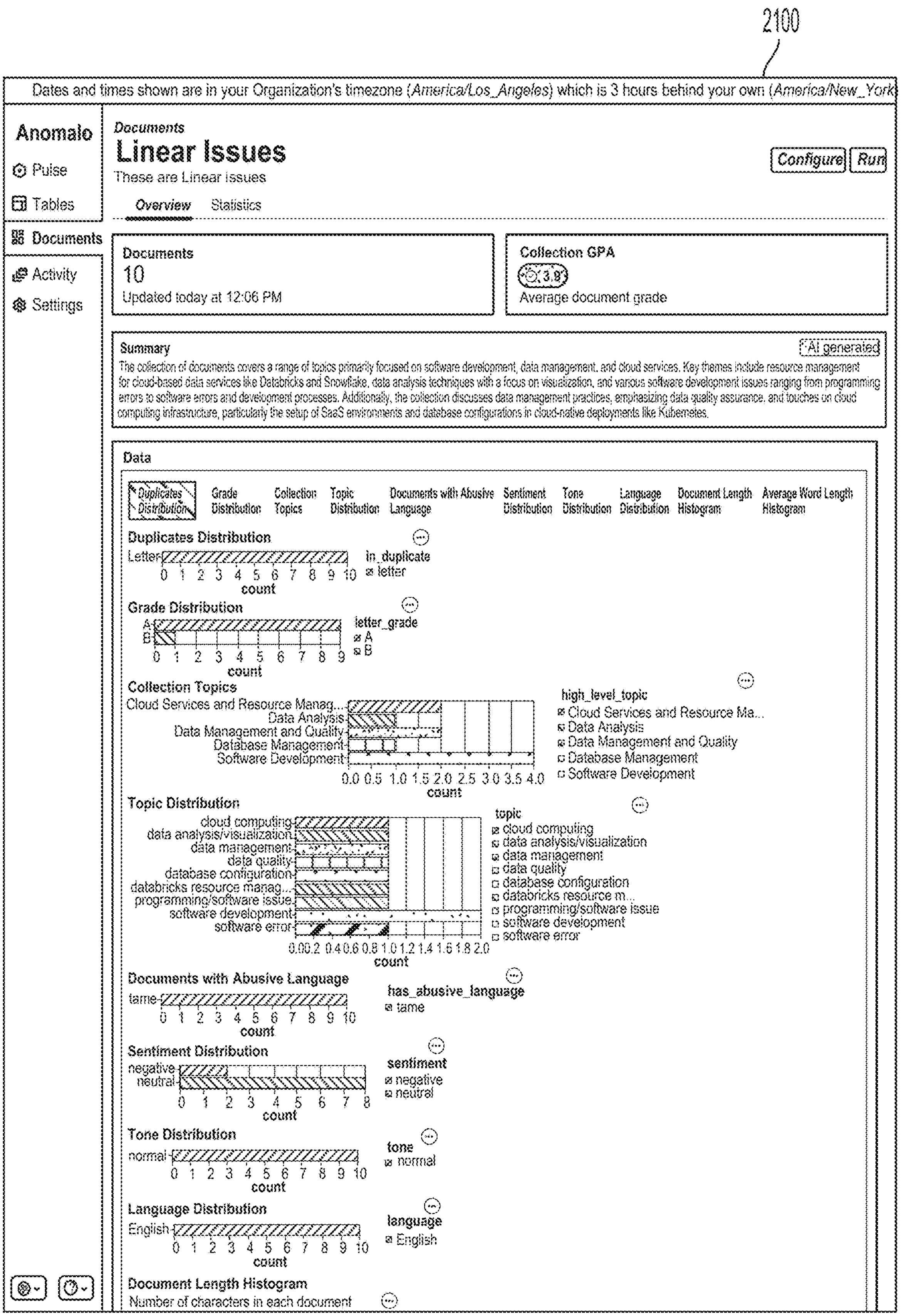
FIG. 21 illustrates an example of a data quality monitoring interface.

In some implementations, one or more items of the results data are displayed in one or more data visualizations. For example, data visualizations can be representations of the results data, illustrating distributions or statistics of the results. As an example, a data visualization showing a distribution of the types of sentiment in a document collection can be displayed in a user interface dashboard. For instance, FIGS. 5 and 21 illustrate examples of data visualizations of distributions in a dashboard.

A check of unstructured data can include extraction of high-level topics and themes. In some implementations, the unstructured data monitoring process prompts the one or more ML model to take the extracted topics and cluster and organize them. In some implementations, a function (e.g., an application, a process, or instructions) of the unstructured data monitoring process provides, to the one or more ML model, the prompt together with the extracted topics. In some implementations, an AIAnalyzer class calls the function for providing the prompt and topics. In some implementations, the AIAnalyzer class creates a dataframe of all of the topics (e.g., for providing to the ML model). For example, FIG. 21 illustrates an example of high-level topics represented in a visualization titled "Collection Topics".

A check of unstructured data can include extraction of a collection level summary. In some implementations, the unstructured data monitoring process prompts the one or more ML model to make a summary of all of the documents in the collection (e.g., a summary of the summaries created for each document). In some implementations, the result is returned as a JSON result. Several examples of collection-level summaries follow.

The following is an example of a collection summary: "The collection of documents encompasses a wide range of topics related to corporate and technical operations. It includes materials on workplace management such as policy, communication, and progress updates; technical aspects like software development, API management, and technical support; business operations including meetings and planning; and a strong focus on data management with documents on quality, analysis, validation, and monitoring. Additionally, there are miscellaneous topics that do not fall into these categories. Overall, the collection represents a comprehensive overview of the multifaceted nature of running and maintaining a modern business environment with a particular emphasis on data and software practices."

The following is another example of a collection summary: "The collection of documents spans a variety of topics related to business and workplace management, technology and software development, and data management and quality. Key themes include the administration of workplace IT, software development practices, strategic business operations, and the intricacies of data analysis, monitoring, and quality assurance. Workplace communication is a recurring subject, emphasizing the importance of effective dialogue in technical and operational contexts. The documents also touch on the setup and use of data monitoring tools, preparation for business meetings, and the integration of technology in the workplace. Overall, the collection reflects a comprehensive view of the interplay between data management, business strategy, and workplace efficiency."

The following is yet another example of a collection summary: "The collection of documents revolves around three main themes: Data Management and Quality, Business Operations, and Workplace Management. The Data Management and Quality theme includes discussions on data quality monitoring tools, business partnerships related to data, validation, migration, and product features, as well as training on the Anomalo platform. Business Operations encompass strategic planning, financial discussions, client engagement, and various negotiation scenarios. Workplace Management is focused on communication within the workplace, addressing topics such as meeting attendance, project deliverables, and technical issues. Overall, the collection highlights the intersection of data quality initiatives with business strategy and workplace collaboration."

In some implementations, a prompt provided to an ML model (e.g., by an unstructured data monitoring process) includes formatting instructions for structured formatting of results to be returned by the ML model. For example, the prompt providing instructions to the ML model for analyzing a collection of documents can include instructions specifying a particular structured format for the results. The structured format of the results output can be used to assist data quality operations. For instance, the structured format can be used for continuous data quality monitoring of the data collection (e.g., performing structured data analysis over time, such as monitoring for unexpected changes in structured fields over time). The structured format can also be used to verify operation of the ML model. For example, the unstructured data monitoring process can perform validation of the results received from the ML model, including determining whether the structured format of the results complies with formatting instructions in the prompt. If the format of the results do not comply, it can signify a problem (e.g., with the ML model, the prompt, or merely a formatting error). In some implementations, in response to a determination that the structured format of the results does not comply with the formatting instructions in the prompt, the ML model can be prompted to fix a non-compliant portion of the results. For example, if the results do not include issue entities for issue attributes, the ML model can be provided with a follow up prompt indicating that the results should be updated to include the entities.

In some implementations, the ML model returns results in a particular format (e.g., JSON). In some implementations, the results are expanded (e.g., using JSONExpander to expand the JSON results). In some implementations, expanded columns are renamed. In some implementations, the results returned by the one or more ML models are concatenated to existing data corresponding to the documents. For example, the results are concatenated to the statistics computed by the Document class. In some implementations, the unstructured data monitoring process utilizes an AIAnalyzer class that takes a dataframe and calls the one or more ML models. In some implementations, the Document class calls the one or more ML models.

Figure 20:
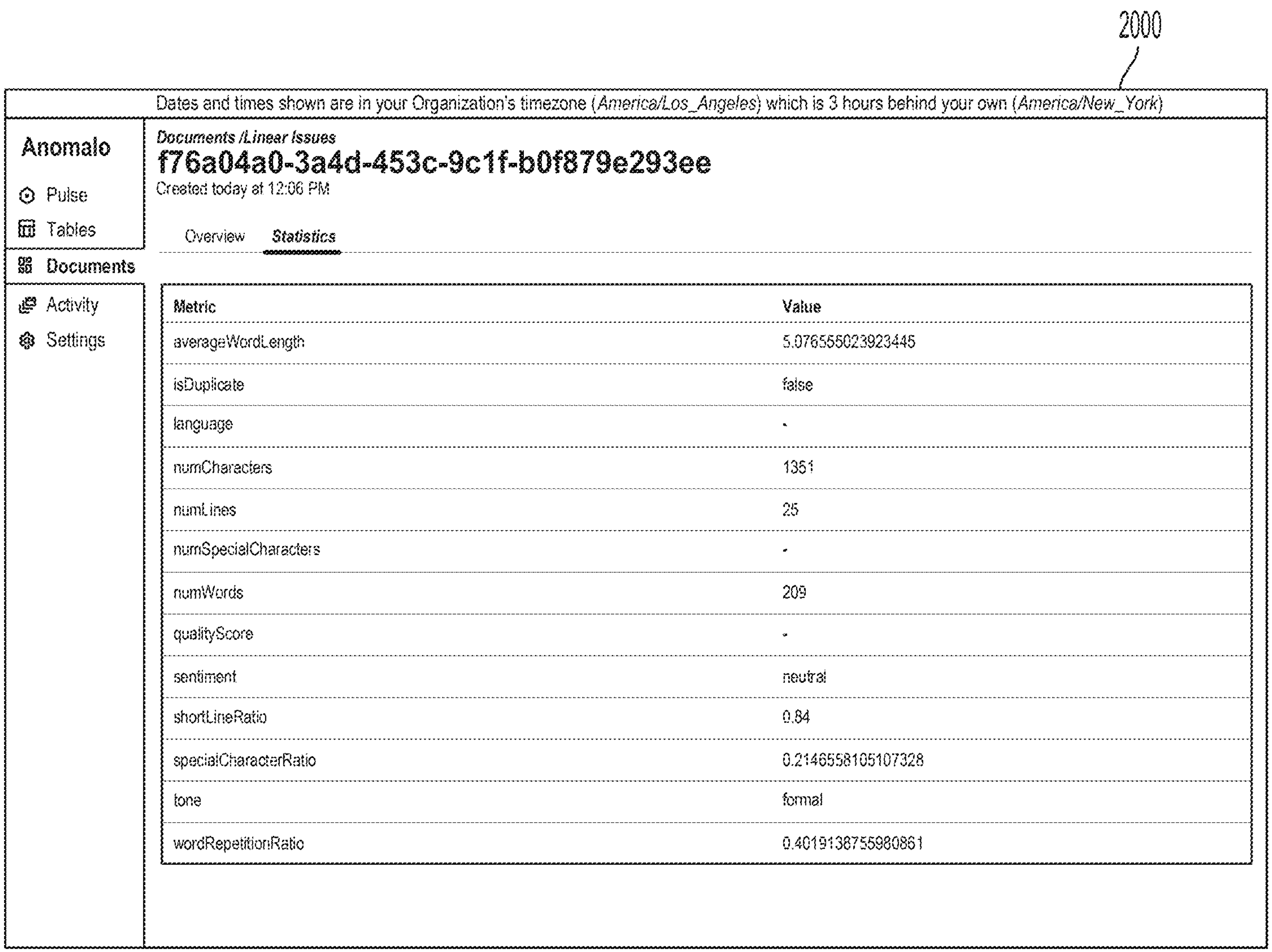
FIG. 20 illustrates an example of a data quality monitoring interface.

Attention is now directed to generating a prompt for deploying an ML model to perform unstructured data analysis. In some implementations, a prompt can be received via input (e.g., user input) or generated by an unstructured data monitoring process. For example, the platform can receive input selecting or defining one or more of the following parameters: issue attributes to identify, characteristic attributes to extract, formatting of results, identity of a set of documents to analyze, which ML model or models to use, configuration of alerts (notifications), remedial actions to perform, configuration details for a new dataset to be created based on the results, and scheduling configuration. Some or all the parameters for unstructured data analysis can be toggled or customized via user input at one or more interfaces of a data quality monitoring system. Some example user interfaces for selecting or defining analysis parameters are illustrated in FIGS. 20 and 21 and described herein.

In some implementations, the prompt is generated based on one or more of the selected parameters (e.g., default parameters, user-selected parameters, or user-customized or specified parameters). For example, the data quality monitoring system can create a plain language prompt for an ML model by combining sub-prompts, where each sub-prompt represents one or more parameters. For instance, each characteristic attribute that should be extracted by the analysis can correspond to a respective sub-prompt that defines the name of the characteristic attribute, how it is defined, and how it should be reported in the results. Likewise, each issue attribute that should be identified can correspond to a respective sub-prompt that defines the name of the issue attribute, how it is defined, and how it should be reported in the results.

Example sub-prompts for extracting characteristic attributes include: "title: title in English that is no more than 50 characters", and another can be "topic: the primary topic in English", and yet another can be "writing_level: level of writing, using only the following categories: Elementary, High School, Undergraduate, Professional, Creative and Informal". In some implementations, in the prompt provided to the ML model, sub-prompts can be preceded by a general sub-prompt. For example, sub-prompts for characteristic attributes can be preceded by the general sub-prompt: "Identify this general information about the document in JSON format: . . . ".

Example sub-prompts for identifying issue attributes include: "has_pii_contact: contains contact PII linked to an individual not an entity, using on the following categories: Full Home Address, Phone Number, Email Address", and another can be "is_incomplete: appears to be truncated or is clearly missing expected content", and yet another can be "has_pii_full_name: contains full name PII linked to an individual not an entity, using on the following categories: Full Name", and yet another can be "has_abusive_language: contains abusive language that would be deemed offensive in a work context". For example, sub-prompts for issue attributes can be preceded by the general sub-prompt: "Identify the following specific issues in the document in JSON format: . . . ".

In some implementations, prior to generating the prompt, attribute classes are created that specify how attributes are defined. For example, characteristic attributes and issue attributes are defined in dedicated respective Python classes (e.g., a Topic class, a Sentiment class, a Tone class, an AbusiveLanguage class, a NegativeSentiment class, a ProprietaryInformation class, and others). In some implementations, an attribute class includes data defining attributes and behaviors for a characteristic attribute or an issue attribute, which can be used to create an instance of the class.

In some implementations, attribute classes are stored in one or more registries that include a listing of attribute classes. For example, a registry named "characteristic_attribute_registry" can be maintained in the data quality monitoring system, the registry including information for each characteristic attributes defined in the platform and available for use by unstructured data monitoring processes.

FIGS. 4A-4B illustrate example registry entries defining attributes. FIG. 4A illustrates a portion of a registry 400 that includes entries for characteristic attribute classes (referred to as "metadata attributes" in the FIG. 4A). Registry 400 in FIG. 4A includes defined classes for three characteristic attributes. The first class is named "Title", that includes a prompt string (e.g., a sub-prompt) including the text "title in English that is no more than 50 characters" that defines instructions, for example, to an ML model for extracting the Title characteristic attribute. The second class is named "ShortDescription", that includes a prompt string including the text "short description in English" that defines instructions, for example, to an ML model for extracting the ShortDesription characteristic attribute. The third class is named "Summary", that includes a prompt string "long summary in English" that defines instructions, for example, to an ML model for extracting the Summary characteristic attribute. Classes for other characteristics can be defined in a registry similarly to those illustrated in registry 400 of FIG. 4A.

FIG. 4B illustrates a portion of a registry 450 that includes entries for issue attribute classes. Registry 450 in FIG. 4B includes defined classes for four issue attributes. The first class is named "AbusiveLanguage" (or "has_abusive_language"), that includes a prompt string including the text "contains abusive language that would be deemed offensive in a work context" that defines instructions, for example, to an ML model for identifying presence of the AbusiveLanguage issue attribute. The "AbusiveLangauge" class also defines object attributes defining that the AbusiveLanguage class is associated with capturable issue entities ("has_capturable_entities=True"), a scoring adjustment value ("default_penalty=−8"), and that the issue attribute is associated with sensitive content ("default_sensitive=True") (e.g., the issue entity is expected to include sensitive content). Registry 450 in FIG. 4B also includes entries for the issue attributes "NegativeSentiment", "ProprietaryInformation", and "IsPoorlyWritten", which are defined similarly as described with respect to "AbusiveLanguage" but that are not defined as associated with capturable issue entities or sensitive content. For example, for the issue attribute "NegativeSentiment", the check will not return an issue entity (e.g., portion of content) even if the issue attribute is determined to be present (e.g., document has a negative sentiment). Classes for other issue attributes can be defined in a registry similarly to those illustrated in registry 450 of FIG. 4B.

In some implementations, an unstructured data monitoring process receives input defining or customizing a class. In some implementations, a new class is defined based on the input. For example, a user can define an entirely new issue attribute to check for and the data quality monitoring system can, in response, create a new class for that issue attribute and store it in the issue attribute registry. In an example where an existing issue attribute is edited by the user input, an existing class can be modified to reflect the user input. For example, the class as defined in the registry can be modified, or an instance of a class created from the registry can be modified to reflect the user input.

In some implementations, an unstructured data monitoring process includes instantiating classes for each of the selected characteristic and issue attributes. For example, for each characteristic attribute and issue attribute selected to be part of the analysis (e.g., selected via input received by the data quality monitoring system), an instance of the class (e.g., an instance in memory) is created from the registry. In some implementations, instantiating a class causes a sub-prompt string to be generated for that class. For example, the sub-prompts "title: title in English that is no more than 50 characters" can be generated from the corresponding Title class defined in the registry. In some implementations, instantiating the class generates the corresponding sub-prompt (e.g., the sub-prompt is included in an object instantiated from the class). In some implementations, the sub-prompt is generated based on the instantiated class (e.g., attributes of the object instantiated are used to construct the sub-prompt).

Figure 6A:
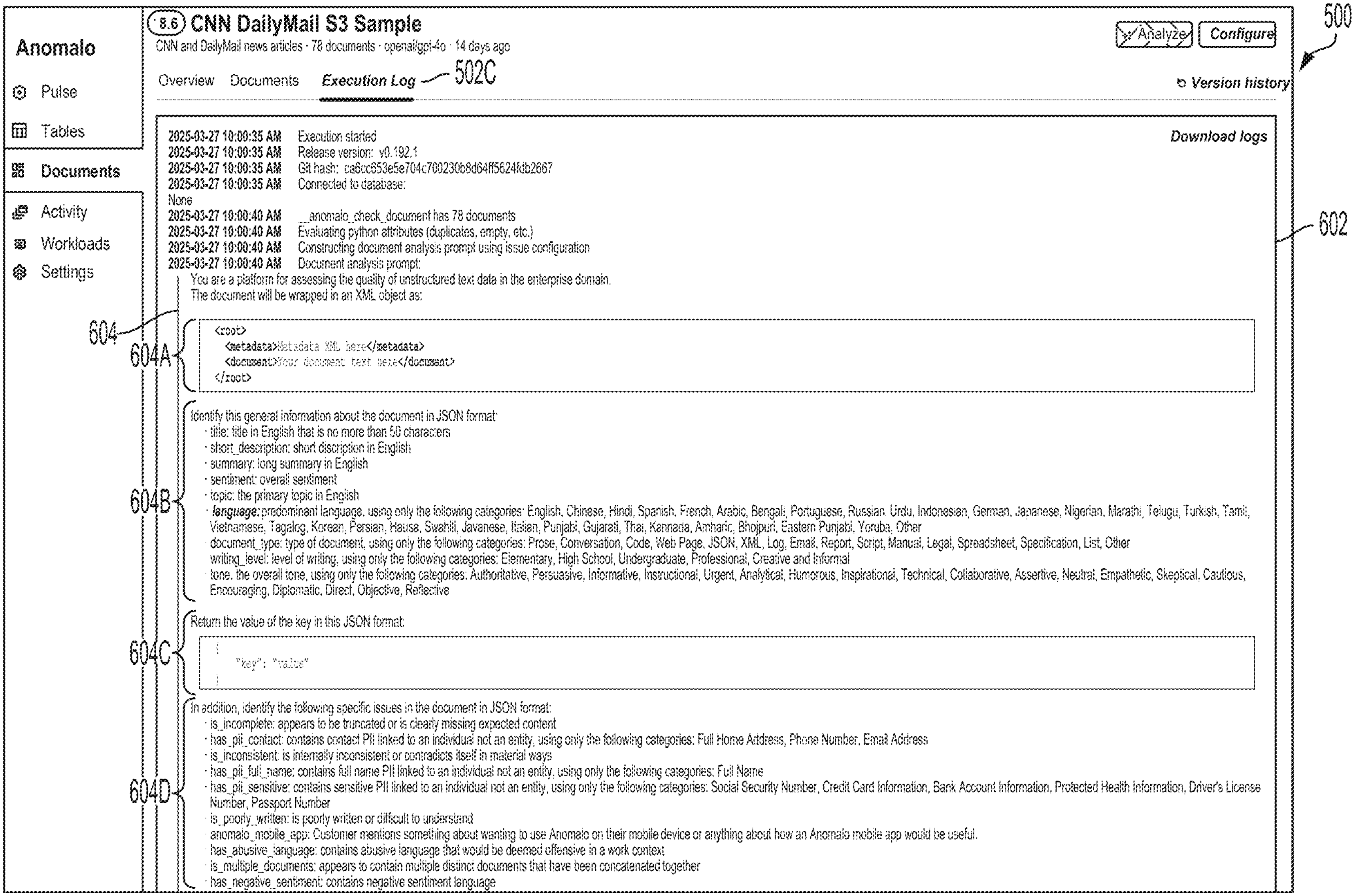
FIGS. 6A-6B illustrates an example of a data quality monitoring interface.
Figure 6B:

In some implementations, the data quality monitoring system generates the prompt by combining sub-prompts for one or more attributes to be analyzed. For example, the sub-prompts determined from each of the instantiated classes are combined (e.g., concatenated or otherwise assembled) into a prompt. In some implementations, the data quality monitoring subsystem generates a plurality of prompts. For example, generating the prompt can include generating separate prompts that are provided to one or more ML models at separate times (e.g., sequentially). An example prompt is illustrated in FIGS. 6A-6B.

In some implementations, the prompt (e.g., in one or more sub-prompts or additional prompt strings) includes instructions to return issue entities for one or more issue attributes. For example, the prompt can include instructions to return, in a structured output field of the results, representations of unstructured content from the respective document that caused a corresponding issue attribute to be identified as present by the ML model. In some implementations, the structured results do not include a column for issue entities (e.g., the entities can be in an LLM's explanation, but not its own field).

In addition to combining sub-prompts for characteristic attributes and issue attributes, the prompt can include one or more additional prompt strings.

In some implementations, the one or more additional prompt strings include information related to the set of documents to be analyzed (e.g., the documents, a pointer to a location, metadata about the documents, or other information). For example, information related to the set of documents can include information about the format of the document collection being used as input, such as the text: "The document will be wrapped in an XML object as: . . . " followed by an example XML object structure.

In some implementations, the one or more additional prompt strings include formatting instructions for the results of the analysis. The formatting instructions can correspond to formatting results for characteristic attributes. For example, the prompt can include the text "Return the value of the key in this JSON format: . . . " followed by an example JSON structure (e.g., expressed as a key having a value). The formatting instructions can correspond to formatting instructions for issue attributes For example, the prompt can include the text "Return a nested JSON with a True or False 'value' for each issue key and include an 'explanation' of exactly what contents of the document led you to your decision in this JSON format: . . . " followed by an example nested JSON structure (e.g., expressed as a key having a value and an explanation).

In some implementations, formatting instructions in the prompt include one or more examples of structured results. For example, an example set of correctly formatted results for a characteristic attribute, an issue attribute, or both can be provided in the prompt. Other examples of formatting instructions include statements such as "Ensure that any specific examples in the explanation are presented verbatim and enclosed in single quotes," and "Special XML characters in these examples such as <, & should be converted back into their plan text equivalents." For instance, in the preceding example statement, "specific examples in the explanation" with respect to an issue attribute can refer to (or include) one or more issue entities that caused the issue attribute to be True.

In some implementations, the one or more additional prompt strings include analysis instructions. In some implementations, analysis instructions in the prompt provide an ML model with details on how to perform the analysis, such as "Only flag documents that have the issue in a clear and unambiguous way that you can easily explain. For example, if a document is just discussing the issues, do not flag it as having the issue." Another example is "Use the metadata only to provide additional context about the document, do not identify issues in the metadata itself."

In some implementations, the one or more additional prompt strings include one or more filtering criteria. For example, the filtering criteria can indicate a set of criteria for including or excluding documents (e.g., from a plurality of documents provided for analysis) from at least a portion of analysis according to the prompt. For instance, the filtering criteria can state that documents matching certain characteristic attributes or issue attributes should be excluded from further analysis. As an example, the prompt can first check documents for characteristic attributes and instruct an ML model to exclude documents that fall into a certain specified category (e.g., "Marked for Deletion") from issue attribute checking. This can save time and resources (e.g., of the ML model) and prevent documents considered irrelevant to a check from biasing results (e.g., collection-level summaries).

The prompt generated for the ML model can include plain language instructions to an ML model for performing the analysis. In some implementations, the text of the prompt can be edited by user input. For example, the platform can provide the ability to directly edit the prompt via user input to make changes, deletions, or additions to the prompt. As another example, the platform can provide the ability to edit the prompt indirectly via user input at other stages of configuration of unstructured data analysis (e.g., when creating or customizing an attribute class, selecting options, or in a text entry field).

In some implementations, the unstructured data monitoring process identifies a plurality of documents (e.g., a collection of documents) for unstructured data analysis. For example, identifying the plurality of documents can include receiving input that identifies the documents, retrieving a configuration setting that identifies the documents, or both. The collection of documents can include document formats that include unstructured data (e.g., PDFs, text files, HTML). In some implementations, the documents are stored in a data warehouse, cloud storage, or both.

Attention is now turned to techniques for performing unstructured data analysis. After generating the prompt, the data quality monitoring system can provide the prompt (e.g., in whole or in part) to one or more ML models. Providing the prompt to an ML model can cause the ML model to perform analysis according to the instructions in the prompt. Any reference to "an" ML model or "the" ML model in the singular should be understood to cover possible implementations that use a set of one or more ML models.

In some implementations, performing unstructured data analysis includes performing multiple analysis passes. For example, the analysis can be performed using multiple discrete passes that perform different operations. Performing analysis in multiple passes can lead to more efficient analysis, a reduction in incorrect results, and better quality analysis results. For instance, breaking an analysis into multiple passes enables discrete analysis steps that may be contextually aware of the results of previous passes, allowing more efficient processing and potentially results with deep insight into unstructured data. Further, performing multiple passes can enable filtering criteria to be enforced, thereby reducing unneeded analysis. Prompt-based methodology can also allow both characteristic attribute extraction and issue attribute identification to occur simultaneously to avoid redundant processing.

In some implementations, an unstructured data monitoring process causes an ML model to perform unstructured data analysis in multiple passes. For example, causing an ML model to perform multiple passes can include providing a generated prompt (or portions thereof or multiple prompts) to the ML model in a manner that enforces the multiple passes. For example, the ML model can be provided with the prompt and instructed (in the prompt or otherwise) to perform the multiple passes. As another example, the ML model can be provided with portions of the prompt (or different prompts) sequentially, causing portions of the overall unstructured data analysis to be performed in a stepwise manner. For instance, each module of an AIAnalyzer class function responsible for a respective pass can provide the ML model with a prompt for performing that respective pass.

In some implementations, an unstructured data monitoring process aggregates results of calls to ML models across the entire collection. For example, an ML model can have a limited context window, so analyzing a few very long documents or many short documents can result in running out of context window. One approach for overcoming the context window limitation is to analyze the documents in multiple calls and then aggregate the results (e.g., by calling the LLM again). For example, individual document analysis for documents in a collection can involve one call to the ML model for each document such that the entire context window is available for each document. Further, additional calls can be made for aggregating results or analyzing aggregated results (e.g., cluster-level or collection-level analysis) to receive a single output. Using one or more techniques such as multiple calls, aggregating results, and cascading analysis using aggregation between analysis passes can allow unstructured analysis to scale to hundreds of thousands of documents analyzed at a time.

In some implementations, the unstructured data monitoring process causes an ML model to perform a first pass that includes individually analyzing documents of the plurality of documents to generate first output. For example, the data quality monitoring system makes a first call (e.g., the generated prompt) to the ML model with instructions to perform document-level analysis of each document for a collection of documents. In some implementations, the first output includes, for each respective document, extracted characteristic attributes and identified issue attributes of the respective document. For example, the first pass includes determining "document-level" attributes of individual documents such as topic, summary, category, and whether any issues are present.

In some implementations, the first output of the first pass includes issue entities representations of unstructured content that caused one or more issue attributes to be identified as present by the ML model. For example, the first output includes issue entities for the issue attributes identified as present by the first pass.

In some implementations, an unstructured data monitoring process causes an ML model to perform a second pass that includes analyzing clusters of documents. In some implementations, a cluster of documents includes documents clustered by one or more characteristic attributes (e.g., determined from the first output of the ML model). For example, documents having the same or similar topic or category can be clustered (grouped) for the purpose of processing in a second pass. In some implementations, clustering of documents is performed by the system performing the unstructured data monitoring process (e.g., the data quality monitoring system). For example, the clustering can be performed using the results returned by the ML model (e.g., clustering is not performed by the ML model). In some implementations, the clustering is performed by the ML model. For example, the ML model can automatically cluster or can suggest clusters that can be accepted by the system. In some implementations, the system makes a second call to the ML model to perform the second pass. For example, where the clustering is performed (or accepted) by the system, the second call to the ML model can include a follow-up prompt identifying the clusters and instructions to perform the desired analysis for the second pass. The second pass can be used to generate high level topics and summaries.

In some implementations, the second pass includes, for each cluster of documents, analyzing the characteristic attributes of the first output for documents in the cluster to generate second output that includes "cluster-level" characteristic attributes identified according to the set of characteristic attributes defined in the prompt. For example, the second pass can include an ML model performing a meta-analysis of characteristic attributes derived in the first pass to determine characteristic attributes of the clustered groups. In some implementations, the size of clusters is selected based on performance limitations (e.g., the data quality monitoring system, the ML model or underlying platform, or both).

In some implementations, the second pass includes meta-analysis of clustered group characteristic attributes. For example, the meta-analysis can be cascaded and multiple sets of "cluster-level" characteristic attributes (e.g., corresponding to multiple clusters) are again analyzed to generate cluster-level characteristic attributes applicable to the combined clusters. Consider that large document collections may result in many similar clusters. Meta-analysis of multiple clusters can enable creation of accurate cluster-level or collection-level characteristic attributes for like clusters. In some implementations, the second pass includes analysis of one or more issue attributes (e.g., issues present in document-level or cluster-level characteristic attributes).

In some implementations, an unstructured data monitoring process causes an ML model to perform a third pass that includes analyzing the cluster-level characteristic attributes of the second output to generate third output that includes "collection-level" characteristic attributes of the plurality of documents. For example, an overall summary of the collection can be generated by the ML model by analyzing the cluster-level characteristic attributes. Meta-analysis of multiple clusters can enable creation of an accurate collection-level characteristic attributes. The meta-analysis of multiple clusters discussed with respect to the second pass can instead be performed as (or considered) a third pass. In some implementations, collection-level characteristic attributes of the collection of documents includes one or more of the content (e.g., a plain text summary of content summaries of individual documents), topics (e.g., a plain text summary of the topics of individual documents), or other characteristic attribute. In some implementations, the third pass includes analysis of one or more issue attributes (e.g., issues present in cluster-level characteristic attributes).

In some implementations, the system makes a third call to the ML model to perform the third pass. For example, the third call to the ML model can include a follow-up prompt with relevant data and instructions to perform the desired analysis for the third pass. The third pass can be used to generate a comprehensive summary of the text and topics of the collection.

For example, an AIAnalyzer class on the data quality monitoring system can orchestrate the multiple passes to go from document-level to cluster-level to collection-level attributes. An example AIAnalyzer class can include three modules corresponding to document-level, cluster-level, and collection-level analyses. For instance, a first module of the AIAnalyzer class can request that an ML model (e.g., LLM) identify document-level characteristic attributes (e.g., including summary) and issue attributes. As an example, these document-level attributes and other information are stored in a dataframe. For instance, this dataframe can include document content, other pulled metadata, and the ML model-identified attributes. For a second pass, the AIAnalyzer can pull characteristic attributes (e.g., the summaries) from this dataframe for a second module of the AIAnalyzer class. The second module can ask the ML model to determine topics from the summaries (e.g., this can be considered as operating at the cluster-level). For a third pass, the AIAnalyzer can take all of these topics for a third module of the AIAnalyzer. The third module can ask the ML model to determine a summary for the whole document collection. The results from all of these modules are compiled into one dataframe. In some implementations, the number of modules or passes, and particular actions performed (or requested of the ML model) at each pass, can be different than as described in this example.

The preceding discussion refers to an example having three passes. In some implementations, each pass includes multiple passes. For example, the first pass providing document-level analysis can be split into multiple passes ("subpasses") (e.g., one for characteristic attributes and one for issue attributes).

The use of multiple passes for analysis can provide a solution to context window limitations of ML models. For example, chaining steps may overcome context window limitations of LLMs. In some implementations, the unstructured data analysis utilizes an off-the-shelf ML model (e.g., LLM) without fine-tuning. In some implementations, the analysis uses a fine-tuned ML model.

In some implementations, an unstructured data monitoring process receives results from an ML model. In some implementations, results are received from the ML model in a structured format (e.g., according to instructions in the prompt). For example, the results are based on one or more of the multiple passes (e.g., the first output of the first pass, the second output of the second pass, and the third output of the third pass). For instance, the results can include the results of all passes or fewer than all passes. For example, the results of each pass can be received after the analysis for that pass.

In some implementations, a data quality monitoring system outputs a representation of the results. In some implementations, the representation includes one or more visualizations generated from the results. For example, the data quality monitoring system can generate charts and other visual representations of the characteristic attributes and issue attributes found by the analysis performed by an ML model.

In some implementations, outputting the representation of the results includes storing a representation of the results in a storage resource. In some implementations, a representation of the results includes a new document collection. For example, a new instance or data view of a collection of documents (e.g., modified or curated based on the results of the analysis of a base collection of documents) can be stored. For instance, the new collection can include documents cleaned to remove PII and other issues such as duplicates.

In some implementations, the unstructured data monitoring process includes modifying the collection of documents used as input to the analysis. This can be referred to as "fixing" issues in the content of the document, and can be performed automatically based on the structured output of the analysis. Modifying a document collection can be used to create a clean data set for any purpose, including training a generative AI algorithm. Training with a cleaned data set can reduce unwanted bias or behaviors from a resulting generative AI model. Modifying a collection of documents can include modifying the collection as it exists or creating a new, modified set of documents that is distinct from the original collection. In some implementations, modifying the collection of documents includes modifying an XML object (or other representation) of the collection of documents. In some implementations, the modified set of documents is used to train one or more ML models (e.g., a different ML model than the one used to perform the analysis).

In some implementations, modifying a collection of documents includes removing one or more documents from the plurality of documents based on identified presence of one or more issue attributes. For example, duplicate documents or documents with abusive language can be removed from a modified collection.

In some implementations, modifying a collection of documents includes altering content (e.g., editing content in a predetermined manner) within one or more documents based on presence of one or more issue attributes. For example, one or more issue entities can be altered (e.g., in a dashboard or in the document itself).

In some implementations, modifying a collection of documents includes annotating content (e.g., adding a tag or contextual information) within one or more documents based on presence of one or more issue attributes. For example, one or more issue entities can be annotated (e.g., in a dashboard or in the document itself). In some implementations, the annotation indicates a corresponding issue attribute (e.g., associated with the issue entity that includes the content). For example, the content in content section 808 FIG. 8B includes annotation (e.g., issue tag 808B) identifying the issue attribute associated with the identified issue entity (e.g., name 808A).

In some implementations, modifying a collection of documents includes highlighting content (e.g., adding color highlighting) within one or more documents based on presence of one or more issue attributes. For example, one or more issue entities can be highlighted (e.g., in a dashboard or in the document itself). For example, the content in content section 808 FIG. 8B includes highlighting of the identified issue entity (e.g., name 808A).

In some implementations, modifying a collection of documents includes removing content (e.g., deleting content) within one or more documents based on presence of one or more issue attributes. For example, one or more issue entities can be removed (e.g., in a dashboard or in the document itself).

In some implementations, modifying a collection of documents includes replacing content within one or more documents based on presence of one or more issue attributes. For example, one or more issue entities can be replaced (e.g., in a dashboard or in the document itself).

In some implementations, modifying a collection of documents includes redacting content within one or more documents based on presence of one or more issue attributes. For example, redacting can include obscuring and making one or more issue entities unreadable (e.g., in a dashboard or in the document itself).

In some implementations, an unstructured data monitoring process is configured to be run multiple times (e.g., automatically according to a scheduled time interval, such as hourly, daily, weekly, at some other cadence, or triggered by future events). In some implementations, a subsequent performance of the unstructured data monitoring process involves instantiating the attribute classes again. For example, the attributes that are selected for the analysis may have changed or the definitions of previously selected attributes may have changed, so instantiating new classes will capture such updates. In some implementations, only changed or new attribute classes are re-instantiated. In some implementations, a subsequent prompt is generated for the subsequent performance (e.g., and for each subsequent performance). In some implementations, a previous prompt is used again for a subsequent performance of the data analysis if changes have not occurred (e.g., changes to configurations, changes to attributes, or changes to other settings or definitions).

In some implementations, a subsequent run of an unstructured data monitoring process is performed on documents in the collection that are associated with a change. For example, the subsequent run can be performed only on documents that have been modified (e.g., edited, added to, or deleted from), documents newly added to the collection, or documents otherwise expected to have changed (e.g., based on a historical trend, metadata, or a configuration setting).

In some implementations, a data quality monitoring system performs the unstructured data monitoring process utilizing calls to the ML model to perform certain aspects of the analysis (e.g., the multiple passes). In some implementations, the data quality monitoring system performs other aspects of the unstructured data monitoring process (e.g., based on results returned by the ML model). For example, the data quality monitoring system can modify the collection documents, create a new document collection, generate a dashboard, generate visualizations, calculate statistics, compute correlations (e.g., between issue attributes, characteristic attributes, or some combination thereof), perform root cause analysis, generate alerts, and other operations. In some implementations, at least some of the operations of these aspects are performed by one or more ML models (e.g., in addition to the multiple pass analysis). For example, an ML model can be prompted to determine correlation scores between pairs of characteristic attributes, between pairs of issue attributes, or between pairs of either characteristic attributes or issue attributes. In some implementations, different ML models are used to perform different aspects of an unstructured data monitoring process (e.g., one model performs multiple pass analysis, and another model computes correlations). In some implementations, the same ML model is used to perform different aspects of an unstructured data monitoring process (e.g., one model performs multiple pass analysis and computes correlations, according to one or more prompts).

In some implementations, an unstructured data monitoring process includes performing root cause analysis based on a set of results. For example, root cause analysis can be performed using results received from an ML model's analysis of unstructured data. Root cause analysis can be performed based on user-defined parameters or parameters derived from the results (e.g., characteristic or issue attributes). In some implementations, root cause analysis provides, for a particular issue attribute, a characteristic attribute (or group of characteristic attributes) that are correlated with that particular issue attribute. In some implementations, "correlated with" means that the presence of the issue attribute is overrepresented in documents having that characteristic attribute (or group of attributes). In some implementations, the results of root cause analysis are stored, presented in a dashboard or visualization, or both.

In some implementations, an unstructured data monitoring process includes determining correlations between attributes. For example, a measure of correlation can be determined between pairs of characteristic attributes (or grouped characteristic attributes), pairs of issue attributes, or pairs of either, to determine which attributes occur most frequently together. For instance, documents associated with the presence of the issue attribute "Has Abusive Language" can be strongly correlated with the presence of the issue attribute "Has Negative Sentiment". As another example, both of these issue attributes can be strongly correlated with a characteristic attribute that categorizes the document as a "Conversation" (e.g., the document can represent a transcript of a customer support call). In some implementations, the results of determined correlations are stored, presented in a dashboard or visualization, or both.

Figure 8A:
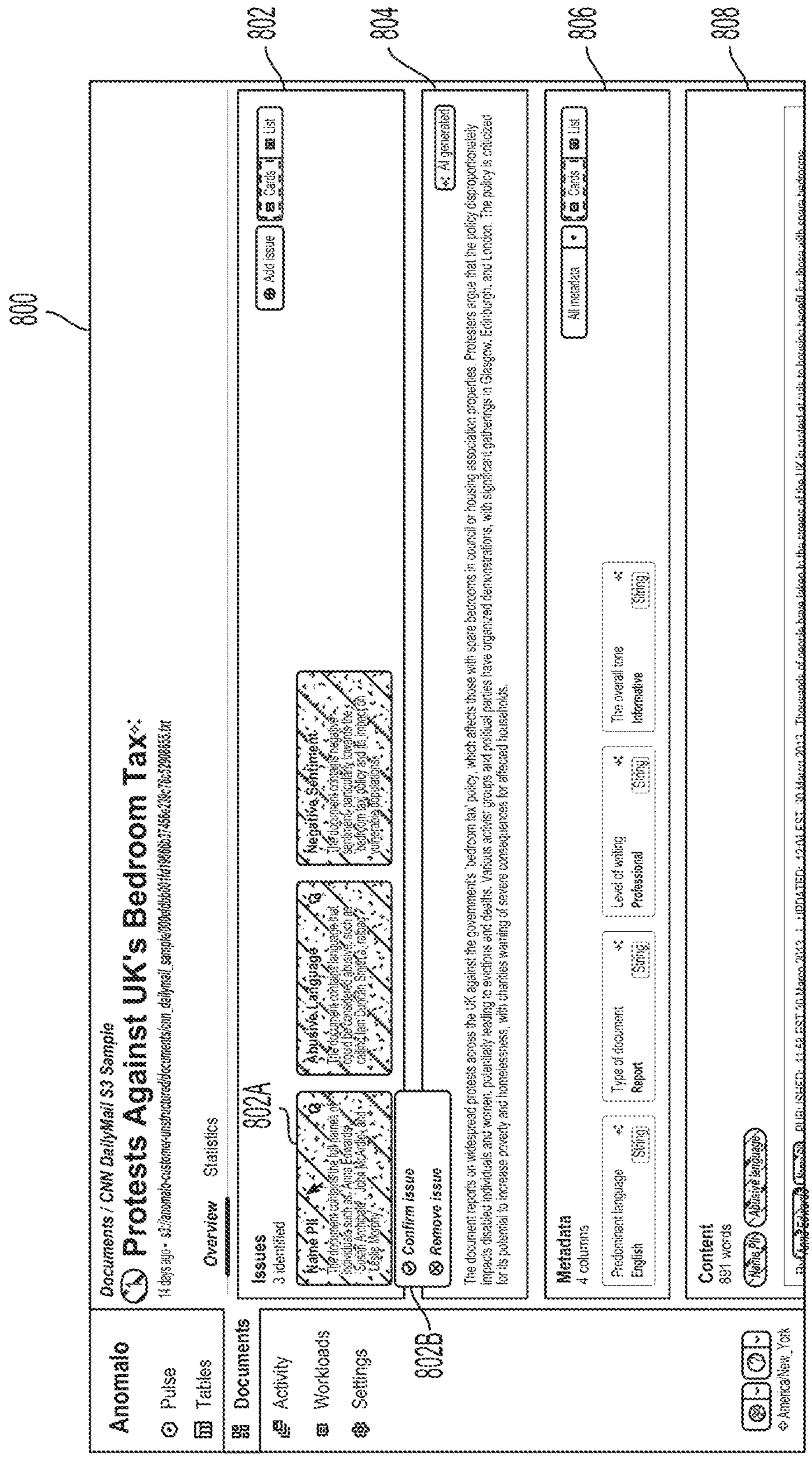
FIGS. 8A-8C illustrate examples of data quality monitoring interfaces.

In some implementations, the data quality monitoring system receives feedback corresponding to a portion of the results. For example, the system receives input (e.g., user input) that a portion of the results are incorrect, that the results missed an issue, or that analysis should be performed differently in some way. For instance, input can specify that an issue attribute identified as present in the results is not actually present (e.g., based on the user's assessment), or can specify that an issue attribute identified as not present in the results is actually present. For example, document interface 800 in FIG. 8A illustrates validation interface 802B which includes selectable options for confirming or removing an issue attribute identified for a document. In some implementations, the data quality monitoring system receives the input and updates the results. For example, the results can be edited and saved such that any future review of the results (e.g., via a dashboard) reflects the feedback (e.g., manual override). In some implementations, updating the results includes saving or displaying (or both) an indication that results have been updated (e.g., tagging a value or attribute as having been manually specified). This can provide information to subsequent users or viewers of the performance of the model. In some implementations, the data quality monitoring system receives the input and provides feedback to one or more ML models. For example, the ML model that performed the analysis can be provided the feedback, which can enable improved analysis in a subsequent task (or for correcting the current results, if requested). For instance, the feedback can be in a prompt requesting the ML model re-analyze a portion of the results, in general re-training of the model, or as an additional prompt string in a subsequent unstructured data monitoring analysis task.

In some implementations, the data quality monitoring system generates one or more alerts (also referred to as "notifications") based on results of an unstructured data monitoring process. In some implementations, alerts are sent to one or more destinations based on one or more alert settings. In some implementations, the alert settings include one or more of: when to send notifications (e.g., at completion of an unstructured data monitoring process, or at another time), types of notifications (e.g., via particular services or applications), where to send notifications (e.g., which channels, users, addresses, etc.) (also referred to as an alert "destination"), or some combination of these. For example, a destination can include particular services, channels, accounts, email addresses, lists, groups, addresses, or other destinations for notifications generated by the workflow. For example, an alert can be sent to a specified Slack channel.

Attention is now turned to example interfaces related to unstructured data monitoring processes. In particular, FIGS. 5-21 illustrate interfaces associated with a data quality monitoring system that can be displayed to a user (e.g., at a user device) for configuring aspects of an unstructured data monitoring process or interacting with the results of an unstructured data monitoring process.

Figure 5A:
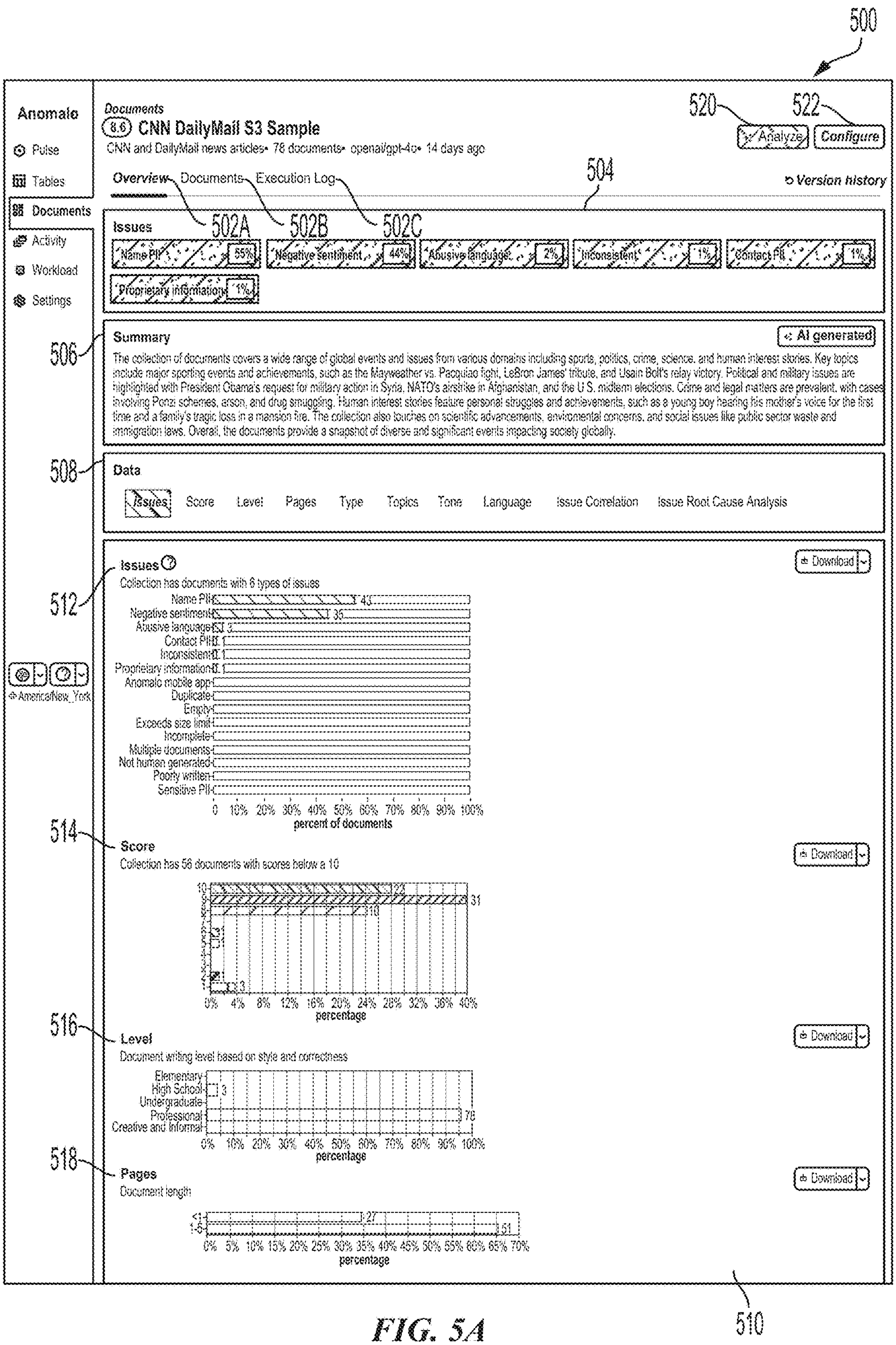
FIGS. 5A-5E illustrate examples of data quality monitoring interfaces.

FIGS. 5A-5E illustrate examples of data quality monitoring interfaces. In particular, FIGS. 5A-5E illustrate example document collection interfaces. In FIG. 5A, the document collection interface 500 includes an overview tab 502A, a documents tab 502B, and an execution log tab 502C. In FIG. 5A, the overview tab is selected and the interface includes details about the document collection titled "CNN DailyMail S3 Sample". These details are based on (e.g., include or are derived from) results of analysis of unstructured data from the corresponding document collection (e.g., by check performed by an unstructured data monitoring process using an ML model). For example, the details include representations (e.g., visualizations) of characteristic attributes and issue attributes for the document collection.

Figure 5B:
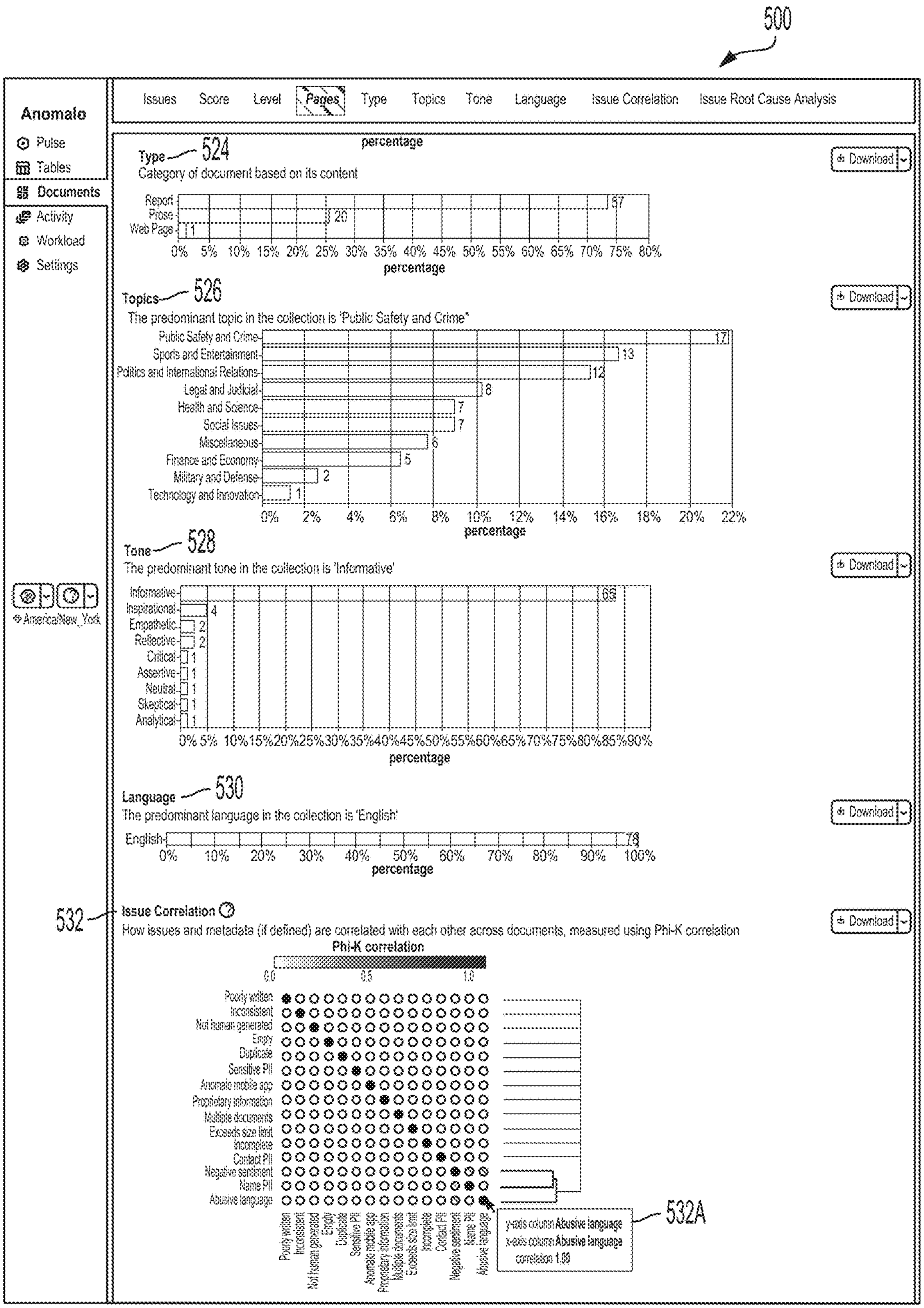
Figure 5C:
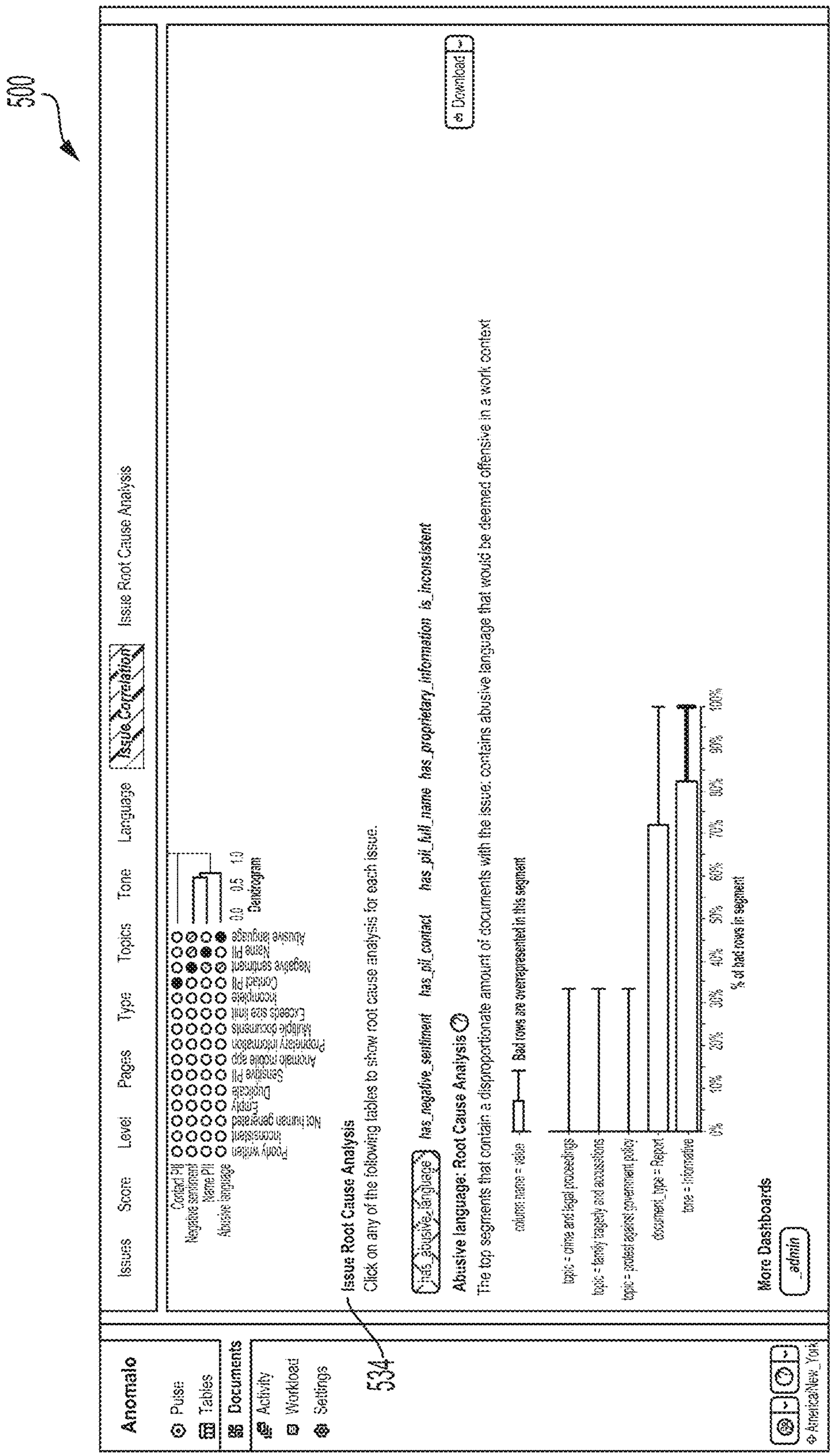
Figure 5D:
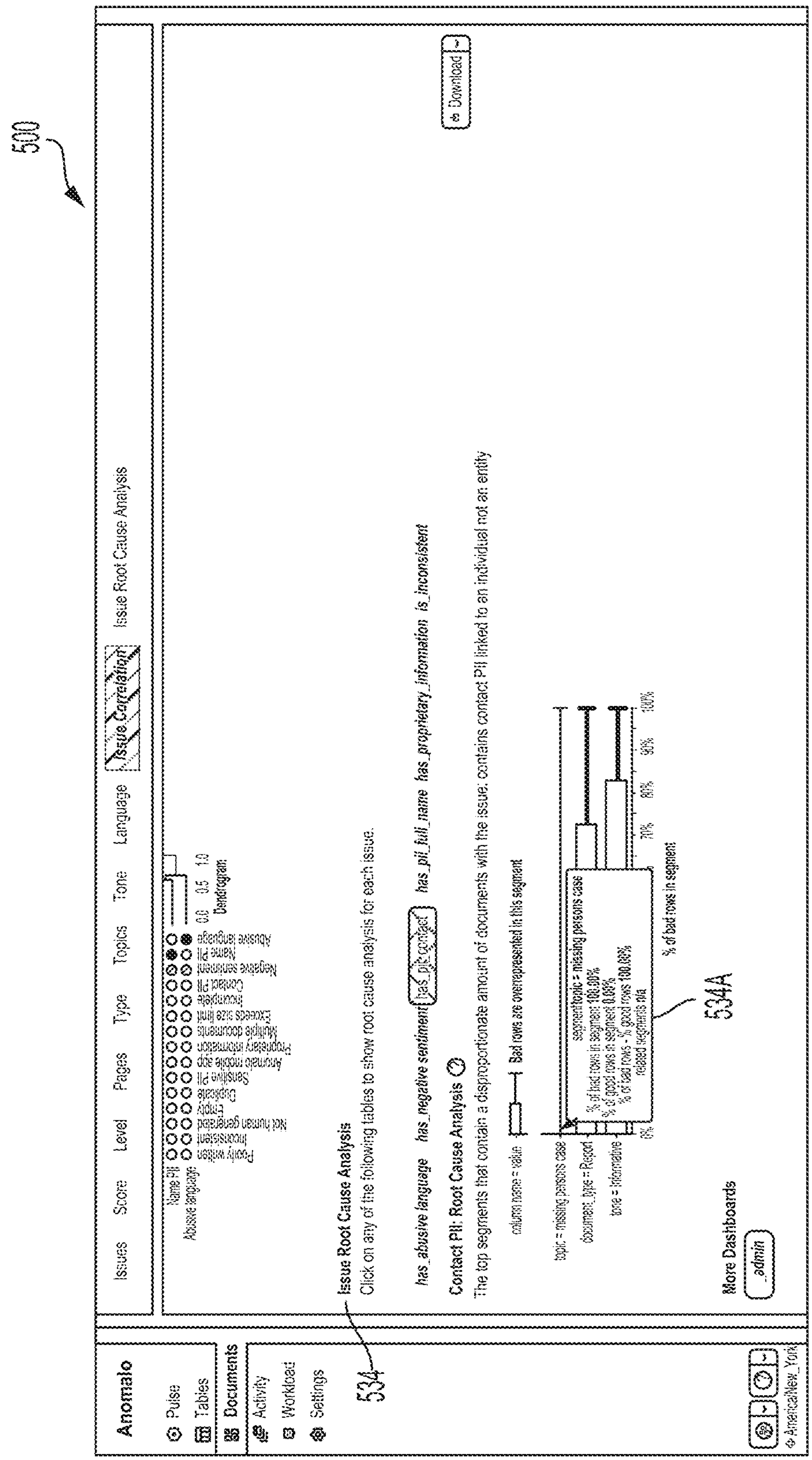

As illustrated in FIG. 5A, the interface 500 includes, under the overview tab 502A, the following sections: issue tag section 504, summary section 506, data navigation section 508, issue graph section 512, score section 514, level section 516, and pages section 518 (additional sections are illustrated in FIGS. 5B-5D that can be accessed, for example, by scrolling down). The issue tag section 504 includes tags corresponding to the names of issue attributes identified in the collection, as well as the prevalence of such issue attributes (e.g., in percentages of documents that include the corresponding issue). For example, "Name PII" is found in 56% of documents, "Negative sentiment" is found in 44% of documents, and "Proprietary information" is found in 1% of documents. The summary section 506 includes a collection-level summary describing the collection (e.g., generated by an LLM). The data navigation section 508 includes selectable links to access the sections below it. The issue graph section 512 includes a graphical representation of the presence of issue attributes included in the analysis (e.g., expressed as percentages of documents that include each respective issue attribute). The score section 514 includes a graphical representation of the distribution of scores for the documents in the collection. The level section 516 includes a graphical representation of the writing level of the documents in the collection. The pages section 518 includes a graphical representation of the document length distribution of the documents in the collection.

As illustrated in FIG. 5A, certain sections (e.g., 512, 514, 516, and 518) that include representations of detailed statistical data about characteristic attributes and issue attributes for the collection are grouped within a section 510. For example, control elements displayed in the data navigation section 508 can be used to navigate between these subsections of section 510. For example, the control element corresponding to "Issues" is shown selected (highlighted). In some implementations, one or more sections (or subsection) includes an option (e.g., control affordance) to download the data or graphical representation associated with the corresponding section.

As illustrated in FIG. 5A, the document collection interface 500 in FIG. 5A includes a control element 520 labeled "Analyze", and in response to input selecting the control element 520, the system causes an unstructured analysis process to be performed on the collection. For example, selection of the control element 520 can cause one or portions of an unstructured data monitoring process to be performed on the document collection. The document collection interface 500 in FIG. 5A includes a control element 522 labeled "Configure", and in response to input selecting the control element, the system can cause display of one or more configuration operations for customizing how unstructured analysis is performed on the collection (e.g., configuring an unstructured data monitoring process).

FIG. 5B illustrates a continuation of the document collection interface 500 in FIG. 5A, where the interface 500 has been scrolled down to reveal additional sections. The interface in FIG. 5B includes, under the overview tab, the following sections: type section 524, topics section 526, tone section 528, language section 530, and issue correlation section 532 (additional sections are illustrated in FIGS. 5C-5D that can be accessed, for example, by scrolling down further). The type section 524 includes a graphical representation of documents categorized according to several types (e.g., reports, prose, or web pages, although other types are possible). The topics section 526 includes a graphical representation of topics represented in the documents (e.g., public safety and crime, sports and entertainment, social issues, etc.). The tone section 528 includes a graphical representation of the tone of documents in the collection (e.g., informative, inspirational, neutral, etc.). The language section 530 includes a graphical representation of the languages that are represented in the documents (e.g., English or other language). The issue correlation section 532 includes a graphical representation of how issues (issue attributes) and metadata (characteristic attributes) are correlated with each other across documents, measured using Phi-K correlation. In FIG. 5B, the cursor is positioned (hovered) over the bottom right intersection in the issue correlation chart, and in response an additional information popup 532A is displayed indicating the y-axis column (e.g., issue), x-axis column (e.g., issue), and a correlation score.

FIG. 5C illustrates a continuation of the document collection interface 500 in FIG. 5B, where the interface 500 has been scrolled down to reveal additional sections. The interface 500 in FIG. 5C includes, under the overview tab, an issue root cause analysis section 534. The issue root cause analysis section 534 includes a graphical representation of metadata characteristics that contain a disproportionate number of documents with a certain issue. Root cause analysis data can help users understand whether there are specific segments of the data that explain the issues (e.g., finding the regions or stores (identified in a characteristic attribute) where most complaints (reflected as presence of an issue attribute) happen). For example, in FIG. 5C, the issue "Abusive language" (corresponding to the control labeled "has_abusive_langauge" selected in the ribbon of issues above the graphical representation) is found in 100% of the documents of the type "Report" and with a tone that is "Informative".

FIG. 5D illustrates the document collection interface 500 in FIG. 5C, where the issue selected in the ribbon is "Contact PII" (corresponding to the control labeled "has_pii_contact") (e.g., documents that have contact information that qualifies as PII). For example, in FIG. 5D, the issue "Contact PII" is found in 100% of the documents of the topic "Missing Persons Case" and with a tone that is "Informative". A popup window 534A is displayed in response to hovering over the characteristic attribute "topic=missing persons case", revealing that 100% of the bad rows that include PII contact information have the characteristic attribute of "topic=missing persons case", whereas 0% of the good rows that do not include PII contact information have the characteristic attribute of "topic=missing persons case".

Figure 5E:
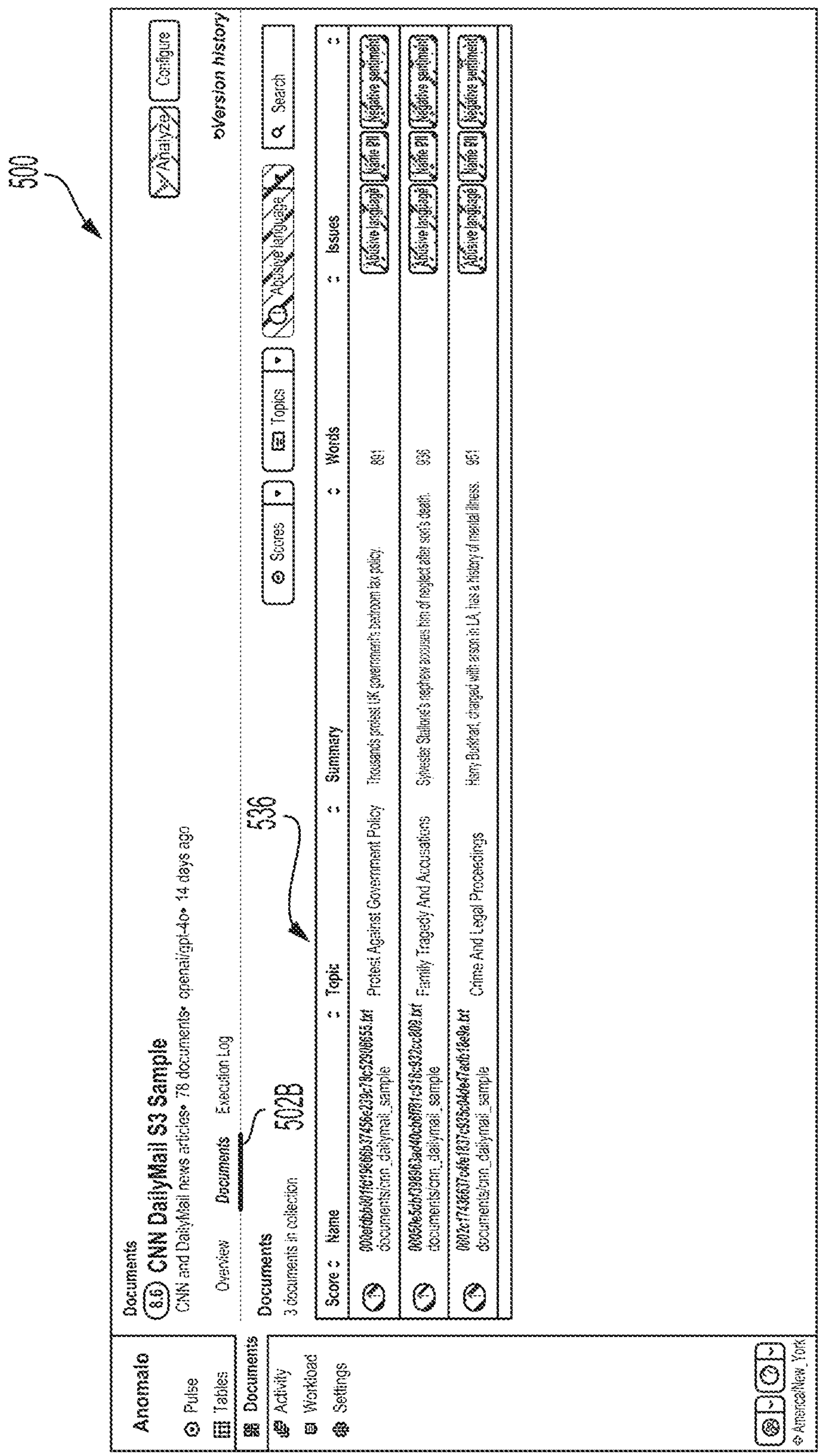

FIG. 5E illustrates document collection interface 500 having the documents tab 502B selected. In FIG. 5E, under the selected documents tab 502B, a listing 536 of individual documents in the collection are displayed, filtered to those documents that include the issue "Abusive language". Characteristic attributes and issues (issue attributes) are displayed for each document, arranged in columns (e.g., score, name, topic, summary, words (e.g., word count), and a list of issues (e.g., abusive language, name PII, and negative sentiment)).

FIGS. 6A-6B illustrate an example of a data quality monitoring interface. In particular, FIGS. 6A-6B illustrate document collection interface 500 (e.g., the interface illustrated in FIG. 5A) having the execution log tab 502C selected. In this example, FIG. 6B represents a continuation of the content in FIG. 6A (e.g., accessible via scrolling down at user interface 500). In FIGS. 6A-6B, under the selected execution log tab 502C, an execution log section 602 includes information regarding execution of one or more unstructured data monitoring processes are included, including timestamps, events, and a prompt 604. For example, the prompt 604 can be what is (or was) provided to an ML model (e.g., by the data quality monitoring system), which causes the ML model to perform unstructured data analysis and return results. The example prompt 604 in FIGS. 6A-6B reads:

You are a platform for assessing the quality of unstructured text data in the enterprise domain.

The document will be wrapped in an XML object as:

<root>
<metadata>Metadata XML here</metadata>
<document>Your document text here</document>
</root>

Identify this general information about the document in JSON format.

title: title in English that is no more than 50 characters
short_description: short description in English
summary: long summary in English
sentiment: overall sentiment
topic: the primary topic in English
language: predominant language, using only the following categories: English, Chinese, Hindi, Spanish, French, Arabic, Bengali, Portuguese, Russian, Urdu, Indonesian. German, Japanese, Nigerian, Marathi, Telugu, Turkish, Tamil, Vietnamese, Tagalog, Korean, Persian, Hausa, Swahili, Javanese, Italian, Punjabi, Gujarati, Thai, Kannada, Amharic, Bhojpuri, Eastern Punjabi, Yoruba, Other
document_ type: type of document, using only the following categories: Prose, Conversation, Code, Web Page, JSON, XML, Log, Email, Report, Script, Manual, Legal, Spreadsheet, Specification, List, Other writing_level: level of writing, using only the following categories: Elementary, High School, Undergraduate, Professional, Creative and Informal.

tone: the overall tone, using only the following categories: Authoritative, Persuasive, Informative, Instructional, Urgent, Analytical, Humorous, Inspirational, Technical, Collaborative, Assertive, Neutral, Empathetic, Skeptical, Cautious, Encouraging, Diplomatic, Direct, Objective, Reflective Return the value of the key in this JSON format:

```
{
  "key": "value"
}
```

In addition, identify the following specific issues in the document in JSON format:

is_incomplete: appears to be truncated or is clearly missing expected content has_pii_contact: contains contact PI! linked to an individual not an entity, using only the following categories: Full Home Address, Phone Number, Email Address.

is_inconsistent: is internally inconsistent or contradicts itself in material ways has_pii_full_name: contains full name PII linked to an individual not an entity, using only the following categories: Full Name.

has_pii_sensitive: contains sensitive PI! linked to an individual not an entity, using only the following categories: Social Security Number, Credit Card Information, Bank Account Information, Protected Health Information, Driver's License Number, Passport Number.

is_poorly_written: is poorly written or difficult to understand anomalo_mobilo_app: Customer mentions something about wanting to use Anomalo on their mobile device or anything about how an Anomalo mobile app would be useful.

has_abusive_language: contains abusive language that would be deemed offensive in a work context.

is_multiple_documents: appears to contain multiple distinct documents that have been concatenated together has_negative_sentiment: contains negative sentiment language is_not_human_generated: appears to be generated by a machine or a large language model has_proprietary_information: contains content an enterprise would classify as proprietary and would not want disclosed to a third party Only flag documents that have the issue in a clear and unambiguous way that you can easily explain. For example, if the document is just discussing the issues, do not flag it as having the issue.

Use the metadata only to provide additional context about the document, do not identify issues in the metadata itself.

Return a nested JSON with a True or False "value" for each issue key and include an explanation of exactly what contents of the document led you to your decision in this JSON format:

```
{
  "key": {
    "value": "either True or False",
    "explanation": "The document contains the text 'bad text '
      which is bad"
  }
}
```

for example:

```
{
  "has_bad_text": {
    "value": True,
    "explanation": "The document contains the bad text 'bad text'"
  },
  "is_bad_document": {
    "value": True,
    "explanation": "The document is a bad document because of
      <explanation>"
  }
}
```

Ensure that any specific examples in the explanation are presented verbatim and enclosed in single quotes. Special XML characters in these examples such as < > & should be converted back into their plain text equivalents.

Be sure to respond with just the JSON with all the following required keys: ['title', 'short_description', 'summary', 'sentiment', 'topic', 'language', 'document_type', 'writing_level', 'tone', 'is_incomplete', 'has_pii_contact', 'is_inconsistent', 'has_pii_full_name', 'has_pii_sensitive', 'is_poorly_written', 'anomalo_mobile_app', 'has_abusive_language', 'is_multiple_documents', 'has_negative_sentiment', 'is_not_human_generated', 'has_proprietary_information']

As illustrated in FIGS. 6A-6B and recited above, the example prompt 604 includes instructions 604B for identifying characteristic attributes in the documents (e.g., "Identify this general information about the document in JSON format") and instructions 604D for identifying issue attributes in the documents (e.g., "identify the following specific issues in the document in JSON format"). The prompt 604 in FIGS. 6A-6B also includes instructions for formatting the structured output (e.g., keys, values, explanations) (e.g., formatting instructions 604C for characteristic attributes and formatting instructions 604E for issue attributes), as well as information 604A regarding the structure of the input. Formatting instructions 604C and 604E include example structured formats (structured formatting) (which can be collectively referred to as a structured format) for the results. For example, the structured format of the results will be in the format illustrated within instructions 604C and 604E in a JSON file, with the 'key' and 'value' fields updated for each respective individual result. In some implementations, the prompt is generated by the unstructured data monitoring platform. For example, the prompt can be generated based on user input (e.g., identifying particular issues and metadata to scan for).

As illustrated in FIG. 6B, the example execution log section 602 under execution log tab 502C includes a log reporting steps executed by an unstructured data monitoring process. For example, log section 602 includes log entries showing the number of documents analyzed, the number of calls made to an ML model, the identity of the ML model, and performance of post-processing of results returned by the ML model. For example, according to log section 602 in FIG. 6B, "document analysis" (e.g., a first pass by the ML model) involved 78 calls (e.g., one for each document analyzed) to the ML model, "Generating global collection themes" (e.g., a second pass by the ML model) involved 1 call to the ML model, and "Generating collection summary" (e.g., a third pass by the ML model) involved 1 call to the ML model. For instance, the first pass involves multiple individual calls (78, one for each document) to the ML model for document-level analysis. Then, an AIAnalyzer class aggregates results and makes a call to the ML model for cluster-level analysis in a second pass. Then, the AIAnalyzer aggregates results of the second pass and makes an additional call to the ML model for collection-level analysis in a third pass. For example, as explained elsewhere, utilizing multiple calls can overcome context window limitations in ML models.

Figure 7A:
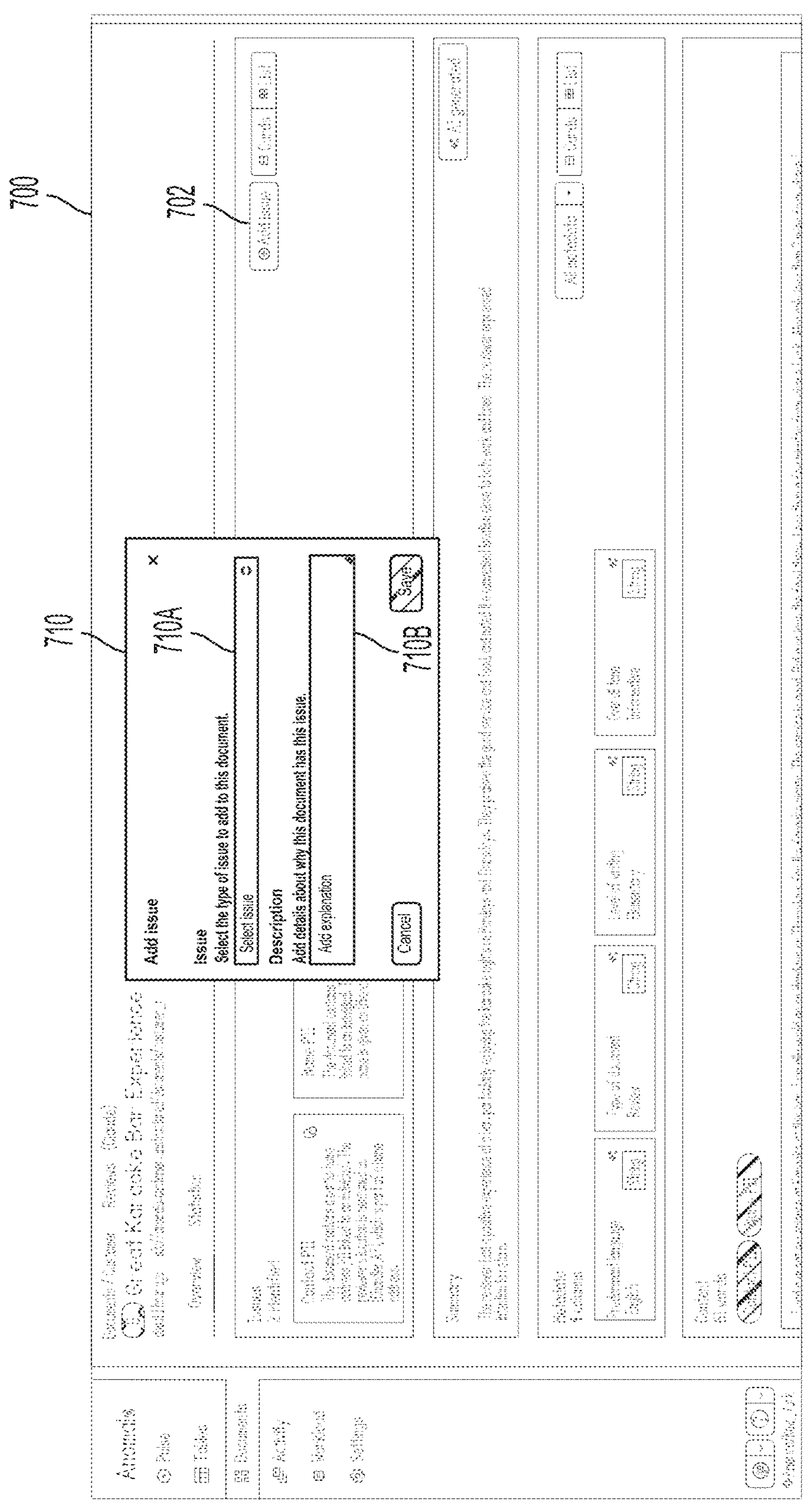
FIGS. 7A-7B illustrate examples of data quality monitoring interfaces.
Figure 7B:
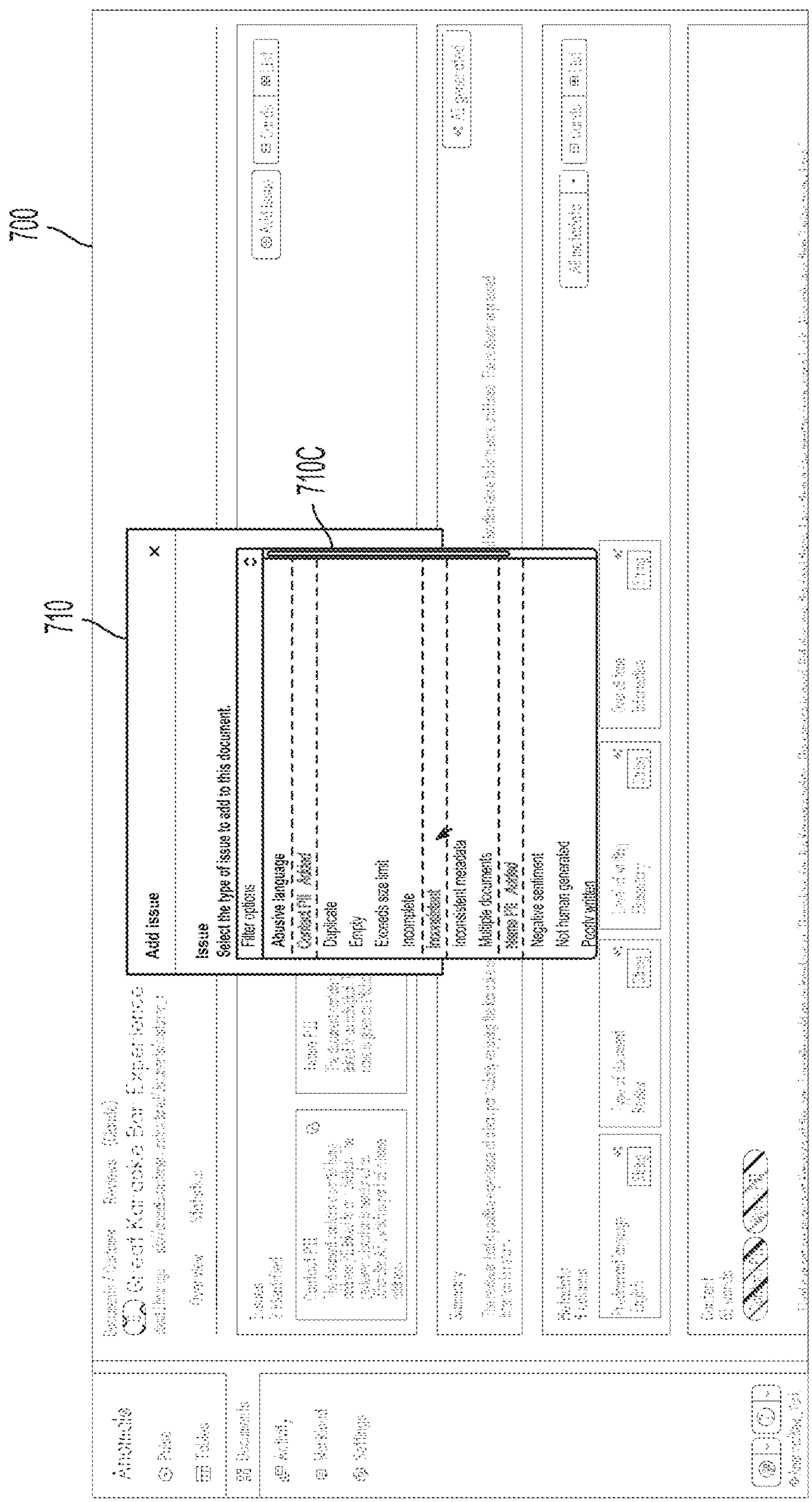

FIGS. 7A-7B illustrate examples of data quality monitoring interfaces. In particular FIGS. 7A-7B illustrate interfaces for adding issues to document analysis results. For example, an ML model may have missed identifying the presence of an issue in a particular document, and a user can wish to manually update the issue attribute (e.g., to True) to reflect presence in the document. In FIG. 7A, an "Add issue" control element 702 in the document interface 700 (e.g., for a particular document in a collection named "Customer Reviews") has been selected, causing the add issue interface 710 to be displayed as an overlay as shown in FIG. 7A. The add issue interface 710 includes fields 710A and 710B for input (e.g., selection) of the type of issue and a description of why the document includes the issue. FIG. 7B illustrates a pull down menu 710C for selecting the issue to add from a set of configured issues, where issues currently identified as present in the document are indicated (as "Added"). The added issue can be reflected in the results (e.g., in graphical representations), provided to an ML model as feedback (e.g., for training), or both.

Figure 8B:
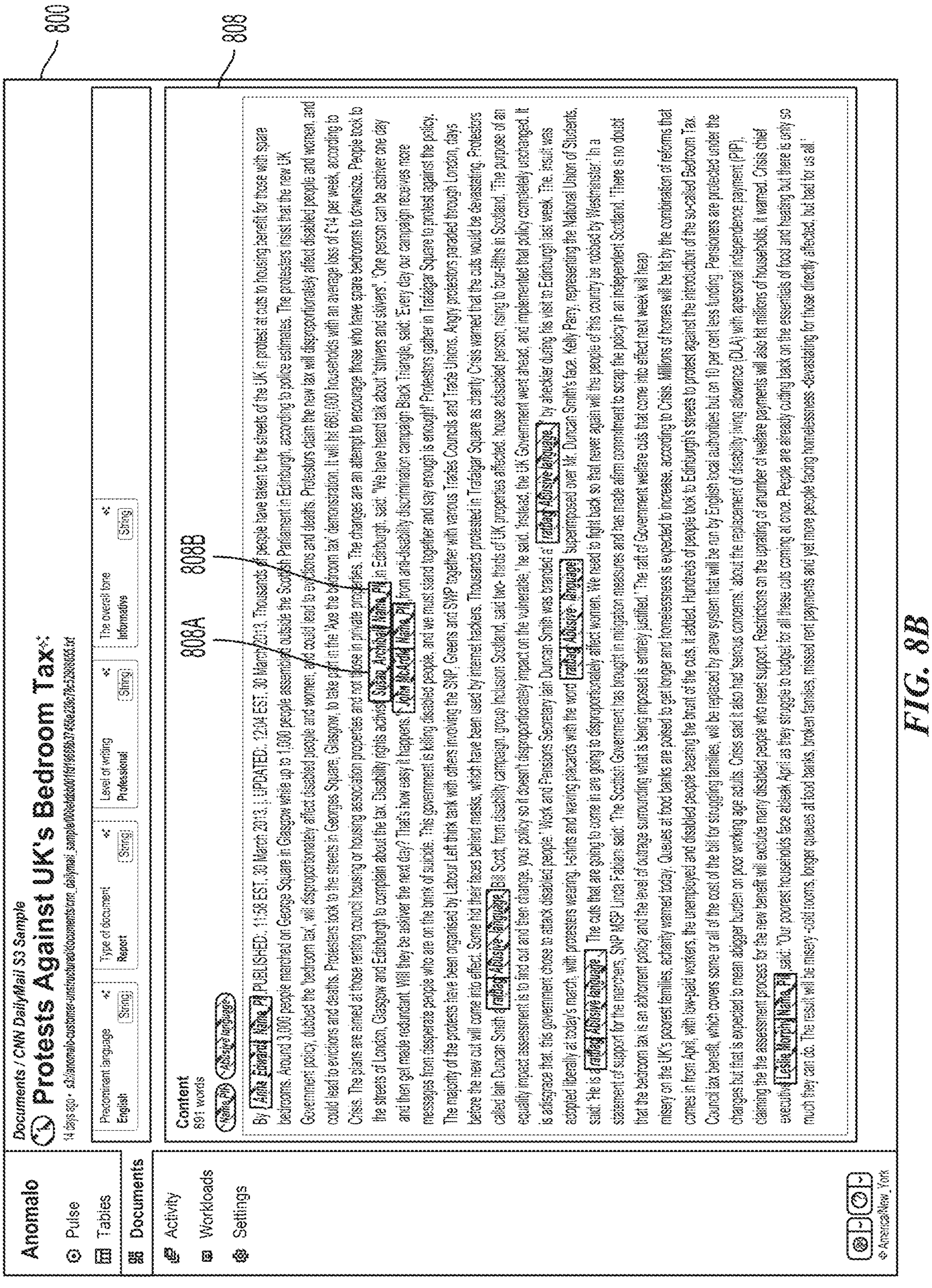
Figure 8C:
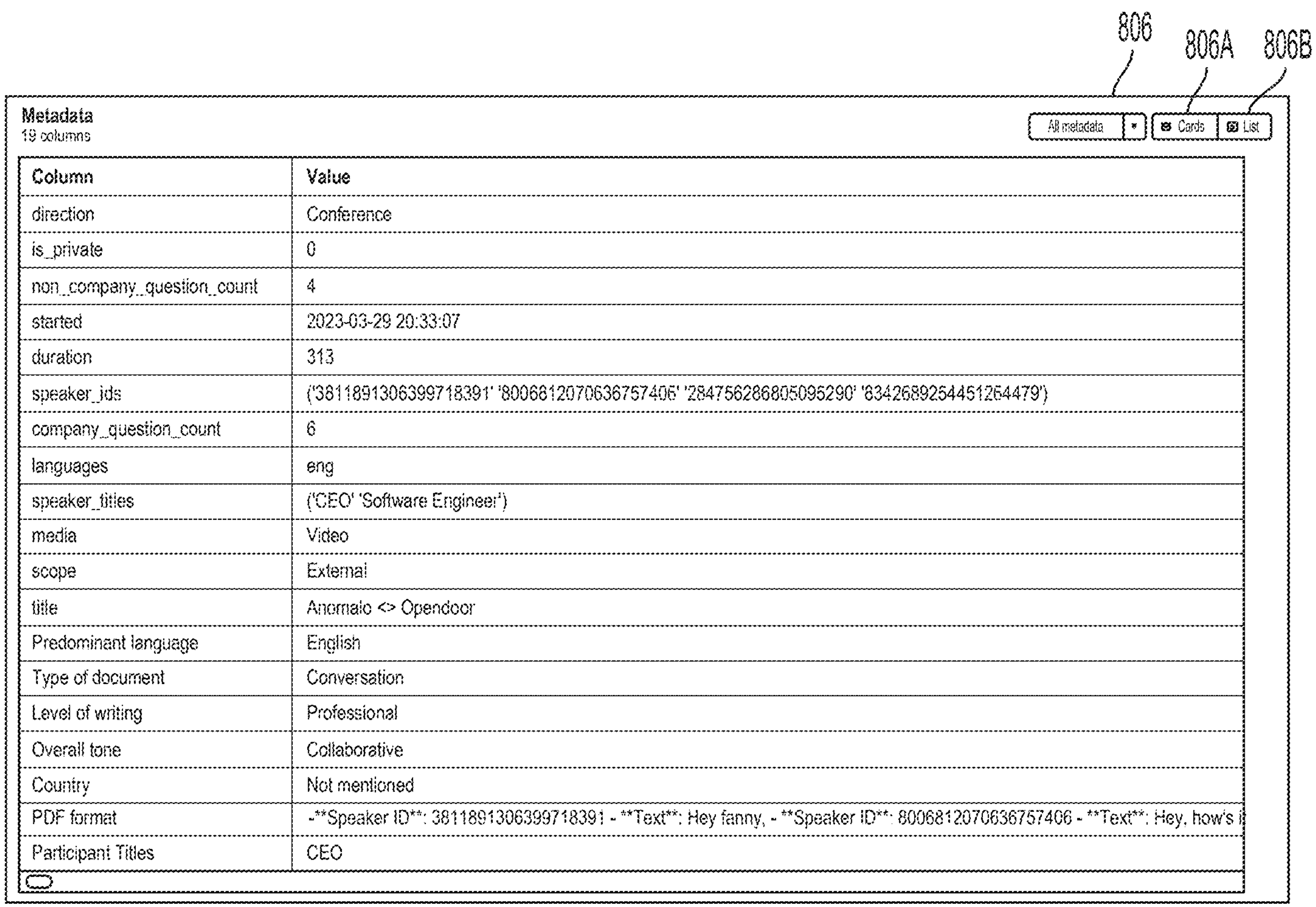

FIGS. 8A-8C illustrate examples of data quality monitoring interfaces. In particular FIGS. 8A-8C illustrate example aspects of a document interface (e.g., for a particular document in a collection "CNN DailyMail S3 Sample", the document named "Protests Against UK's Bedroom Tax"). As illustrated in FIG. 8A, an example document interface 800 includes an issue tag section 802, where hovering over one of the issue tags (e.g., issue 802A (corresponding to the "Name PII" issue)) causes display of an issue validation interface 802B, which includes selectable options to confirm the issue (e.g., verify manually that the issue is present in the document) or remove the issue (e.g., confirm manually that the issue is not present in the document, for example, due to misidentification by an ML model). In some implementations, a list view of issues or a card view of issues can be toggled via selection of either list view control or card view control as shown within issue tag section 802 of FIG. 8A. As illustrated in FIG. 8A, document interface 800 also includes a document-level summary section 804 (e.g., including the document-level summary for the document generated by the ML model), a metadata section 806 (e.g., including representations of one or more characteristic attributes for the document extracted by the ML model), and content section 808 (e.g., including some or all of the unstructured content from the document).

FIG. 8B illustrates content section 808 of the document interface 800 of FIG. 8A in additional detail, which can be accessed by scrolling down in document interface 800. The content section 808 illustrated in FIG. 8B includes a representation of the unstructured content from the document. In this example, the content is annotated with issue tags in line with the content, where the tag is included next to respective text that caused the issue to be found (e.g., issue entities). For example, the name 808A "Susan Archibald" (e.g., in issue entity) is highlighted and an issue tag 808B is displayed next to it, identifying it as "Name PII" since it includes personally identifiable information that is a name of a person. As FIG. 8B illustrates, other issue entities are highlighted and include an adjacently displayed issue tag. In some implementations, instead of highlighting text corresponding to an identified issue, the text can be altered (e.g., replaced), redacted, deleted, or otherwise changed or identified. In some implementations, issue tags are not displayed or are displayed in response to additional input (e.g., hovering over a corresponding issue entity).

FIG. 8C illustrates an example metadata section 806. The example metadata section 806 in FIG. 8C includes a list view (e.g., list view control 806B is selected, and card view control 806A is unselected) that includes the values of characteristic attributes extracted for a corresponding document. In the example in FIG. 8C, the column includes a title for a characteristic attribute and the value column includes the corresponding extracted value returned by the check (e.g., by the ML model). For example, the characteristic attribute "Predominant language" returned a value of "English", "Level of writing" returned "Professional", and "speaker_titles" returned values of "CEO" and "Software Engineer". In some implementations, a metadata section arranged in a list view as illustrated in FIG. 8C can be displayed in place of the metadata section in FIG. 8A. For example, the metadata section 806 illustrated in FIG. 8A includes a card view of characteristic attributes. In some implementations, the list view and the card view can be toggled via selection of either list view control 806B is selected or card view control 806A (e.g., the list view can be displayed in metadata section 806 in interface 800 of FIG. 8A by selecting the list view control).

Figure 9:
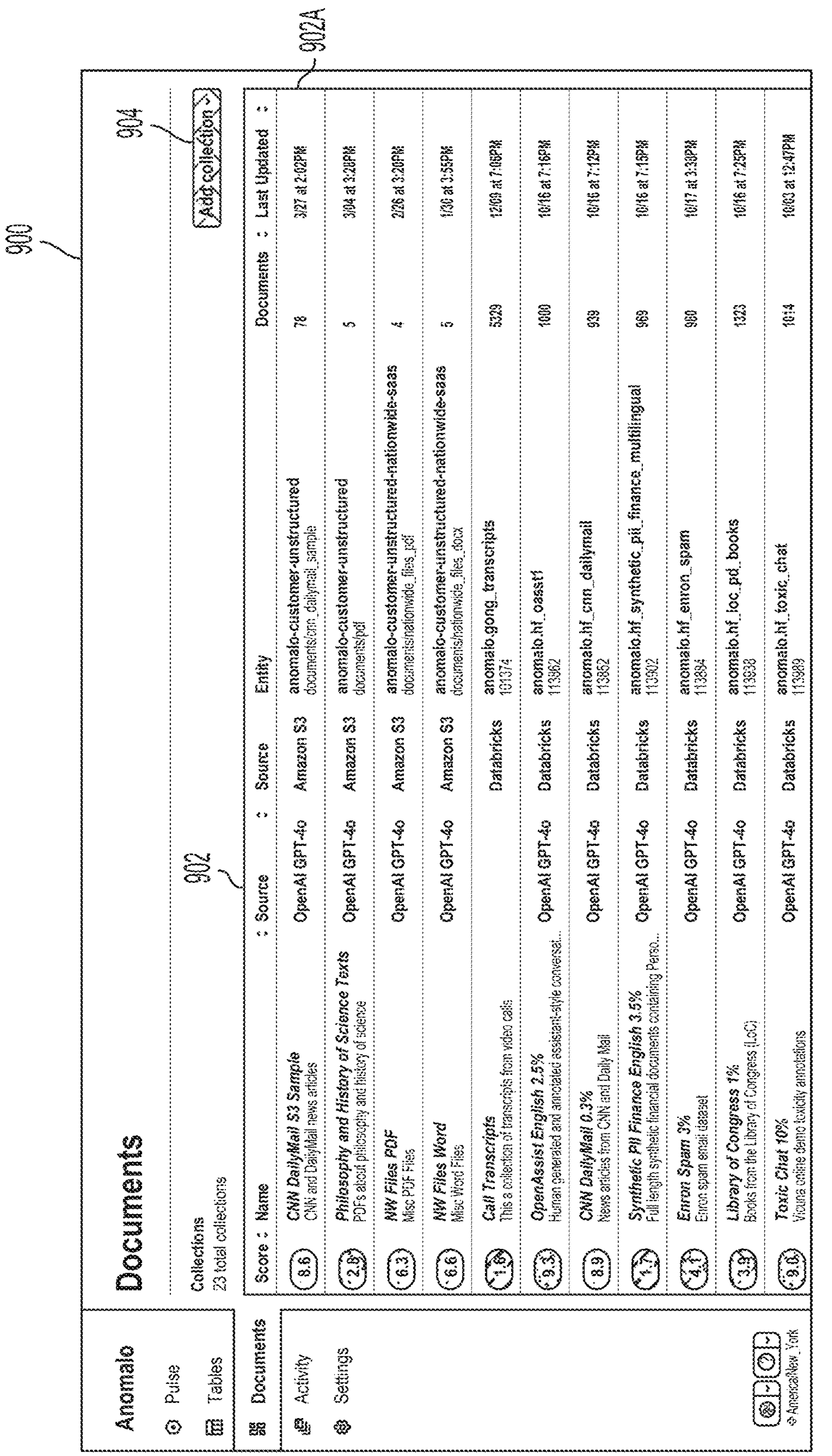
FIG. 9 illustrates an example of a data quality monitoring interface.

FIG. 9 illustrates an example of a data quality monitoring interface. In particular FIG. 9 illustrates an interface 900 that includes a listing 902 of document collections that are being monitored (e.g., that have been subject to previous or ongoing (e.g., scheduled) unstructured data analysis). As illustrated in FIG. 9, information for each collection in listing 902 is displayed in columns, including score, name, model used for analysis, source of the data, entity, number of documents, and last updated time (e.g., last time analysis was run and results updated). Row 902A includes is an entry for the collection named "CNN DailyMail S3 Sample". For example, selection of row 902A can cause a system to display a document collection interface, such as interface 500 as illustrated in FIG. 5A. Interface 900 also includes a control 904 for adding a document collection for monitoring (adding a monitoring task) that, when selected, causes a system to display an interface for adding a document collection for unstructured data analysis.

Figure 10A:
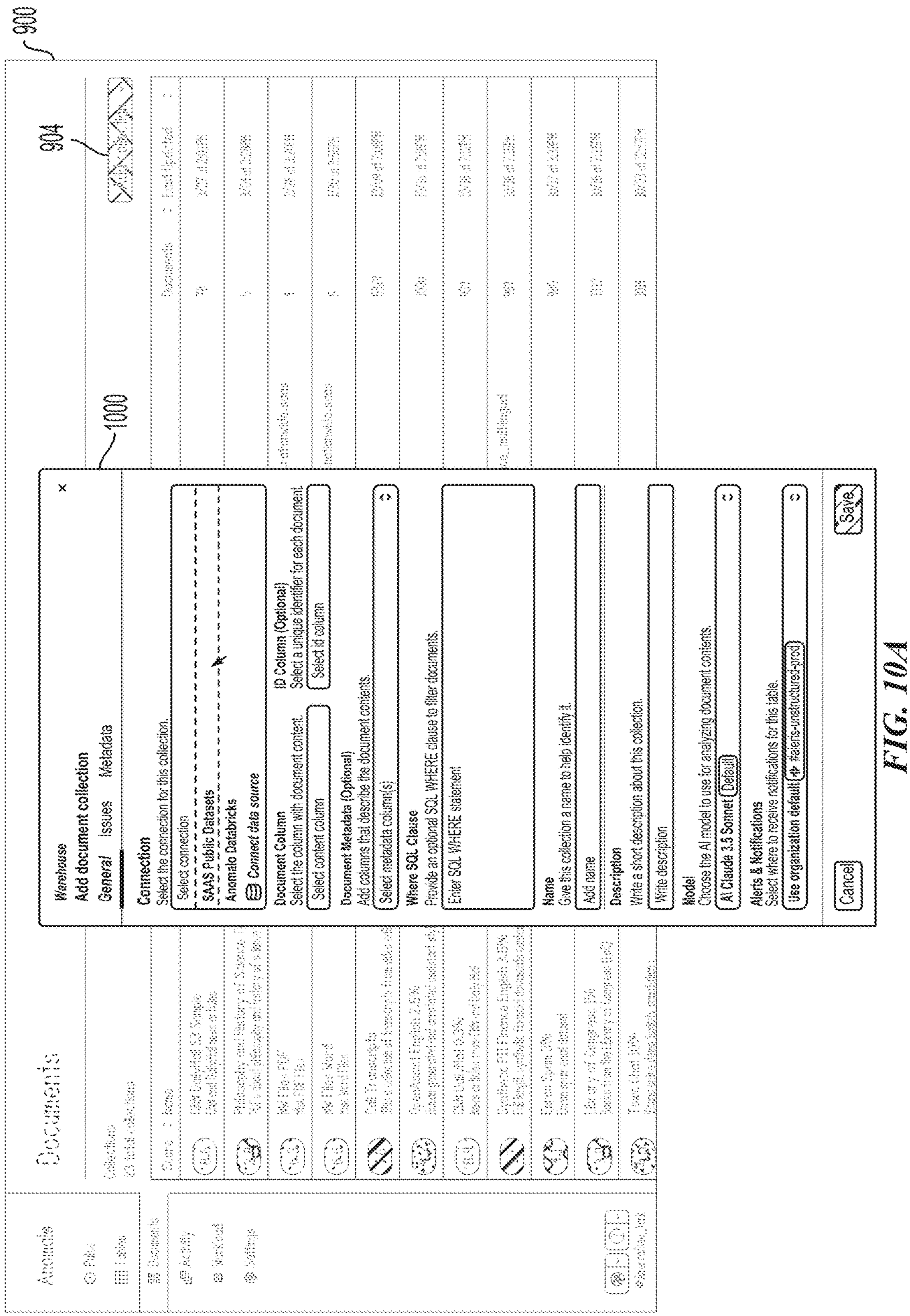
FIGS. 10A-10B illustrate examples of data quality monitoring interfaces.
Figure 10B:
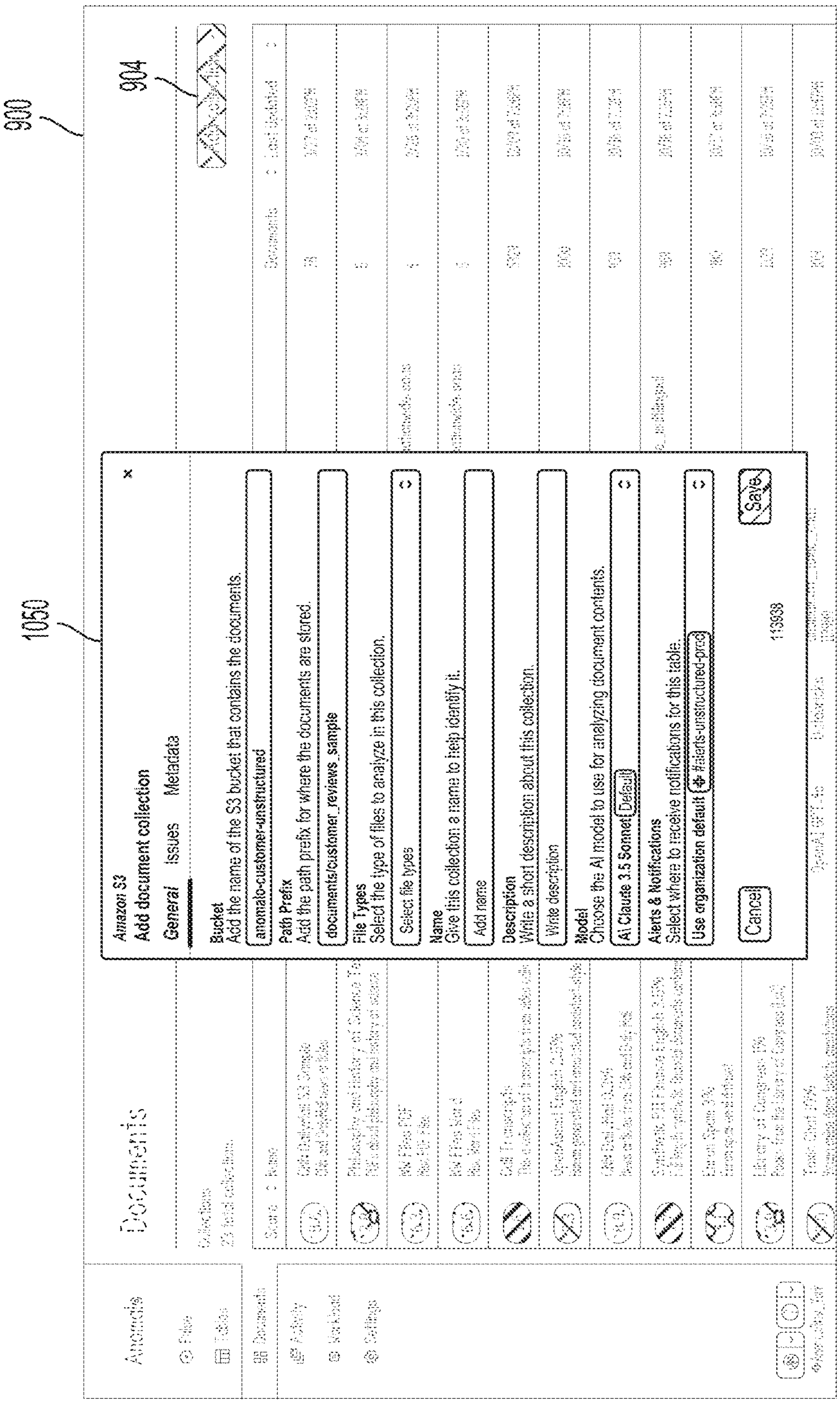

FIGS. 10A-10B illustrate examples of a data quality monitoring interface. In particular FIGS. 10A-10B illustrate example interfaces for adding a document collection for unstructured data analysis. As illustrated in FIG. 10A, an add document collection interface 1000 is displayed (e.g., in response to selection of the "Add collection" control 904 of interface 900 in FIG. 10A visible in the background behind interface 1000). As illustrated in FIG. 10A, add document collection interface 1000 includes fields for specifying details for adding a document collection for monitoring, including fields for specifying: a connection type, a column that includes document content (e.g., unstructured content), an identifier (ID) column for each document, metadata columns, where SQL clauses to filter the documents, a collection name, a short description of the collection, a model used for analysis, and alert and notification settings.

FIG. 10B illustrates another example add document collection interface 1050 (e.g., for adding a collection located in Amazon S3). As illustrated in FIG. 10B, an add document collection interface 1050 is displayed (e.g., in response to selection of the "Add collection" control 904 of interface 900 in FIG. 10B visible in the background behind interface 1050). As illustrated in FIG. 10B, add document collection interface 1050 includes fields for specifying details for adding a document collection for monitoring, including fields for specifying: a name of the S3 bucket that includes the documents, a path prefix where documents are stored, types of files to analyze, a collection name, a short description of the collection, a model used for analysis, and alert and notification settings.

Figure 11A:
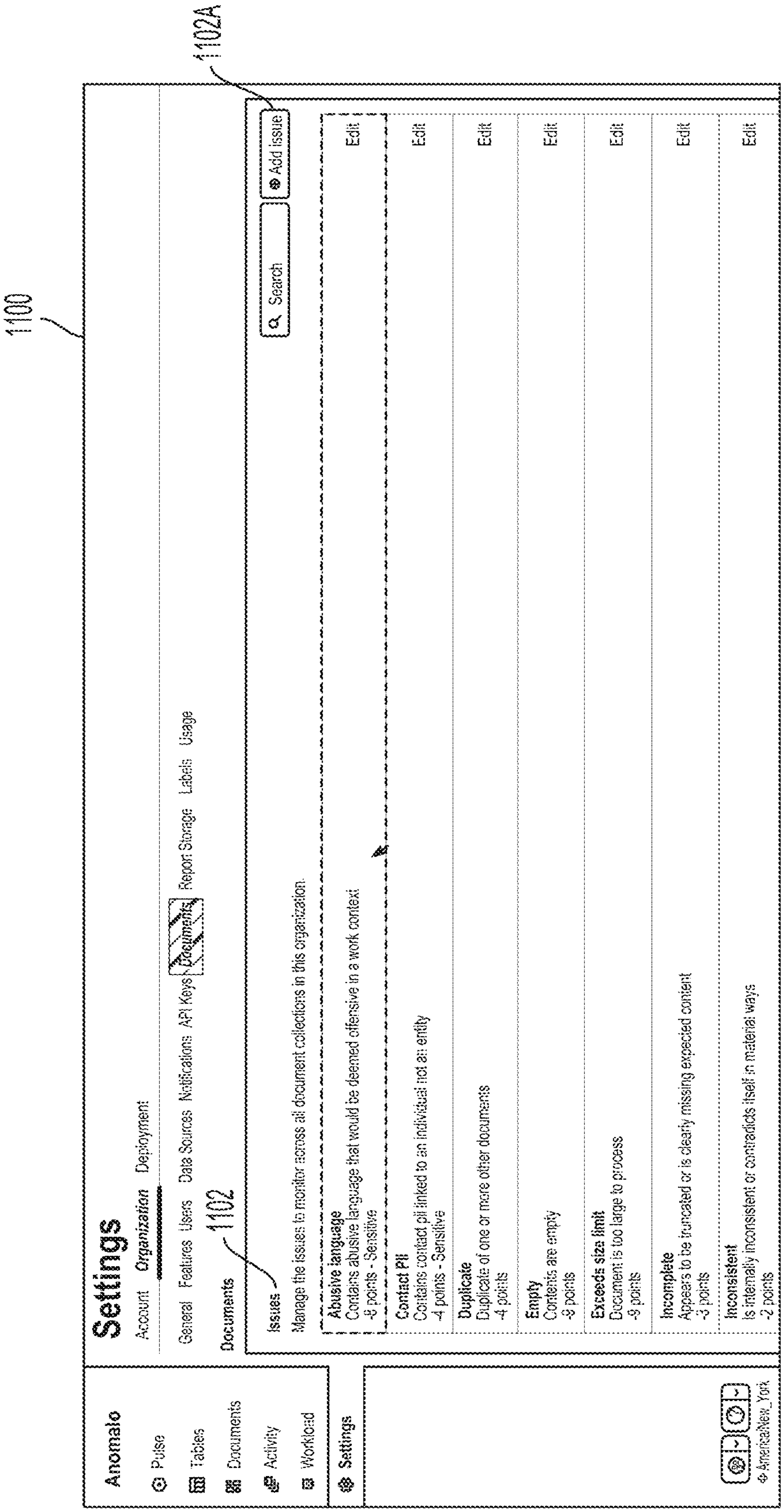
FIGS. 11A-11C illustrate examples of data quality monitoring interfaces.
Figure 11B:
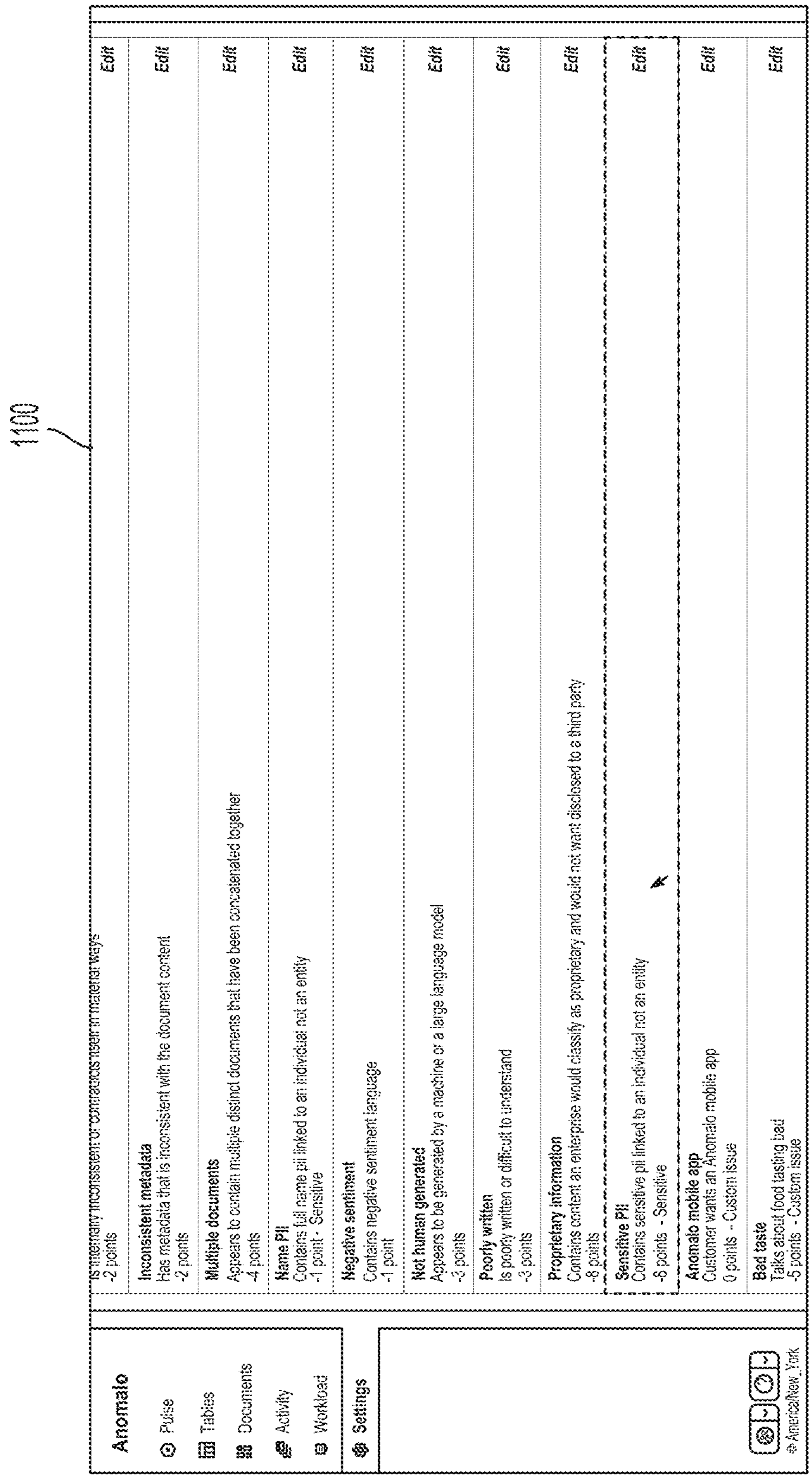
Figure 11C:
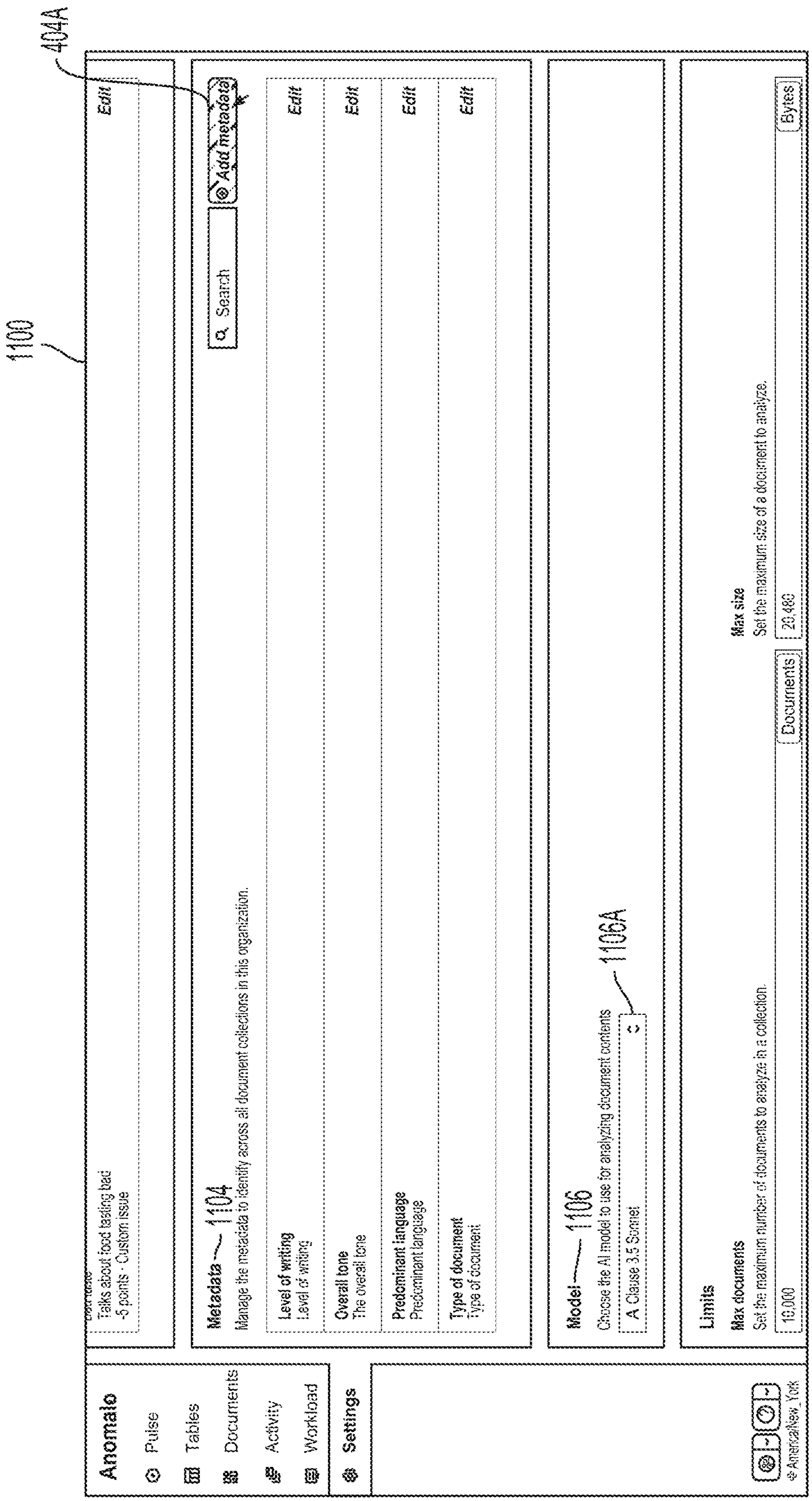

FIGS. 11A-11C illustrate examples of a data quality monitoring interface. In particular, FIGS. 11A-11C illustrate a settings interface 1100 that includes a listing of issues (issue attributes) and metadata (characteristic attributes) that are configured for use by unstructured data monitoring processes. In some implementations, the issues and characteristic attributes included in the interfaces of FIGS. 11A-11C are used or available for use in unstructured data analysis (e.g., as preconfigured options in a configuration interface or workflow). As illustrated in FIG. 11A, settings interface 1100 includes a listing of configured issues under the "Issues" subheading in issues section 1102, where each issue listed includes characteristics such as a title (e.g., "Abusive language"), a description (e.g., "Contains abusive language that would be deemed offensive in a work context"), a score modifier (e.g., reflecting how presence of the issue affects a document's score, such as "−8 points"), and whether the issue identifies sensitive content (e.g., some issues include "Sensitive" listed alongside their score modifier). For example, issues marked as identifying sensitive content may result in the text corresponding to the issue being redacted, removed, or hidden from being displayed by default (e.g., in a document interface). FIG. 11B illustrates additional issues within issues section 1102 of interface 1100 (e.g., accessed by scrolling down in interface 1100 as illustrated in FIG. 11A). As illustrated in FIGS. 11A and 11B, each row in issue section 1102 can include an option to edit the definition of the respective issue (e.g., a control labeled "Edit"). As illustrated in FIG. 11A, issue section 1102 of settings interface 1100 includes an add issue control 1102A, which can be selected for adding a new issue for use in an unstructured data monitoring process (e.g., which would be added to issue section 1102).

As illustrated in FIG. 11C, settings interface 1100 includes a listing of configured metadata (characteristic attributes) under the "Metadata" subheading in metadata section 1104 (e.g., accessed by scrolling down in the settings interface 1100 as illustrated in FIG. 11A or 11B). In metadata section 1104, each characteristic attribute listed includes characteristics such as: a title (e.g., "Level of writing") and brief description under the title. As illustrated in FIG. 11C, each row in metadata section 1104 can include an option to edit the definition of the respective characteristic attribute (e.g., a control labeled "Edit"). As illustrated in FIG. 11C, metadata section 1104 of settings interface 1100 includes an add metadata control 1104A, which can be selected for adding a new characteristic attribute for use in unstructured data monitoring (e.g., which would be added to metadata section 1104).

As illustrated in FIG. 11C, settings interface 1100 also includes a model section 1106 (e.g., under the "Model" subheading) that includes a control 1106A (e.g., pull down menu) for selecting the ML model used for analyzing document content (e.g., Claude 3.5 Sonnet is selected in this example). For example, the model selected in section 1106 can correspond to an ML model used for a particular collection (e.g., where settings interface 1100 corresponds to configuring settings for a specific collection or unstructured data monitoring process). The model selected in section 1106 can correspond to an ML model used for multiple collections (e.g., where settings interface 1100 corresponds to configuring settings for multiple collections). For example, the selected model can be set as a default ML model or as a globally used ML model (e.g., overriding any previously configured ML model).

In some implementations, the characteristic attributes and issue attributes listed in settings interface 1100 represent all such attributes that are currently configured and available for use in unstructured data quality monitoring processes across any monitoring task configured on the platform. For example, a new issue attributed added at settings interface 1100 can be subsequently enabled in individual monitoring tasks (e.g., for different respective collections), by default (e.g., if a default setting is enabled) or manual enablement. In some implementations, a settings interface (e.g., similar to 1100) is displayed for issue attributes and characteristic attributes for one specific unstructured data monitoring task.

Figure 12:
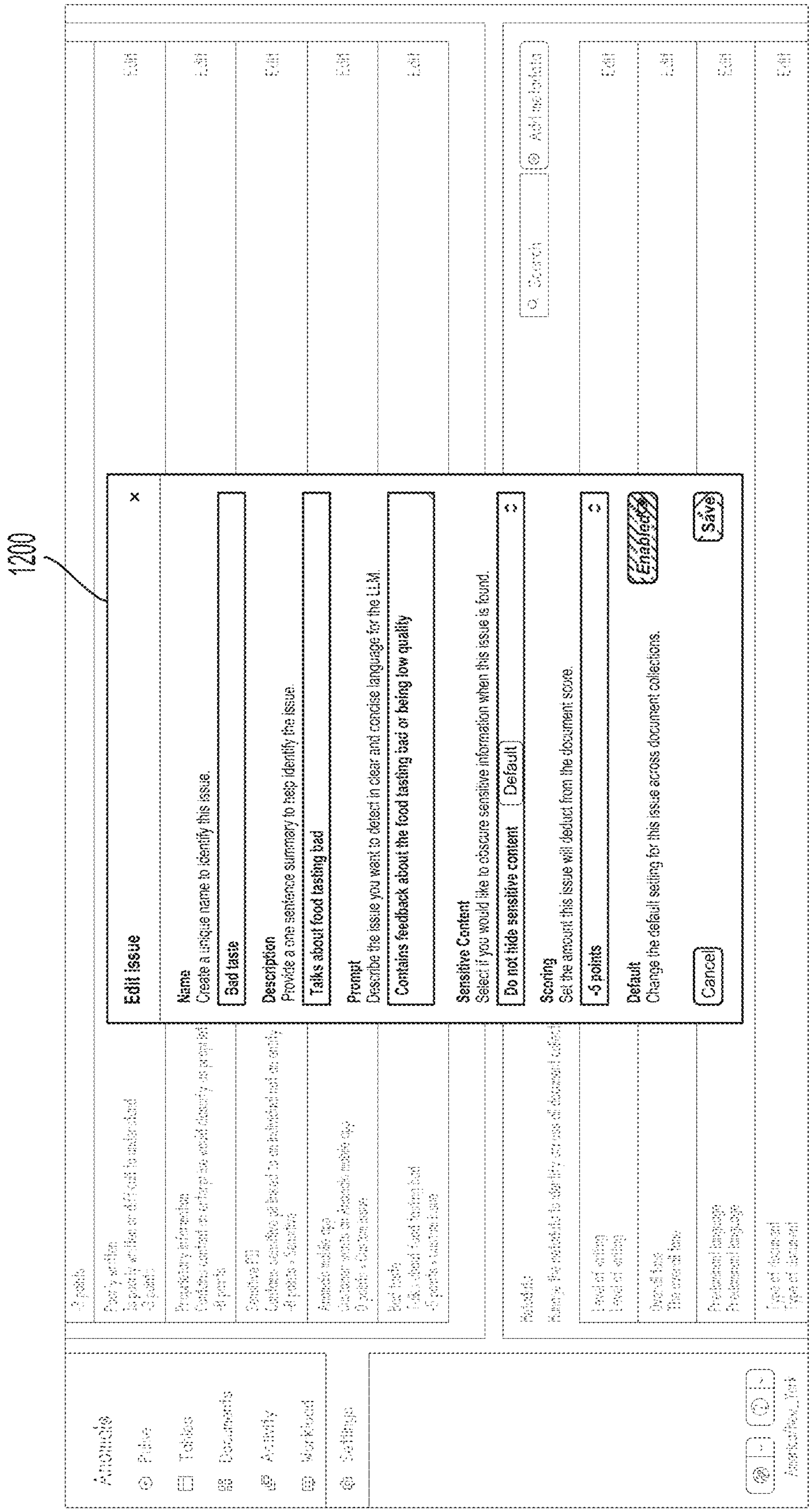
FIG. 12 illustrates an example of a data quality monitoring interface.

FIG. 12 illustrates an example of a data quality monitoring interface. In particular, FIG. 12 illustrates an issue editing interface 1200, for editing characteristics associated with a respective issue attribute. At issue editing interface 1200, changes can be made to how the issue attribute is defined and how the issue attribute affects scoring. Issue editing interface 1200 includes fields for specifying characteristics of the issue attribute, including for specifying: a name, a description, a prompt string, whether the issue attribute corresponds to sensitive content that should be obscured, a scoring adjustment, and whether the issue attribute is enabled by default for monitoring tasks. Issue editing interface 1200 can be displayed in response to receiving selection of an edit control for a particular issue attribute in the settings interface 1100 of FIGS. 11A-11C. In some implementations, an interface for adding a new issue (e.g., displayed in response to selection of add issue control 1102A of FIG. 11A) includes one or more of the same fields as issue editing interface 1200.

Figure 13:
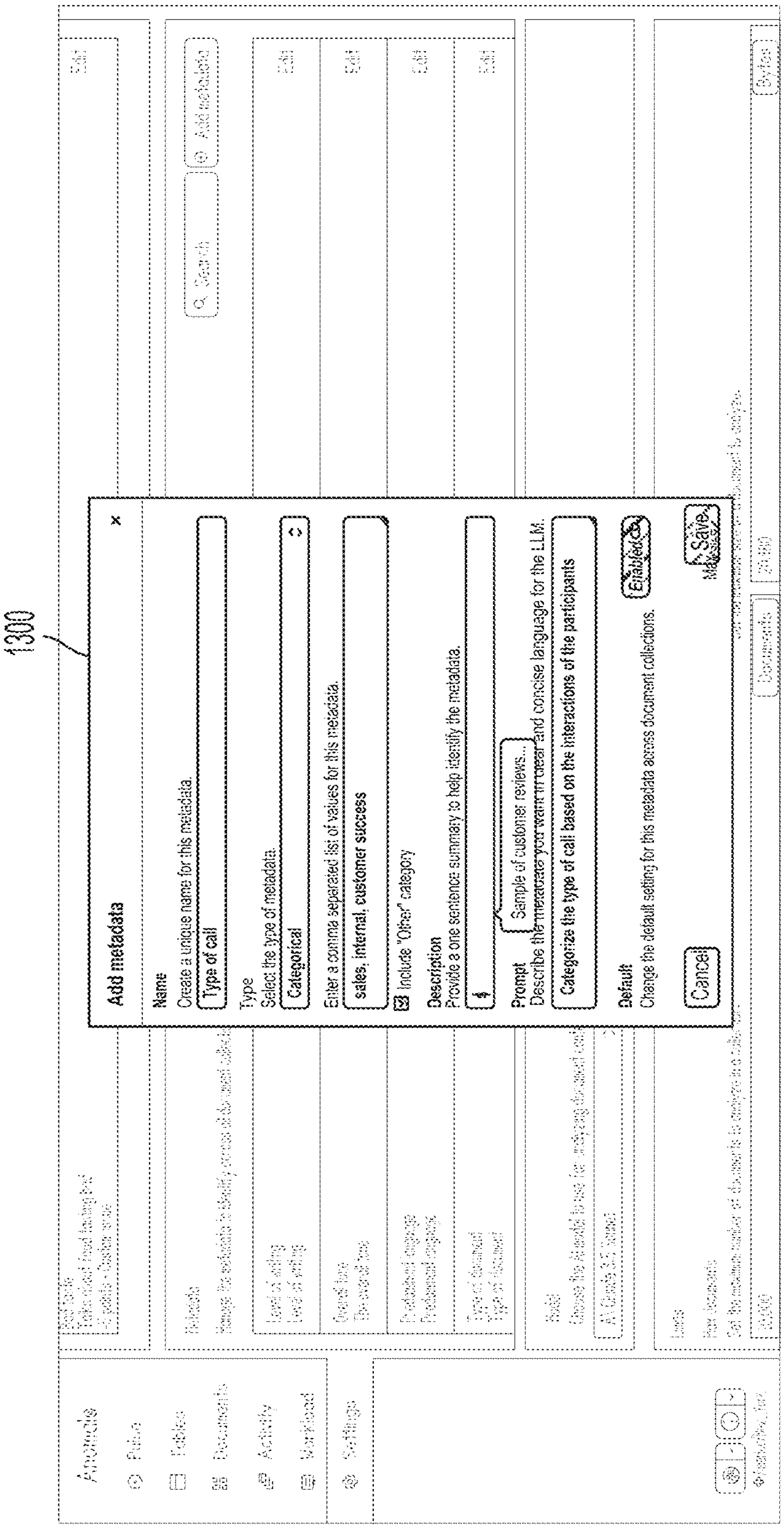
FIG. 13 illustrates an example of a data quality monitoring interface.

FIG. 13 illustrates an example of a data quality monitoring interface. In particular, FIG. 13 illustrates an add metadata interface 1300, for adding a new characteristic attribute for document analysis. At add metadata interface 1300, a new characteristic attribute can be defined. Add metadata interface 1300 includes fields for specifying characteristics of the new characteristic attribute, including for specifying: a name, a type (e.g., category, integer, or string), a set of categories, a description, a prompt string, and whether the issue is enabled by default for monitoring tasks. Add metadata interface 1300 can be displayed in response to receiving selection of add metadata control 1104A in the settings interface 1100 of FIGS. 11A-11C. In some implementations, an interface for editing a characteristic attribute (e.g., displayed in response to selection of an edit metadata control of FIG. 11C) includes one or more of the same fields as add metadata interface 1300.

FIGS. 14-21 illustrate additional or alternative examples of data quality monitoring user interfaces. For example, some user interfaces illustrated in FIGS. 14-21 may some or all of the features as described with respect to FIGS. 5-13.

Figure 14A:
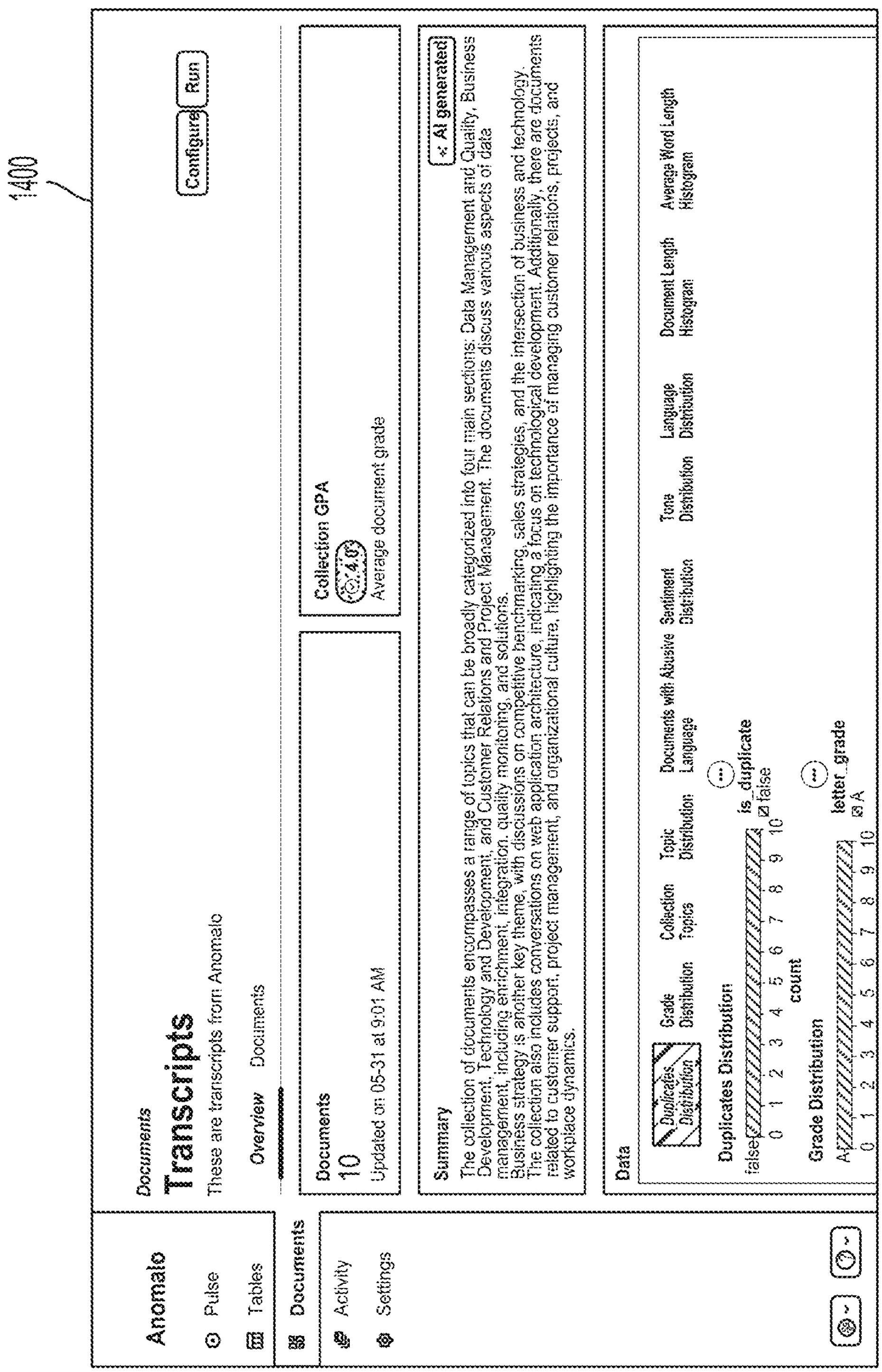
FIGS. 14A-14B illustrate examples of a data quality monitoring interface.

FIG. 14A illustrates an example document collection interface 1400. In the overview tab, the interface includes a number of documents, overall score (GPA), an AI generated summary of all the documents in the collection, and data visualizations for the group of documents. The data visualizations are accessible via tabs or scrolling and such data visualizations include: duplicates distribution, grade distribution, collection topics, topic distribution, documents with abusive language, sentiment distribution, tone distribution, language distribution, document length histogram, and average word length histogram. Additional examples of data visualizations are illustrated in FIGS. 5A-5D (which illustrate examples document collection interface 500) and FIG. 21 (which illustrates example document collection interface 2100).

Figure 14B:
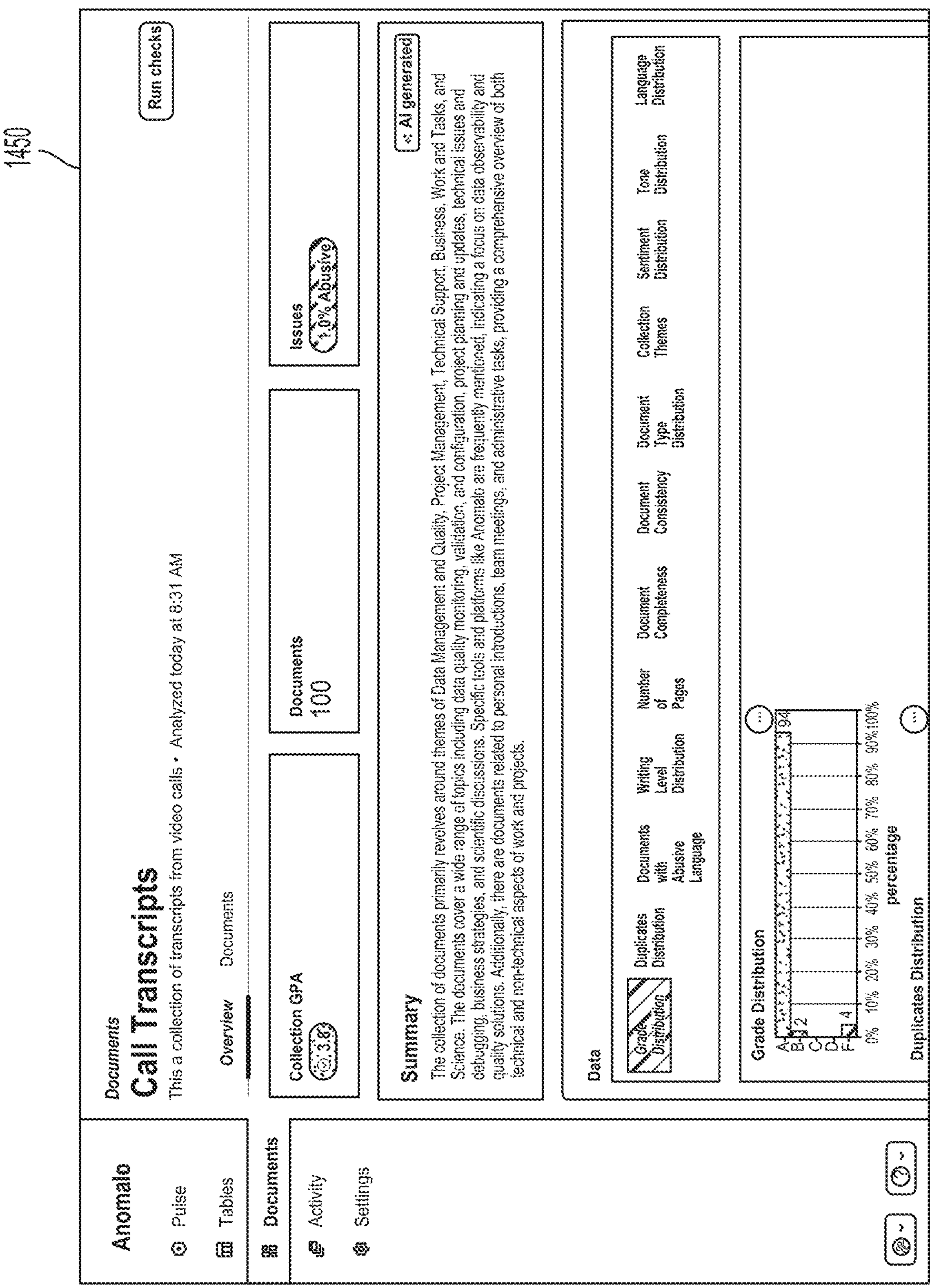

FIG. 14B illustrates another example document collection interface 1450. In the overview tab, the interface includes a number of documents, overall score (GPA), an issues section (e.g., noting one or more issues found in the documents and their prevalence, which in this example is abusive language found in one percent ("1.0%") of the documents in the collection), an Al generated summary of all the documents in the collection, and data visualizations for the group of documents. The data visualizations are accessible via tabs or scrolling and such data visualizations include: grade distribution, duplicates distribution, documents with abusive language (e.g., illustrating the identity and/or number of documents with abusive language and/or the types of such abusive language), writing level distribution, number of pages, document completeness, document consistency, document type distribution, collection themes, sentiment distribution, tone distribution, and language distribution. Additional examples of data visualizations are illustrated in FIGS. 5A-5D (which illustrate examples document collection interface 500) and FIG. 21 (which illustrates example document collection interface 2100). For example, the data visualizations described with respect to FIGS. 14A-14B can be presented as histograms and/or other types of visualizations (e.g., charts and/or graphs) for presenting data. In some implementations, a document collection interface includes fewer than, more than, and/or different information (e.g., data visualizations) than what is illustrated in FIGS. 14A-14B.

In some implementations, an unstructured data monitoring process processes a document collection to determine (e.g., derive and/or generate) the data used to create data visualizations, such as those illustrated in FIGS. 14A-14B. For example, an unstructured data monitoring process can determine (e.g., and return and/or provide to another process, application, and/or system), for a document collection: documents that are duplicates, grade distribution, collection topics, topic distribution, documents with abusive language, sentiment distribution, tone distribution, language distribution, document length, average word length, documents with abusive language, writing level distribution, number of pages, document completeness, document consistency, document type, collection themes, sentiment distribution, tone distribution, language distribution, and/or other data about the documents in the collection.

Figure 15A:
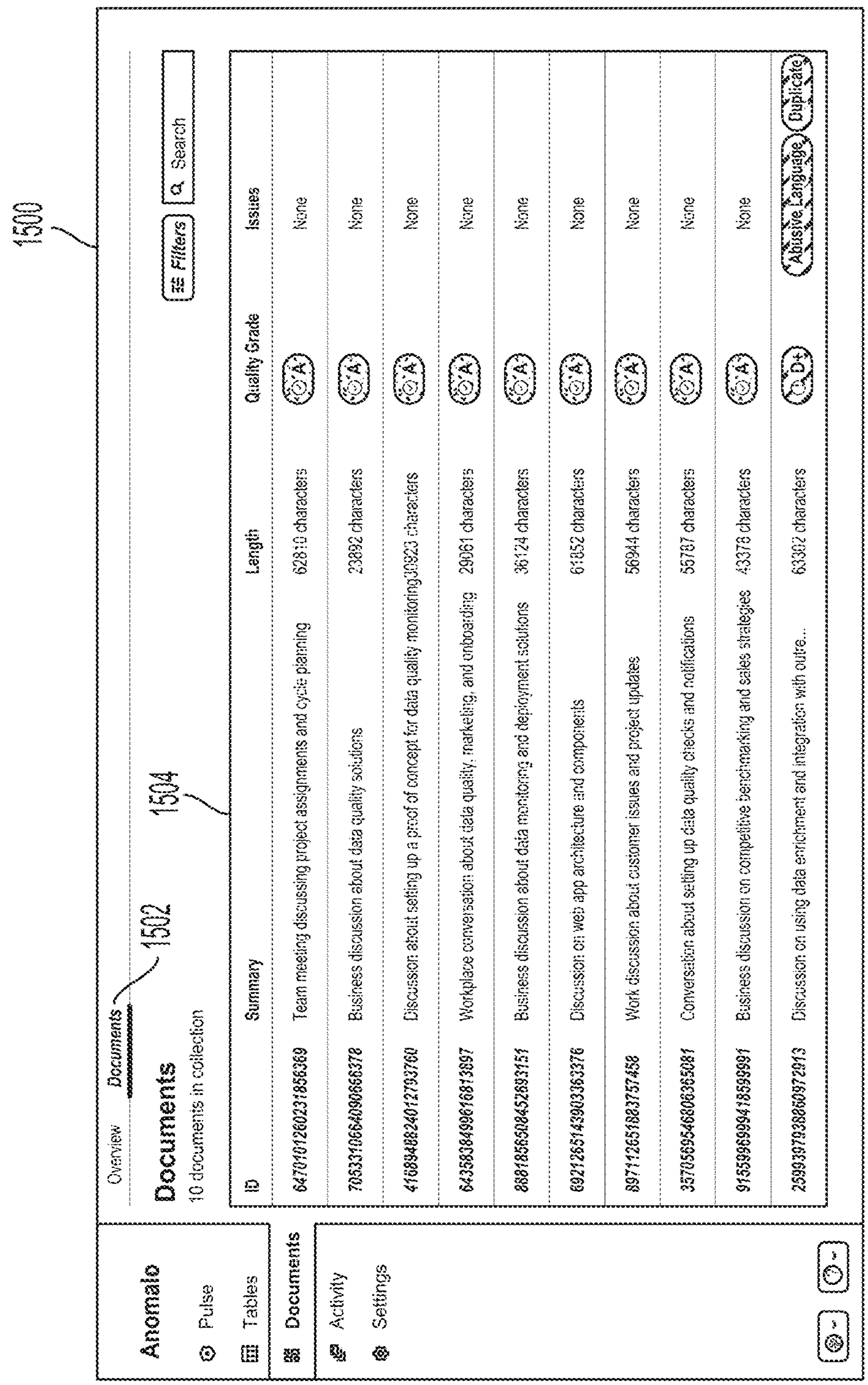
FIGS. 15A-15B illustrate examples of a data quality monitoring interface.

FIG. 15A illustrates an example document collection interface 1500. In FIG. 15A, the documents tab 1502 of the document collection interface 1500 (e.g., similar to the interfaces as illustrated in FIG. 14A or 14B) is selected and a set of documents in the document collection are displayed. The documents tab can be selected to cause display of the set of documents. Selection of a particular document causes display of a document information interface (e.g., such as the interface illustrated in FIG. 17). In FIG. 15A, the documents collection interface 1500 includes a list of documents section 1504 and columns that include information about each document, including columns for: an identifier (labeled "ID") (e.g., a name or other reference of the document), a summary of the document (e.g., "Business discussion about data quality solutions") (e.g., a statement summarizing the content of the document), a length of the document (e.g., "23892 characters") (e.g., measured in units such as number of characters, words, pages, and/or a reading time indicating a length of time it takes to read), quality grade (e.g., a letter grade or a numeric grade), and issues in the document (e.g., identifying potential data quality issues with the document, such as the inclusion of abusive language).

Figure 15B:
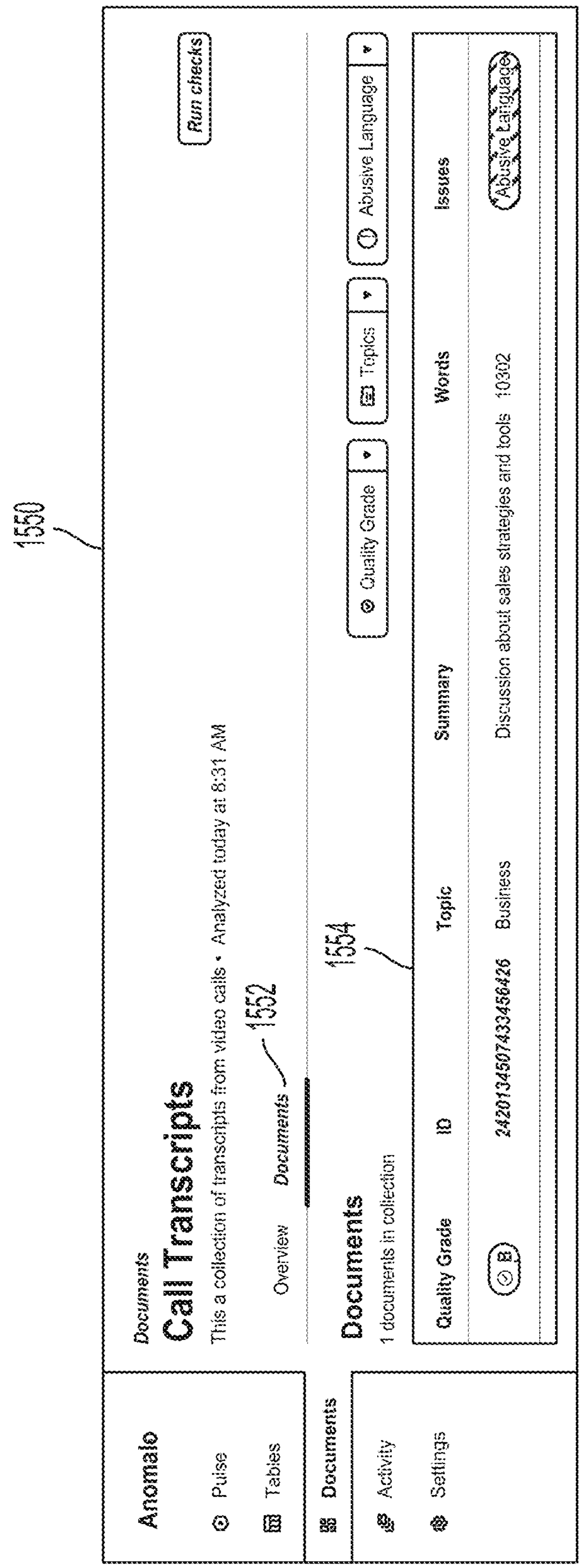

FIG. 15B illustrates another example document collection interface 1550. In FIG. 15B, the documents tab 1552 is selected and a set of documents in the document collection are displayed. The documents tab can be selected to cause display of the set of documents. Selection of a particular document causes display of a document information interface. In FIG. 15B, the documents collection interface includes a list of documents section 1554 and columns that include information about each document including columns for: quality grade, an identifier, one or more topic of the document (e.g., "Business") (e.g., a tag derived by an ML model describing a topic (e.g., theme) of the document), a summary of the document (e.g., "Discussion about sales strategies and tools"), number of words in the document (e.g., "10302"), and issues in the document. In some implementations, a document collection interface includes fewer than, more than, and/or different information (e.g., columns) than what is illustrated in FIGS. 15A-15B.

In some implementations, an unstructured data monitoring process processes each document in the document collection to determine (e.g., derive and/or generate) the data shown in the respective columns in the document collection interface, such as those illustrated in FIGS. 15A-15B. For example, an unstructured data monitoring process can determine (e.g., and return and/or provide to another process, application, and/or system), for each respective document: one or more characteristic attributes, one or more issue attributes, and/or other data about the document.

Figure 16:
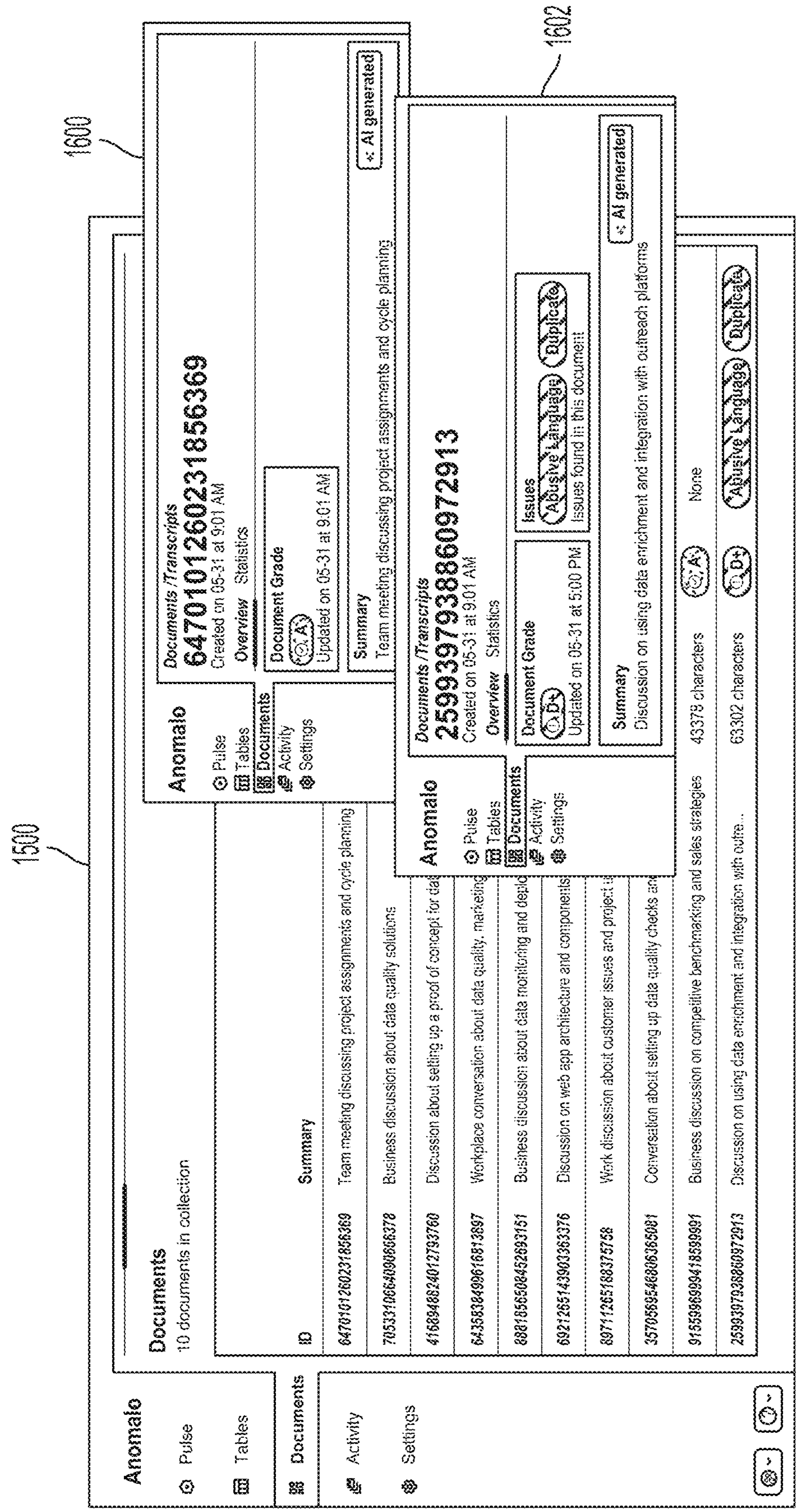
FIG. 16 illustrates an example of a data quality monitoring interface.
Figure 17:
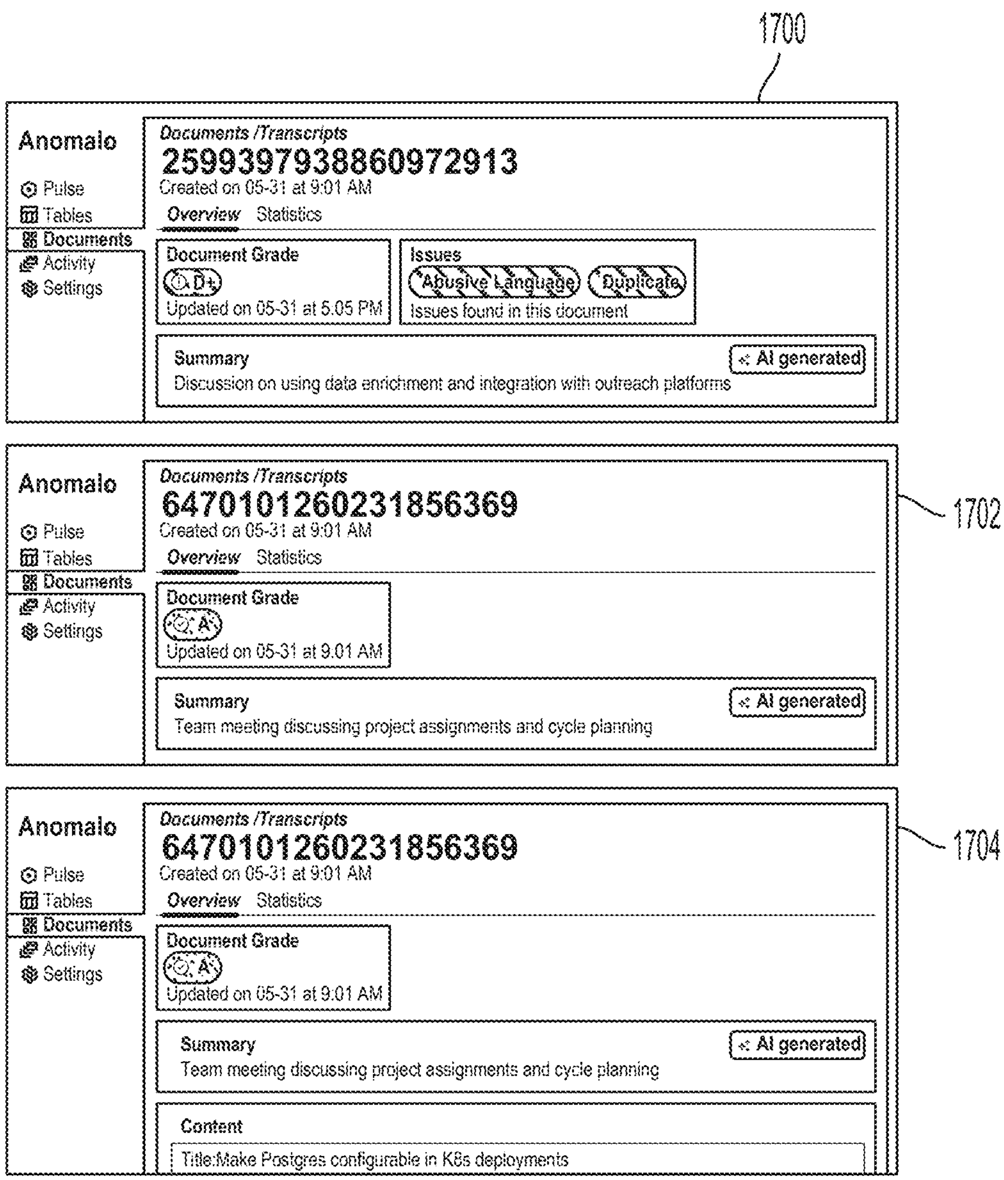
FIG. 17 illustrates an example of a data quality monitoring interface.

FIG. 16 illustrates example document collection interface 1500 (e.g., as described in FIG. 15A) and document information interfaces 1600 and 1602. Document information interfaces 1600 and 1602 include interfaces with additional document-level information for respective documents in the collection listed in interface 1500. FIG. 17 illustrates additional example document information interfaces 1700, 1702, and 1704 (e.g., which can correspond to respective documents in the collection listed in interface 1500).

Figure 19:
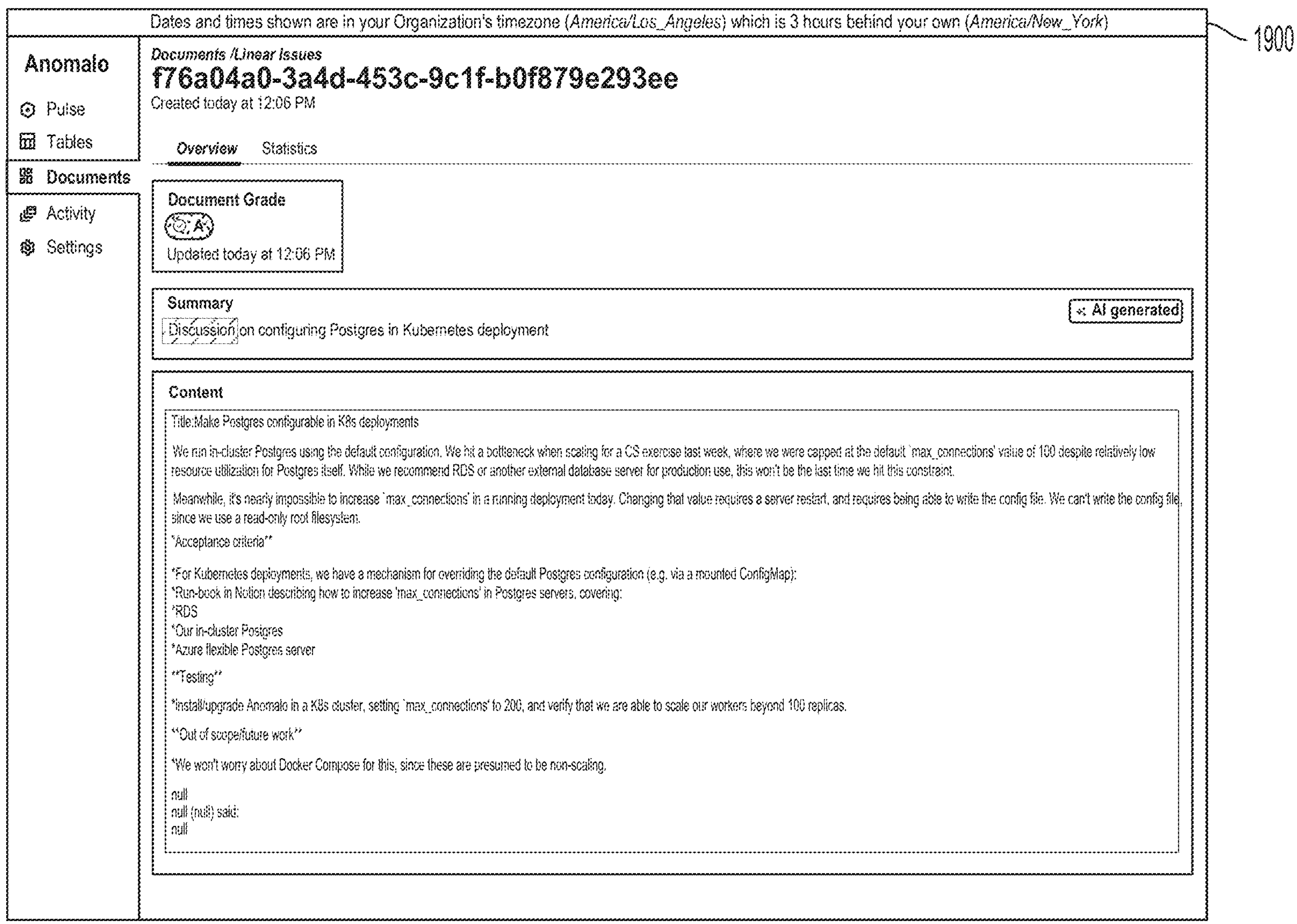
FIG. 19 illustrates an example of a data quality monitoring interface.

FIG. 19 illustrates example document information interface 1900. Document information interface 1900 includes a document grade, an Al generated summary, and the content of the document. Examples of document information interfaces are also illustrated in FIGS. 8, 16, and 17.

Figure 18:
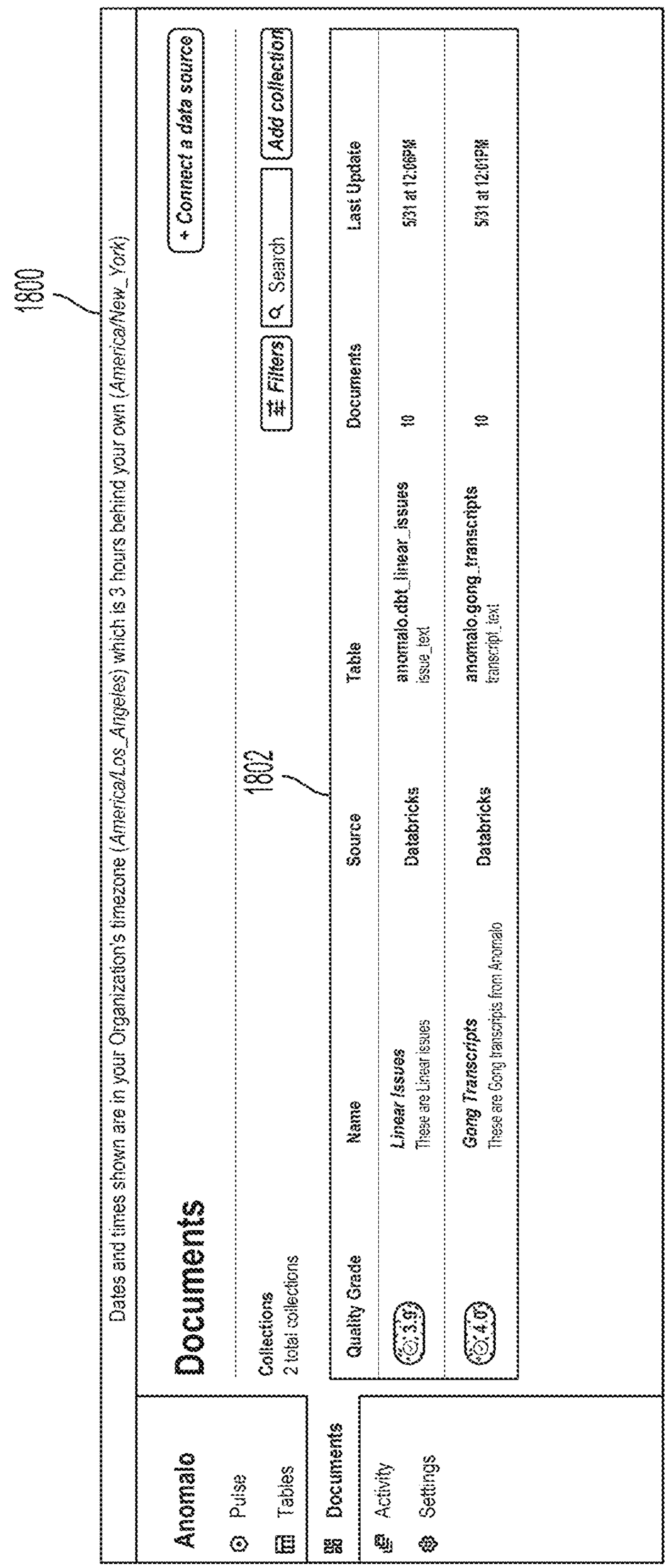
FIG. 18 illustrates an example of a data quality monitoring interface.

FIG. 18 illustrates an example collections summary interface 1800. In FIG. 18, the collections summary interface 1800 includes a list 1802 one or more collections of unstructured data that are being (or can be) monitored. In FIG. 18, the collections summary interface 1800 includes, for each collection, a quality grade, name, source, table, number of documents, and last updated information. Another example of a collections summary interface is illustrated in FIG. 9.

FIG. 20 illustrates an example document statistics interface 2000. The document statistics interface is displayed in response to selection of the statistics tab in the document information interface of FIG. 19. The document information interface includes information (e.g., characteristic attributes and issue attributes) representing data that was obtained from the data quality check performed on the document (e.g., by the unstructured data monitoring process).

FIG. 21 illustrates an example document collection interface 2100. Document collection interface 2100 includes features as described above with respect to FIGS. 5A-5D FIGS. 14A-14B. For example, document collection interface 2100 includes sections that include information about a document collection and the results of unstructured data analysis, including a number of documents in the collection, a score (e.g., "Collection GPA"), a collection-level summary, and a data section. The data section of interface 2100 includes sections with visualizations for duplicates distribution, grade distribution, collection topics, topic distribution, documents with abusive language, sentiment distribution, tone distribution, language distribution, and document length.

In some implementations, the user interfaces illustrated in FIGS. 5-21 or described here can include additional features than described, fewer features than described, or a different combination of features than described. For example, features of one or more user interfaces described above can be combined with features of one or more other user interfaces. For instance, the features of two user interfaces can be combined into a single user interface. Likewise, the features of one user interface can be split into multiple user interfaces (e.g., requiring user input to move between them). All such variations for performing the functions described here should be considered within the scope of this disclosure.

Figure 22:
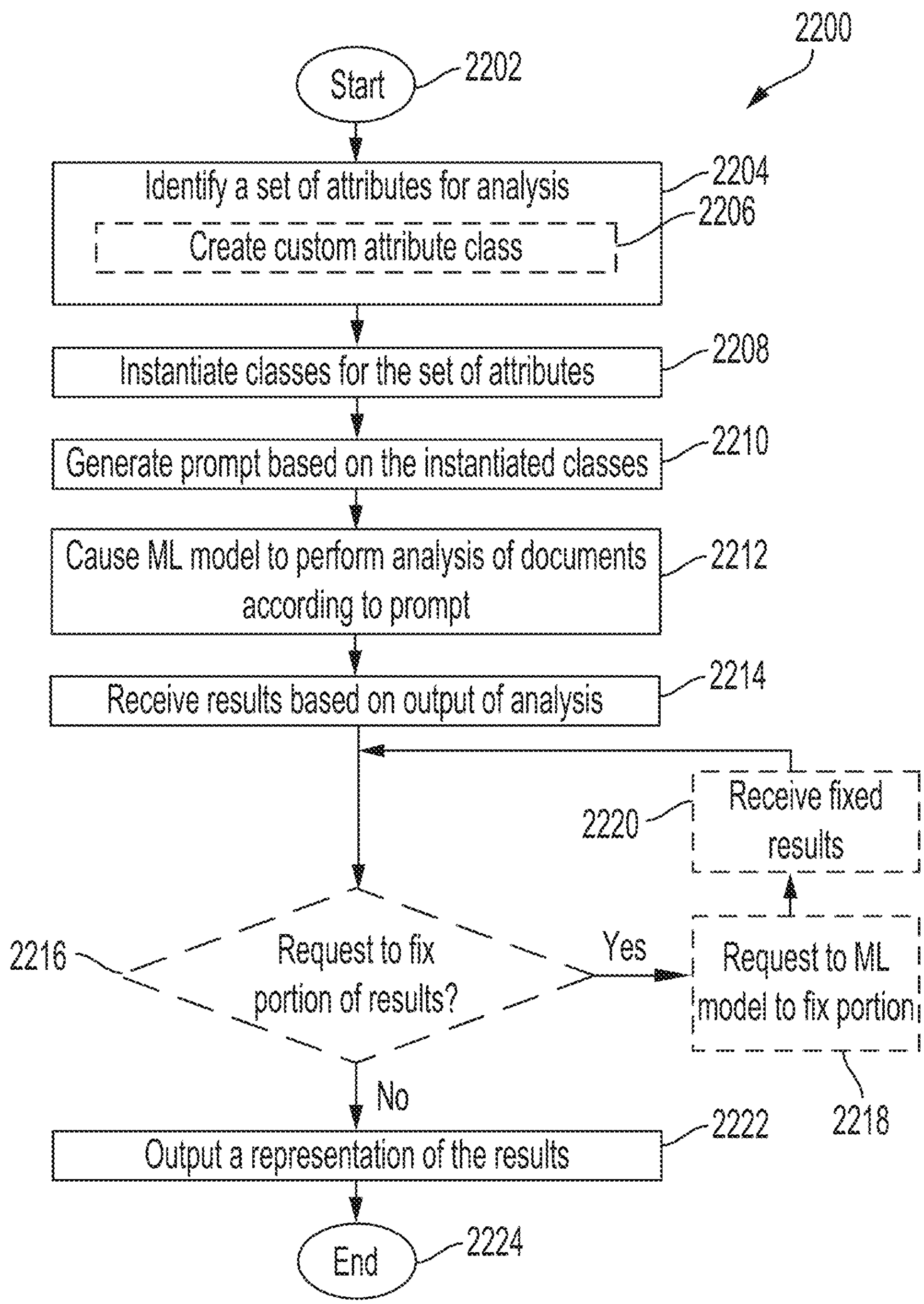
FIG. 22 illustrates an example process for unstructured data analysis.

FIG. 22 illustrates an example process for unstructured data analysis. For example, process 2200 can be used to perform an unstructured data monitoring process on a collection of documents. Process 2200 of FIG. 22 can be performed by one or more computing system (e.g., 102, 110, 106, or 2500). At 2202, process 2200 starts. At 2204, the system identifies a set of attributes for analysis. For example, a data quality monitoring system identifies (e.g., receives via input or stored configuration settings) a set of characteristic attributes, a set of issue attributes, or some combination of both, for the unstructured data monitoring process.

At 2206, the system optionally creates a custom attribute class. For example, where the set of attributes includes a new or customized attribute, a custom (e.g., new or customized existing) class is defined in a registry (e.g., such as the registries illustrated in FIGS. 4A-4B).

At 2208, the system instantiates classes for the set of attributes. For example, the system creates instances of each class corresponding to each attribute in the set of attributes. In some implementations, creating instances includes copying the class definition for an attribute from the registry. For example, the instances for the attributes can be combined in a configuration for the current unstructured data monitoring process.

At 2210, the system generates a prompt based on the instantiated classes. For example, the instantiated classes can include prompt strings corresponding to each attribute, and generating the prompt includes combining these prompt strings (e.g., and, optionally, additional prompt strings). For example, the system generates a prompt 604 as illustrated in FIGS. 6A-6B.

At 2212, the system causes an ML model to perform analysis of the collection of documents according to the generated prompt. For example, the system provides the prompt to the ML model (e.g., one or more ML models collectively referred to as an ML model). In some implementations, the system provides the collection of documents to the ML model. For example, providing the collection of documents to the ML model can include providing the documents, providing a representation of the documents (e.g., one or more XML files that include representations of the collection of documents), providing access to the collection of documents stored at one or more storage locations, or some combination of these. In some implementations, the system identifies the collection of documents. For example, a data quality monitoring system identifies (e.g., receives via input or stored configuration settings) the collection of documents. In some implementations, identifying the collection of documents includes generating a representation of the collection of documents (e.g., an XML file for providing to the ML model).

At 2214, the system receives results based on output of analysis performed by the ML model. For example, receiving results from the ML model can include receiving the results in multiple stages or all of once. In some implementations, the results have a structured format. In some implementations, the structured format is specified in the prompt.

At 2216, the system optionally determines whether a request needs to be made to fix a portion of the results. For example, a request to fix the results can be needed if the formatting of the results does not comply with the instructions specified in the prompt (e.g., issue entities are missing, a column is missing, or other improper formatting).

According to a determination that a request to fix the results should be made ("Yes" at 2216), process 2200 optionally proceeds to 2218 and a request is made to an ML model (e.g., the same ML model that performed the analysis and provided the results) to fix the results. For example, the request can include instructions to fix the portion that is non-compliant (e.g., instruction to add missing issue entities). Doing so may avoid need by the ML model to re-perform the entire analysis again, saving computing resources and time. At 2220, the system optionally receives fixed results (e.g., where a request to fix was made). After receiving the fixed results, process 2200 optionally returns to 2216 to determine whether a request needs to be made to fix a portion of the fixed results (e.g., the fixed results still include an error in formatting). For example, if an additional fix request is needed, process 2200 proceeds through 2218 and 2220 again.

According to a determination that a request to fix the results should not be made ("No" at 2216), or if 2216 is omitted, process 2200 proceeds to 2222. At 2222, the system outputs a representation of the results. For example, outputting a representation can include storing a representation of the results (e.g., a file, a table, or other object). For example, outputting a representation can include generating or causing display of (e.g., in a dashboard) one or more visualizations of the results. For instance, the system can output visualizations illustrated in the document collection interfaces 500 and 2100, which graphically represent the results of the analysis, such as the presence of, distributions of, and correlations between characteristic attributes and issue attributes determined for the document collection. At 2224, process 2200 ends.

Figure 23:
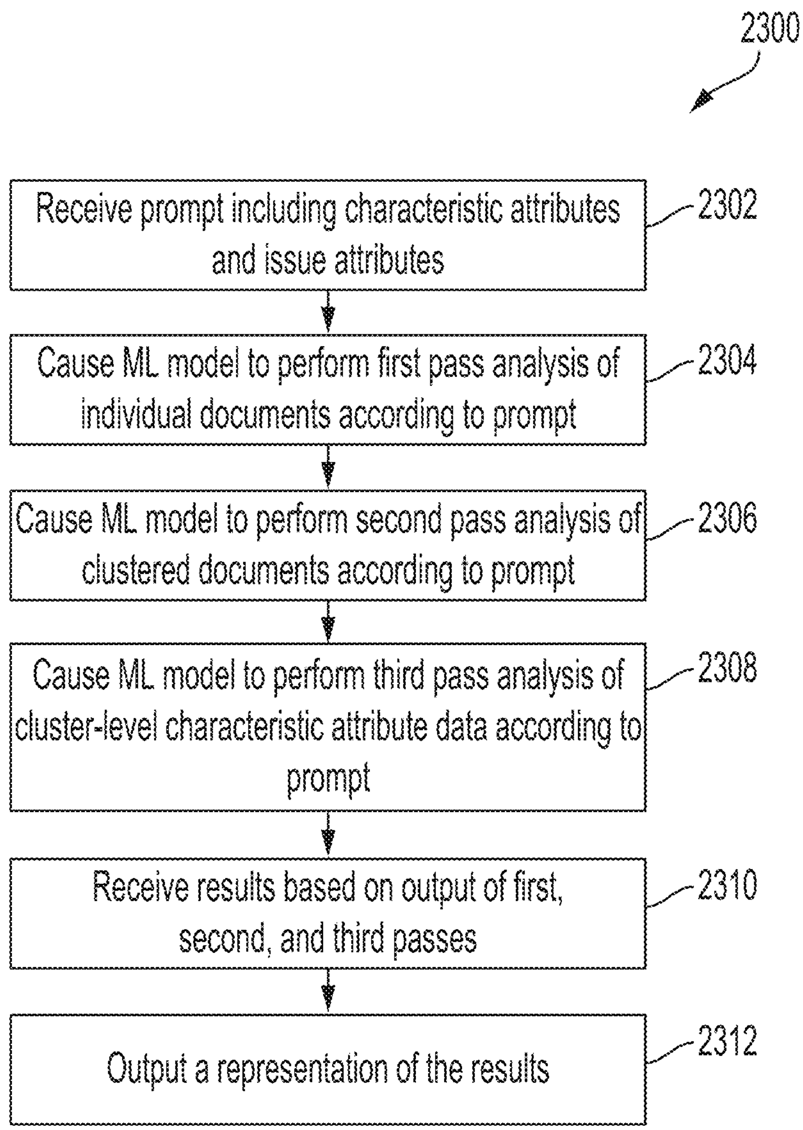
FIG. 23 illustrates an example process for unstructured data analysis.

FIG. 23 illustrates an example process for unstructured data analysis. For example, process 2300 can be used to perform an unstructured data monitoring process on a collection of documents, the task including a multiple pass analysis. Process 2300 of FIG. 23 can be performed by one or more computing system (e.g., 102, 110, 106, or 2500). At 2302, the system receives a prompt including a set of characteristic attributes and a set of issue attributes. For example, the prompt includes instructions to extract the set of characteristic attributes in a collection of documents. For example, the prompt includes instructions to identify whether the set of issue attributes are present in the collection of documents. In some implementations, the system identifies the collection of documents. For example, a data quality monitoring system identifies (e.g., receives via input or stored configuration settings) the collection of documents. In some implementations, identifying the collection of documents includes generating a representation of the collection of documents (e.g., an XML file for providing to the ML model).

At 2304, the system causes the ML model to perform a first pass analysis of individual documents according to the prompt. For example, the system provides the prompt to an ML model, causing the ML model to perform a first pass to extract individual document-level characteristic attributes and identify presence of issue attributes in individual documents. In some implementations, the system extracts one or more characteristic attributes (e.g., before or after the ML model performs its analysis). In some implementations, the system extracts one or more issue attributes (e.g., before or after the ML model performs its analysis). For example, certain characteristic attributes or issue attributes can be performed by the data quality monitoring system (e.g., rather than by the ML model), which can optionally be based on the results of the ML model. Attributes extracted or identified by the system can be combined with the results of the ML model or provided to the ML model as part of the analysis.

At 2306, the system causes the ML model to perform a second pass analysis of clustered documents according to the prompt. For example, documents can be clustered according to output of the first pass (e.g., based on document-level characteristic attributes). The second pass can generate output that includes one or more cluster-level characteristic attributes. In some implementations, the system performs the clustering. For example, a data quality monitoring system receives the results of the first pass, clusters documents based on the results, and provides the clustered documents to the ML model for processing in the second pass. In some implementations, the ML model performs the clustering. For example, the ML model is instructed to create clusters of documents based on their characteristic attributes.

At 2308, the system causes the ML model to perform a third pass analysis of cluster-level characteristic attribute data (e.g., one or more characteristic attributes) according to the prompt. The third pass can generate output that includes one or more collection-level characteristic attributes based on the output of the second pass (or the output of the first pass or both).

At 2310, the system receives results based on output of the first pass, the second pass, and the third pass. At 2312, the system outputs a representation of the results (e.g., stores a representation, outputs a visual representation, or a combination of both).

Figure 24:
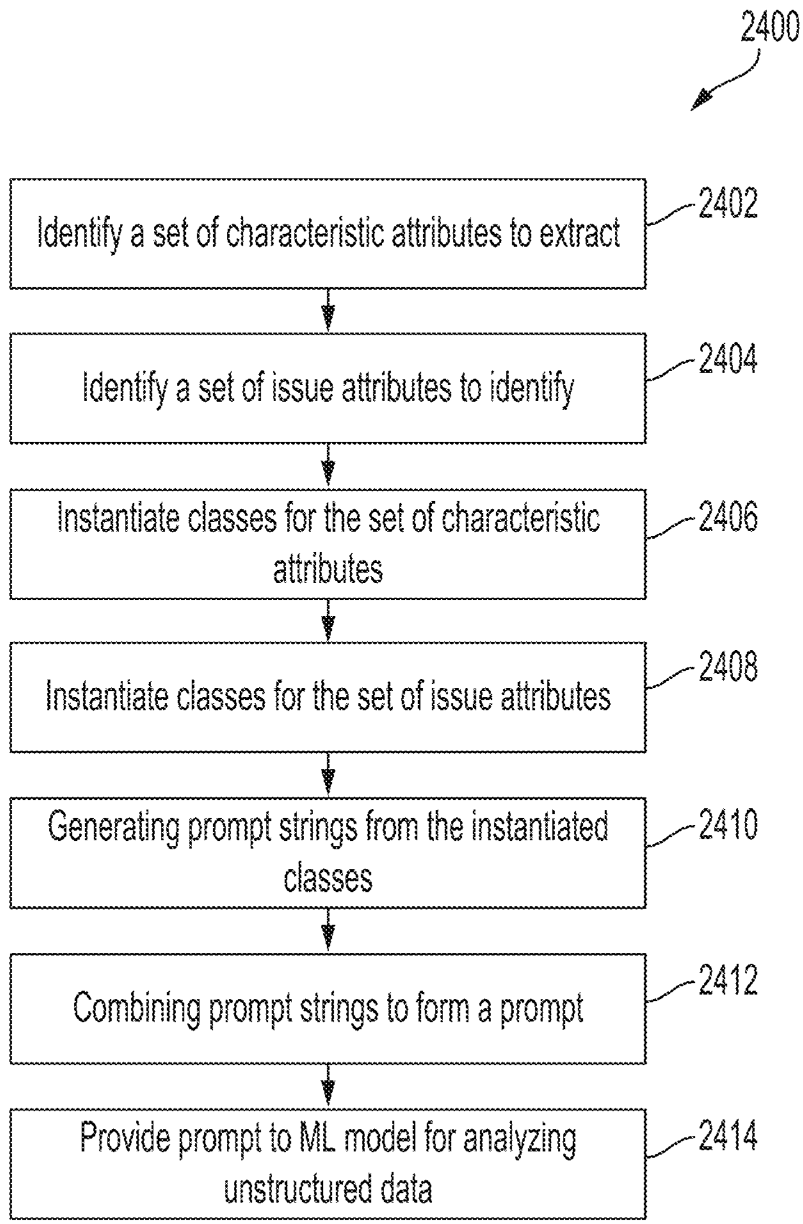
FIG. 24 illustrates an example process for unstructured data analysis.

FIG. 24 illustrates an example process for unstructured data analysis. For example, process 2400 can be used to generate a prompt and perform an unstructured data monitoring process on a collection of documents. Process 2400 of FIG. 24 can be performed by one or more computing system (e.g., 102, 110, 106, or 2500). At 2402, the system identifies a set of characteristic attributes to extract. For example, a data quality monitoring system identifies (e.g., receives via input or stored configuration settings) a set of characteristic attributes to extract from a collection of documents during the unstructured data monitoring process.

At 2404, the system identifies a set of issue attributes to identify. For example, a data quality monitoring system identifies (e.g., receives via input or stored configuration settings) a set of issue attributes to identify (e.g., whether they are present or not) in a collection of documents during the unstructured data monitoring process.

At 2406, the system instantiates classes corresponding to the set of characteristic attributes. For example, the system can instantiate a class for each of the characteristic attributes. At 2408, the system instantiates classes corresponding to the set of issue attributes. For example, the system can instantiate a class for each of the issue attributes.

At 2410, the system generates prompt strings from the instantiated classes. For example, the instantiated classes may include prompt strings. In some implementations, generating the prompt strings from the instantiated classes can include copying or adapting the prompt strings included in the instantiated classes. At 2412, the system combines prompt strings to form a prompt. For example, the prompt strings generated from the instantiated classes can be combined (e.g., together and, optionally, with additional prompt strings) to form the prompt. At 2414, the system provides the prompt to an ML model (e.g., one or more ML model) for analyzing unstructured data (e.g., in the collection of documents). For example, providing the prompt can cause the ML model to perform analysis according to the prompt to extract the set of characteristic attributes and identify presence of the set of issue attributes. For instance, the ML model can perform a multiple pass analysis and return a set of results structured according to the prompt.

Figure 25:
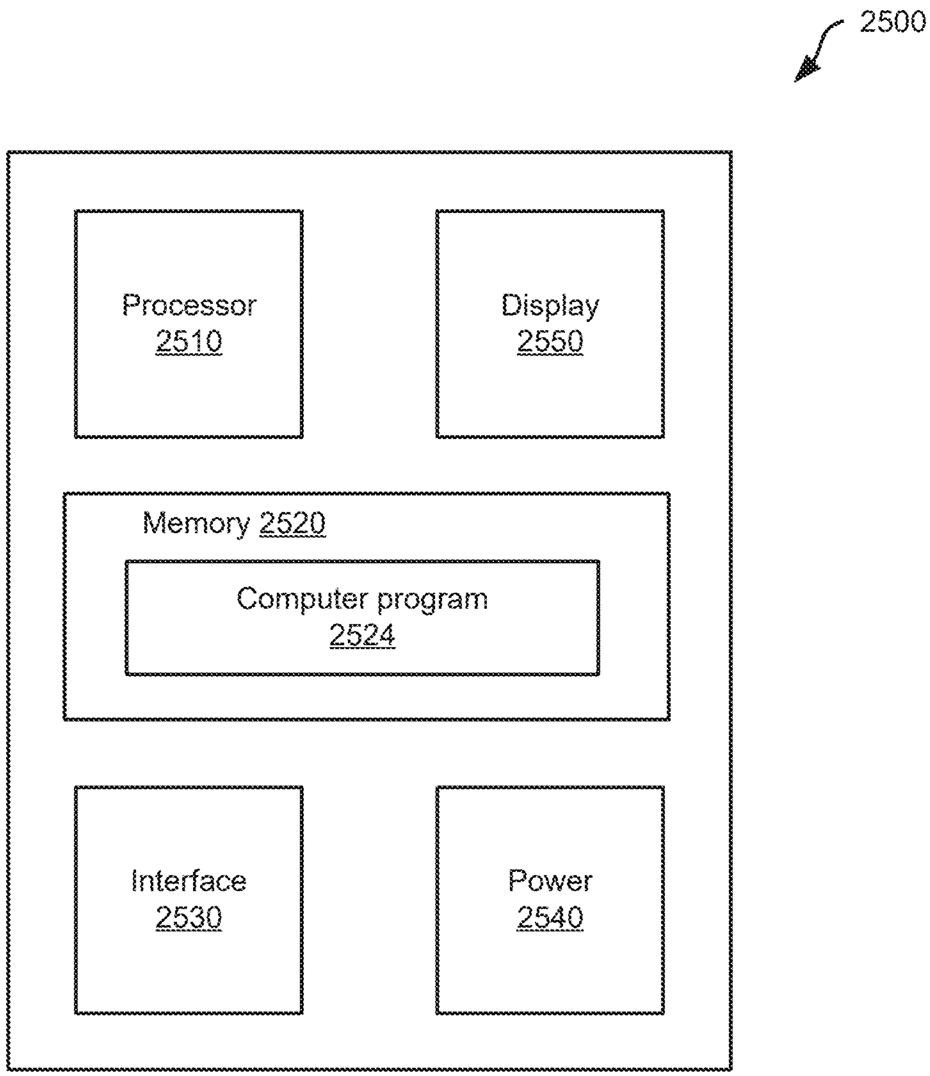
FIG. 25 is a block diagram showing an example computer system.

FIG. 25 is a block diagram showing an example computer system 2500 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 2510. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 2524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 2510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 2520. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 2540 provides power to the other components of the computer system 2500. For example, the other components may operate based on electrical power provided by the power unit 2540 through a voltage bus or other connection. In some implementations, the power unit 2540 includes a battery or a battery system, for example, a rechargeable battery. In some implementations, the power unit 2540 includes an adapter (e.g., an AC adapter) that receives an external power signal (from an external source) and converts the external power signal to an internal power signal conditioned for a component of the computer system 2500. The power unit 2540 may include other components or operate in another manner.

To provide for interaction with a user, operations can be implemented on a computer having a display device, e.g., display 2550, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 2500 may include a single computing device or multiple computers that operate in proximity or generally remote from each other and typically interact through a communication network, e.g., via interface 2530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 2530 may provide communication with other systems or devices. In some cases, the interface 2530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 2530 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, unstructured data analysis is performed.

In a first example, a method performed by a computing system (e.g., 102, 110, 106, or 2500) includes: identifying a plurality of documents that include unstructured data; identifying a prompt for a machine learning (ML) model, the prompt indicating instructions for analyzing the unstructured data in the plurality of documents to: extract a set of characteristic attributes defined in the prompt, and identify a set of issue attributes defined in the prompt; causing the ML model to analyze the unstructured data in the plurality of documents according to the prompt, including: causing the ML model to perform a first pass that includes individually analyzing documents of the plurality of documents to generate first output that includes, for each respective document, extracted characteristic attributes and identified issue attributes of the respective document; causing the ML model to perform a second pass that includes analyzing clusters of documents clustered by characteristic attributes of the first output, wherein analyzing the clusters of documents includes, for each cluster of documents, analyzing the characteristic attributes of the first output for documents in the cluster to generate second output that includes cluster-level characteristic attributes identified according to the set of characteristic attributes defined in the prompt; and causing the ML model to perform a third pass that includes analyzing the cluster-level characteristic attributes of the second output to generate third output that includes one or more collection-level characteristic attributes identified according to the set of characteristic attributes defined in the prompt; receiving results from the ML model in a structured format according to the prompt, the results based on the first output of the first pass, the second output of the second pass, and the third output of the third pass; and outputting a representation of the results returned by the ML model.

Implementations of the first example may include one or more of the following features. The prompt includes instructions to return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model. The prompt includes instructions to return results for each issue attribute in the set of issue attributes, the results for each issue attribute including, for each document in the plurality of documents, one or more of the following: a Boolean value representing presence of the issue attribute in a respective document and determined by the ML model, or a representation of unstructured content from the respective document that caused the issue attribute to be identified as present by the ML model. The set of characteristic attributes includes one or more of the following characteristic attributes: a topic of a target set of documents, a sentiment of a target set of documents, a summary of a target set of documents, a tone of a target set of documents, a language of a target set of documents, a quality grade of a target set of documents, or a category of a target set of documents. The set of issue attributes include one or more of the following issue attributes: presence of personally identifiable information (PII) in a document, presence of abusive language in a document, presence of sensitive information in a document, or presence of duplicate documents. The first output of the first pass includes representations of unstructured content that caused one or more issue attributes to be identified as present by the ML model.

Implementations of the first example may include one or more of the following features. The results include a score for each document in the plurality of documents, the score determined by the ML model based on one or more of the following: one or more characteristic attributes extracted from the respective document, or presence of one or more issue attributes identified in the respective document. The method includes: receiving input identifying one or more attribute classes, the one or more attribute classes corresponding to one or more characteristic attributes in the set of characteristic attributes, one or more issue attributes in the set of issue attributes, or a combination of both; and generating the prompt including instantiating the one or more attribute classes. The method includes receiving input specifying the ML model to use for analyzing the unstructured data in the plurality of documents. The method includes validating the results received from the ML model including determining whether the structured format of the results complies with formatting instructions in the prompt. The method includes, in response to a determination that the structured format of the results does not comply with the formatting instructions in the prompt, prompting the ML model to fix a non-compliant portion of the results.

Implementations of the first example may include one or more of the following features. Outputting the representation of the results includes one or both of the following: generating one or more visualizations based on the results; or storing the representation of the results in a storage resource. The unstructured data includes one or more of the following: text data, audio data, or visual data. The method includes modifying the plurality of documents based on the results returned by the ML model, wherein modifying the plurality of documents includes one or more of the following: removing one or more documents from the plurality of documents based on identified presence of one or more issue attributes; altering content within one or more documents based on presence of one or more issue attributes; annotating content within one or more documents based on presence of one or more issue attributes; highlighting content within one or more documents based on presence of one or more issue attributes; removing content within one or more documents based on presence of one or more issue attributes; replacing content within one or more documents based on presence of one or more issue attributes; or redacting content within one or more documents based on presence of one or more issue attributes. The method includes using the modified plurality of documents to train a different ML model. Modifying the plurality of documents includes outputting a modified set of documents that is distinct from the plurality of documents.

In a second example, a method performed by a computing system (e.g., 102, 110, 106, or 2500) includes: receiving input identifying (e.g., selecting or defining): a set of characteristic attributes to extract from unstructured data in a plurality of documents; and a set of issue attributes to identify in the unstructured data in the plurality of documents; for each characteristic attribute of the set of characteristic attributes, instantiating a characteristic attribute class that includes information defining the respective characteristic attribute; for each issue attribute of the set of issue attributes, instantiating an issue attribute class that includes information defining the respective issue attribute; constructing a prompt that includes instructions for an ML model to analyze the unstructured data in the plurality of documents, wherein constructing the prompt includes: for each instantiated characteristic attribute class, generating a prompt string that includes instructions for extracting the respective characteristic attribute based on the information defining the respective characteristic attribute; for each instantiated issue attribute class, generating a prompt string that includes instructions for identifying the respective issue attribute based on the information defining the respective issue attribute; and combining the generated prompt strings to form the prompt; and providing the prompt to the ML model and causing the ML model to analyze the unstructured data in the plurality of documents according to the prompt.

Implementations of the second example may include one or more of the following features. The method including: after causing the ML model to analyze the unstructured data in the plurality of documents according to the prompt, and in response to a request to perform another analysis of the unstructured data in the plurality of documents: instantiating a second set of characteristic attribute classes including, for each characteristic attribute in a second set of characteristic attributes, instantiating a characteristic attribute class that includes information defining the respective characteristic attribute; instantiating a second set of issue attribute classes including, for each issue attribute in a second set of issue attributes, instantiating an issue attribute class that includes information defining the respective issue attribute; constructing a second prompt that includes instructions for the ML model to analyze the unstructured data in the plurality of documents, the second prompt constructed based on the instantiated second set of characteristic attribute classes and the instantiated second set of issue attribute classes; and providing the second prompt to the ML model and causing the ML model to analyze the unstructured data in the plurality of documents according to the second prompt.

Implementations of the second example may include one or more of the following features. The prompt includes one or more filtering criteria, wherein the filtering criteria indicates a set of criteria for including or excluding documents, of the plurality of documents, from at least a portion of analysis according to the prompt. The input includes attribute information defining one or more characteristic attributes, one or more issue attributes, or a combination of both. The method includes creating one or more new attribute classes, based on the attribute information, that are instantiated when constructing the prompt. The prompt includes instructions to return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model. The prompt includes instructions to return results for each issue attribute in the set of issue attributes, the results for each issue attribute including, for each document in the plurality of documents, one or more of the following: a Boolean value representing presence of the issue attribute in a respective document and determined by the ML model, or a representation of unstructured content from the respective document that caused the issue attribute to be identified as present by the ML model. The prompt includes instructions to return, in a structured output field of the results, the representation of unstructured content from the respective document that caused the issue attribute to be identified as present by the ML model.

Implementations of the second example may include one or more of the following features. The set of characteristic attributes includes one or more of the following characteristic attributes: a topic of a target set of documents, a sentiment of a target set of documents, a summary of a target set of documents, a tone of a target set of documents, a language of a target set of documents, a quality grade of a target set of documents, or a category of a target set of documents. The set of issue attributes include one or more of the following issue attributes: presence of personally identifiable information (PII) in a document, presence of abusive language in a document, presence of sensitive information in a document, or presence of duplicate documents. The prompt includes instructions to format results returned by the ML model in a structured format. The method includes validating the results returned by the ML model including determining whether a format of the results returned by the ML model complies with formatting instructions in the prompt. The method includes, in response to a determination that the format of the results does not comply with the formatting instructions in the prompt, prompting the ML model to fix a non-compliant portion of the results.

Implementations of the second example may include one or more of the following features. The prompt includes instructions for calculating a score for each document in the plurality of documents, the score determined by the ML model based on one or more of the following: one or more characteristic attributes extracted from the respective document, or presence of one or more issue attributes identified in the respective document. The method including receiving input specifying the ML model to use for analyzing the unstructured data in the plurality of documents. The method including modifying the plurality of documents based on results returned by the ML model, wherein modifying the plurality of documents includes one or more of the following: removing one or more documents from the plurality of documents based on identified presence of one or more issue attributes; altering content within one or more documents based on presence of one or more issue attributes; annotating content within one or more documents based on presence of one or more issue attributes; highlighting content within one or more documents based on presence of one or more issue attributes; removing content within one or more documents based on presence of one or more issue attributes; replacing content within one or more documents based on presence of one or more issue attributes; or redacting content within one or more documents based on presence of one or more issue attributes.

In a third example, a method performed by a computing system (e.g., 102, 110, 106, or 2500) includes: identifying a plurality of documents that include unstructured data; identifying a prompt for a machine learning (ML) model, the prompt indicating instructions for analyzing the unstructured data in the plurality of documents to: extract a set of characteristic attributes defined in the prompt, and identify a set of issue attributes defined in the prompt; causing the ML model to analyze the unstructured data in the plurality of documents according to the prompt, including: causing the ML model to perform a plurality of analysis passes; aggregating results between one or more of the plurality of analysis passes and providing aggregated results to the ML model for a subsequent analysis pass; receiving results from the ML model in a structured format according to the prompt, the results based on output of one or more of the plurality of analysis passes; and outputting a representation of the results returned by the ML model.

Implementations of the third example may include one or more of the features of the first example or the second example.

In a fourth example, a system (e.g., 102, 110, 106, or 2500) includes one or more processors, and a computer-readable medium storing instructions that are operable when executed by the one or more processors to perform one or more operations of the first example or the second example.

In a fifth example, a non-transitory computer-readable medium (e.g., 2520) storing instructions that are operable when executed by a data processing apparatus (e.g., 2510) to perform one or more operations of the first example or second example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method performed by a computing system, the method comprising:

receiving user input indicating:

a set of characteristic attributes to extract from unstructured data in a plurality of documents; and a set of issue attributes to identify in the unstructured data in the plurality of documents;

for each characteristic attribute of the set of characteristic attributes, instantiating a characteristic attribute class that includes information defining the respective characteristic attribute;

for each issue attribute of the set of issue attributes, instantiating an issue attribute class that includes information defining the respective issue attribute;

constructing a prompt that includes instructions for an ML model to analyze the unstructured data in the plurality of documents, wherein constructing the prompt includes:

for each instantiated characteristic attribute class, generating a prompt string that includes instructions for extracting the respective characteristic attribute based on the information defining the respective characteristic attribute;

for each instantiated issue attribute class, generating a prompt string that includes instructions for identifying the respective issue attribute based on the information defining the respective issue attribute; and combining the generated prompt strings to form the prompt;

providing the prompt to the ML model and causing the ML model to analyze the unstructured data in the plurality of documents according to the prompt; and receiving, from the ML model, results in response to the prompt, the results comprising a representation of documents that are determined to be relevant to the prompt based on a score calculated from one or more of the following:

one or more characteristic attributes extracted from the respective document, or presence of one or more issue attributes identified in the respective document.

2. The method of claim 1, comprising:

after causing the ML model to analyze the unstructured data in the plurality of documents according to the prompt, and in response to a request to perform another analysis of the unstructured data in the plurality of documents:

instantiating a second set of characteristic attribute classes including, for each characteristic attribute in a second set of characteristic attributes, instantiating a characteristic attribute class that includes information defining the respective characteristic attribute;

instantiating a second set of issue attribute classes including, for each issue attribute in a second set of issue attributes, instantiating an issue attribute class that includes information defining the respective issue attribute;

constructing a second prompt that includes instructions for the ML model to analyze the unstructured data in the plurality of documents, the second prompt constructed based on the instantiated second set of characteristic attribute classes and the instantiated second set of issue attribute classes; and providing the second prompt to the ML model and causing the ML model to analyze the unstructured data in the plurality of documents according to the second prompt.

3. The method of claim 1, wherein the prompt includes one or more filtering criteria, wherein the filtering criteria indicates a set of criteria for including or excluding documents, of the plurality of documents, from at least a portion of analysis according to the prompt.

4. The method of claim 1, wherein:

the input includes attribute information defining one or more characteristic attributes, one or more issue attributes, or a combination of both; and the method includes creating one or more new attribute classes, based on the attribute information, that are instantiated when constructing the prompt.

5. The method of claim 1, wherein the prompt includes instructions to return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model.

6. The method of claim 1, wherein the prompt includes instructions to return results for each issue attribute in the set of issue attributes, the results for each issue attribute including, for each document in the plurality of documents, one or more of the following: a Boolean value representing presence of the issue attribute in a respective document and determined by the ML model, or a representation of unstructured content from the respective document that caused the issue attribute to be identified as present by the ML model.

7. The method of claim 6, wherein the prompt includes instructions to return, in a structured output field of the results, the representation of unstructured content from the respective document that caused the issue attribute to be identified as present by the ML model.

8. The method of claim 1, wherein the set of characteristic attributes includes one or more of the following characteristic attributes: a topic of a target set of documents, a sentiment of a target set of documents, a summary of a target set of documents, a tone of a target set of documents, a language of a target set of documents, a quality grade of a target set of documents, or a category of a target set of documents.

9. The method of claim 1, wherein the set of issue attributes include one or more of the following issue attributes: presence of personally identifiable information (PII) in a document, presence of abusive language in a document, presence of sensitive information in a document, or presence of duplicate documents.

10. The method of claim 1, wherein the prompt includes instructions to format results returned by the ML model in a structured format.

11. The method of claim 10, comprising:

validating the results returned by the ML model including determining whether a format of the results returned by the ML model complies with formatting instructions in the prompt.

12. The method of claim 11, comprising, in response to a determination that the format of the results does not comply with the formatting instructions in the prompt, prompting the ML model to fix a non-compliant portion of the results.

13. The method of claim 1, wherein the prompt includes instructions for calculating a score for each document in the plurality of documents, the score determined by the ML model based on one or more of the following:

one or more characteristic attributes extracted from the respective document, or presence of one or more issue attributes identified in the respective document.

14. The method of claim 1, comprising receiving input specifying the ML model to use for analyzing the unstructured data in the plurality of documents.

15. The method of claim 1, comprising modifying the plurality of documents based on results returned by the ML model, wherein modifying the plurality of documents includes one or more of the following:

removing one or more documents from the plurality of documents based on identified presence of one or more issue attributes;

altering content within one or more documents based on presence of one or more issue attributes;

annotating content within one or more documents based on presence of one or more issue attributes;

highlighting content within one or more documents based on presence of one or more issue attributes;

removing content within one or more documents based on presence of one or more issue attributes;

replacing content within one or more documents based on presence of one or more issue attributes; or redacting content within one or more documents based on presence of one or more issue attributes.

16. A system comprising:

one or more processors; and a computer-readable medium storing instructions that are operable when executed by the one or more processors to perform operations comprising:

receiving user input indicating:

a set of characteristic attributes to extract from unstructured data in a plurality of documents; and a set of issue attributes to identify in the unstructured data in the plurality of documents;

for each characteristic attribute of the set of characteristic attributes, instantiating a characteristic attribute class that includes information defining the respective characteristic attribute;

for each issue attribute of the set of issue attributes, instantiating an issue attribute class that includes information defining the respective issue attribute;

constructing a prompt that includes instructions for an ML model to analyze the unstructured data in the plurality of documents, wherein constructing the prompt includes:

for each instantiated characteristic attribute class, generating a prompt string that includes instructions for extracting the respective characteristic attribute based on the information defining the respective characteristic attribute;

for each instantiated issue attribute class, generating a prompt string that includes instructions for identifying the respective issue attribute based on the information defining the respective issue attribute; and combining the generated prompt strings to form the prompt;

providing the prompt to the ML model and causing the ML model to analyze the unstructured data in the plurality of documents according to the prompt; and receiving, from the ML model, results in response to the prompt, the results comprising a representation of documents that are determined to be relevant to the prompt based on a score calculated from one or more of the following:

one or more characteristic attributes extracted from the respective document, or presence of one or more issue attributes identified in the respective document.

17. The system of claim 16, the computer-readable medium storing instructions that are operable when executed by the one or more processors to perform operations comprising:

after causing the ML model to analyze the unstructured data in the plurality of documents according to the prompt, and in response to a request to perform another analysis of the unstructured data in the plurality of documents:

instantiating a second set of characteristic attribute classes including, for each characteristic attribute in a second set of characteristic attributes, instantiating a characteristic attribute class that includes information defining the respective characteristic attribute;

instantiating a second set of issue attribute classes including, for each issue attribute in a second set of issue attributes, instantiating an issue attribute class that includes information defining the respective issue attribute;

constructing a second prompt that includes instructions for the ML model to analyze the unstructured data in the plurality of documents, the second prompt constructed based on the instantiated second set of characteristic attribute classes and the instantiated second set of issue attribute classes; and providing the second prompt to the ML model and causing the ML model to analyze the unstructured data in the plurality of documents according to the second prompt.

18. The system of claim 16, wherein the prompt includes one or more filtering criteria, wherein the filtering criteria indicates a set of criteria for including or excluding documents, of the plurality of documents, from at least a portion of analysis according to the prompt.

19. The system of claim 16, wherein:

the input includes attribute information defining one or more characteristic attributes, one or more issue attributes, or a combination of both; and the computer-readable medium storing instructions that are operable when executed by the one or more processors to perform operations comprising creating one or more new attribute classes, based on the attribute information, that are instantiated when constructing the prompt.

20. The system of claim 16, wherein the prompt includes instructions to return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model.

21. The system of claim 16, wherein the prompt includes instructions to return results for each issue attribute in the set of issue attributes, the results for each issue attribute including, for each document in the plurality of documents, one or more of the following: a Boolean value representing presence of the issue attribute in a respective document and determined by the ML model, or a representation of unstructured content from the respective document that caused the issue attribute to be identified as present by the ML model.

22. The system of claim 16, wherein the set of characteristic attributes includes one or more of the following characteristic attributes: a topic of a target set of documents, a sentiment of a target set of documents, a summary of a target set of documents, a tone of a target set of documents, a language of a target set of documents, a quality grade of a target set of documents, or a category of a target set of documents.

23. The system of claim 16, wherein the set of issue attributes include one or more of the following issue attributes: presence of personally identifiable information (PII) in a document, presence of abusive language in a document, presence of sensitive information in a document, or presence of duplicate documents.

24. The system of claim 16, wherein the prompt includes instructions to format results returned by the ML model in a structured format.

25. A non-transitory computer-readable medium storing instructions that are operable when executed by a data-processing apparatus to perform operations comprising:

receiving user input indicating:

a set of characteristic attributes to extract from unstructured data in a plurality of documents; and a set of issue attributes to identify in the unstructured data in the plurality of documents;

for each characteristic attribute of the set of characteristic attributes, instantiating a characteristic attribute class that includes information defining the respective characteristic attribute;

for each issue attribute of the set of issue attributes, instantiating an issue attribute class that includes information defining the respective issue attribute;

constructing a prompt that includes instructions for an ML model to analyze the unstructured data in the plurality of documents, wherein constructing the prompt includes:

for each instantiated characteristic attribute class, generating a prompt string that includes instructions for extracting the respective characteristic attribute based on the information defining the respective characteristic attribute;

for each instantiated issue attribute class, generating a prompt string that includes instructions for identifying the respective issue attribute based on the information defining the respective issue attribute; and combining the generated prompt strings to form the prompt;

providing the prompt to the ML model and causing the ML model to analyze the unstructured data in the plurality of documents according to the prompt; and receiving, from the ML model, results in response to the prompt, the results comprising a representation of documents that are determined to be relevant to the prompt based on a score calculated from one or more of the following:

one or more characteristic attributes extracted from the respective document, or presence of one or more issue attributes identified in the respective document.

26. The non-transitory computer-readable medium of claim 25, the non-transitory computer-readable medium storing instructions that are operable when executed by the data-processing apparatus to perform operations comprising:

after causing the ML model to analyze the unstructured data in the plurality of documents according to the prompt, and in response to a request to perform another analysis of the unstructured data in the plurality of documents:

instantiating a second set of characteristic attribute classes including, for each characteristic attribute in a second set of characteristic attributes, instantiating a characteristic attribute class that includes information defining the respective characteristic attribute;

instantiating a second set of issue attribute classes including, for each issue attribute in a second set of issue attributes, instantiating an issue attribute class that includes information defining the respective issue attribute;

constructing a second prompt that includes instructions for the ML model to analyze the unstructured data in the plurality of documents, the second prompt constructed based on the instantiated second set of characteristic attribute classes and the instantiated second set of issue attribute classes; and providing the second prompt to the ML model and causing the ML model to analyze the unstructured data in the plurality of documents according to the second prompt.

27. The non-transitory computer-readable medium of claim 25, wherein the prompt includes one or more filtering criteria, wherein the filtering criteria indicates a set of criteria for including or excluding documents, of the plurality of documents, from at least a portion of analysis according to the prompt.

28. The non-transitory computer-readable medium of claim 25, wherein the prompt includes instructions to return results for each characteristic attribute in the set of characteristic attributes, the results for each characteristic attribute including, for each document in the plurality of documents, one or more of the following: a category represented by a respective document and determined by the ML model, an integer representing a count associated with the respective document and determined by the ML model, or a string describing the respective document and determined by the ML model.

29. The non-transitory computer-readable medium of claim 25, wherein the prompt includes instructions to return results for each issue attribute in the set of issue attributes, the results for each issue attribute including, for each document in the plurality of documents, one or more of the following: a Boolean value representing presence of the issue attribute in a respective document and determined by the ML model, or a representation of unstructured content from the respective document that caused the issue attribute to be identified as present by the ML model.

30. The non-transitory computer-readable medium of claim 25, wherein the prompt includes instructions to format results returned by the ML model in a structured format.

* * * * *